US009203625B2

(12) United States Patent
Motwani et al.

(10) Patent No.: US 9,203,625 B2
(45) Date of Patent: *Dec. 1, 2015

(54) TRANSFERRING ENCODED DATA SLICES IN A DISTRIBUTED STORAGE NETWORK

(71) Applicant: Cleversafe, Inc., Chicago, IL (US)

(72) Inventors: Manish Motwani, Chicago, IL (US); Ilya Volvovski, Chicago, IL (US)

(73) Assignee: CLEVERSAFE, INC., Chicago, IL (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/683,964

(22) Filed: Nov. 21, 2012

(65) Prior Publication Data

US 2013/0138862 A1 May 30, 2013

Related U.S. Application Data

(60) Provisional application No. 61/564,185, filed on Nov. 28, 2011.

(51) Int. Cl.
*H04L 9/32* (2006.01)
*G06F 17/30* (2006.01)
*H04L 29/06* (2006.01)
(Continued)

(52) U.S. Cl.
CPC .............. *H04L 9/3236* (2013.01); *G06F 3/067* (2013.01); *G06F 3/0608* (2013.01); *G06F 3/0641* (2013.01); *G06F 12/0607* (2013.01); *G06F 12/1408* (2013.01); *G06F 17/30194* (2013.01); *G06F 21/00* (2013.01); *H04L 9/0825* (2013.01); *H04L 65/10* (2013.01); *G06F 11/108* (2013.01);
(Continued)

(58) Field of Classification Search
CPC ............ G06F 11/1076; G06F 11/1092; G06F 2211/1028; G06F 3/067; H04L 67/1097
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
(Continued)

*Primary Examiner* — Mardochee Chery
(74) *Attorney, Agent, or Firm* — Garlick & Markison; Timothy W. Markison

(57) ABSTRACT

A method begins by a distributed storage (DS) processing module identifying encoded data slices of stored encoded data slices to transfer, wherein the stored encoded data slices are assigned addresses within a local distributed storage network (DSN) address range, wherein a global DSN address space is divided into a plurality of address sectors, and wherein the local DSN address range is a portion of an address sector. The method continues with the DS processing module determining whether another local DSN address range in the address sector exists and when the other local DSN address range in the address sector exists, determining whether to transfer identified encoded data slices into the other local DSN address range. When the at least some of the identified encoded data slices are to be transferred, the method continues with the DS processing module initiating a data transfer protocol to transfer the identified encoded data slices.

16 Claims, 31 Drawing Sheets

(51) Int. Cl.

| | | |
|---|---|---|
| *G06F 12/06* | (2006.01) | |
| *G06F 12/14* | (2006.01) | |
| *G06F 21/00* | (2013.01) | |
| *G06F 3/06* | (2006.01) | |
| *H04L 9/08* | (2006.01) | |
| *G06F 11/10* | (2006.01) | |
| *H04L 29/08* | (2006.01) | |

(52) U.S. Cl.
CPC ..... *G06F 2211/1028* (2013.01); *H04L 63/0428* (2013.01); *H04L 67/1097* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2008/0196017 A1* | 8/2008 | Ritzau et al. ................ 717/154 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0107078 A1* | 5/2011 | Resch et al. ................ 713/150 |
| 2011/0153978 A1* | 6/2011 | Chalemin et al. ............ 711/171 |
| 2013/0138706 A1* | 5/2013 | Dhuse et al. ................ 707/827 |
| 2013/0198472 A1* | 8/2013 | Fang et al. ................... 711/162 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

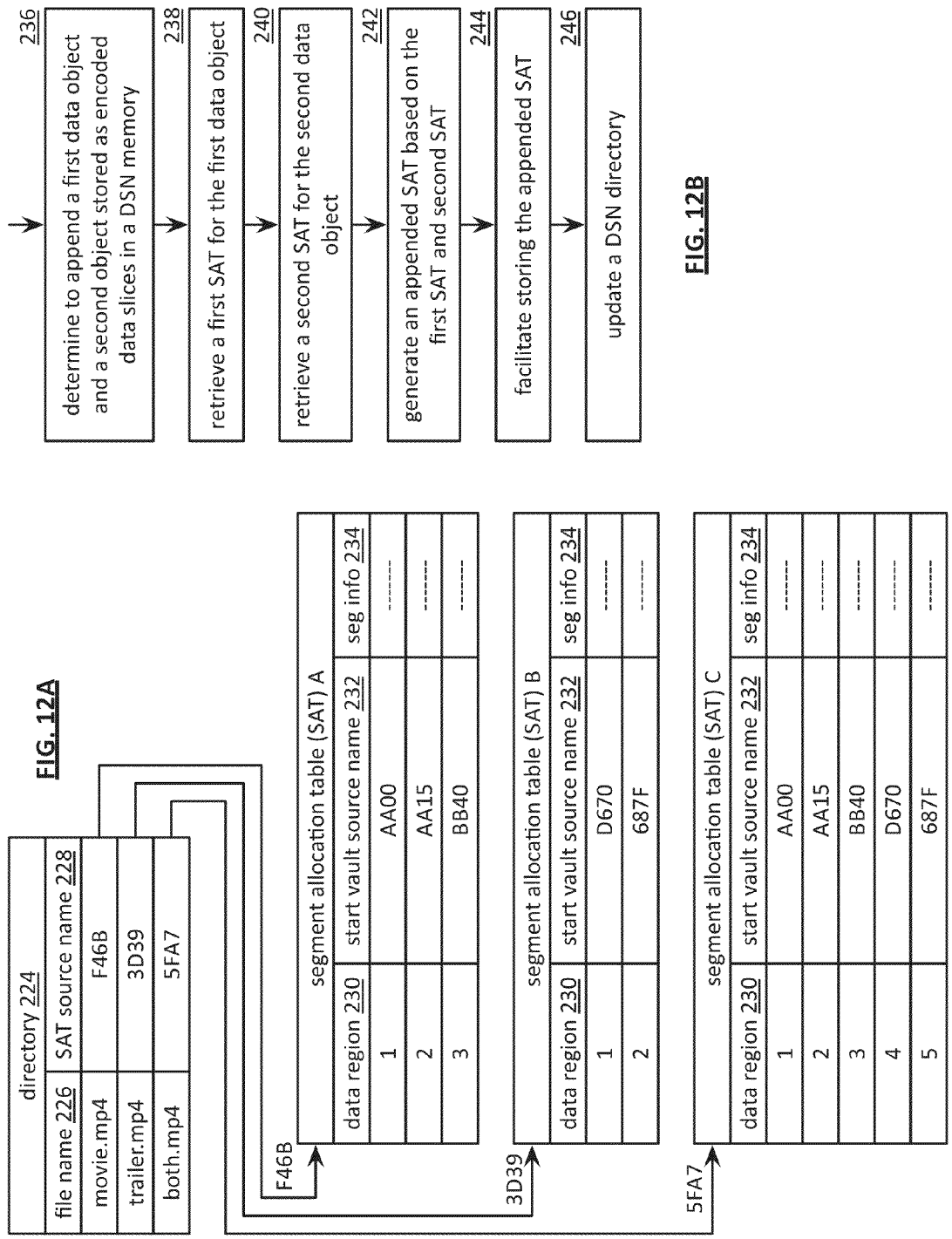

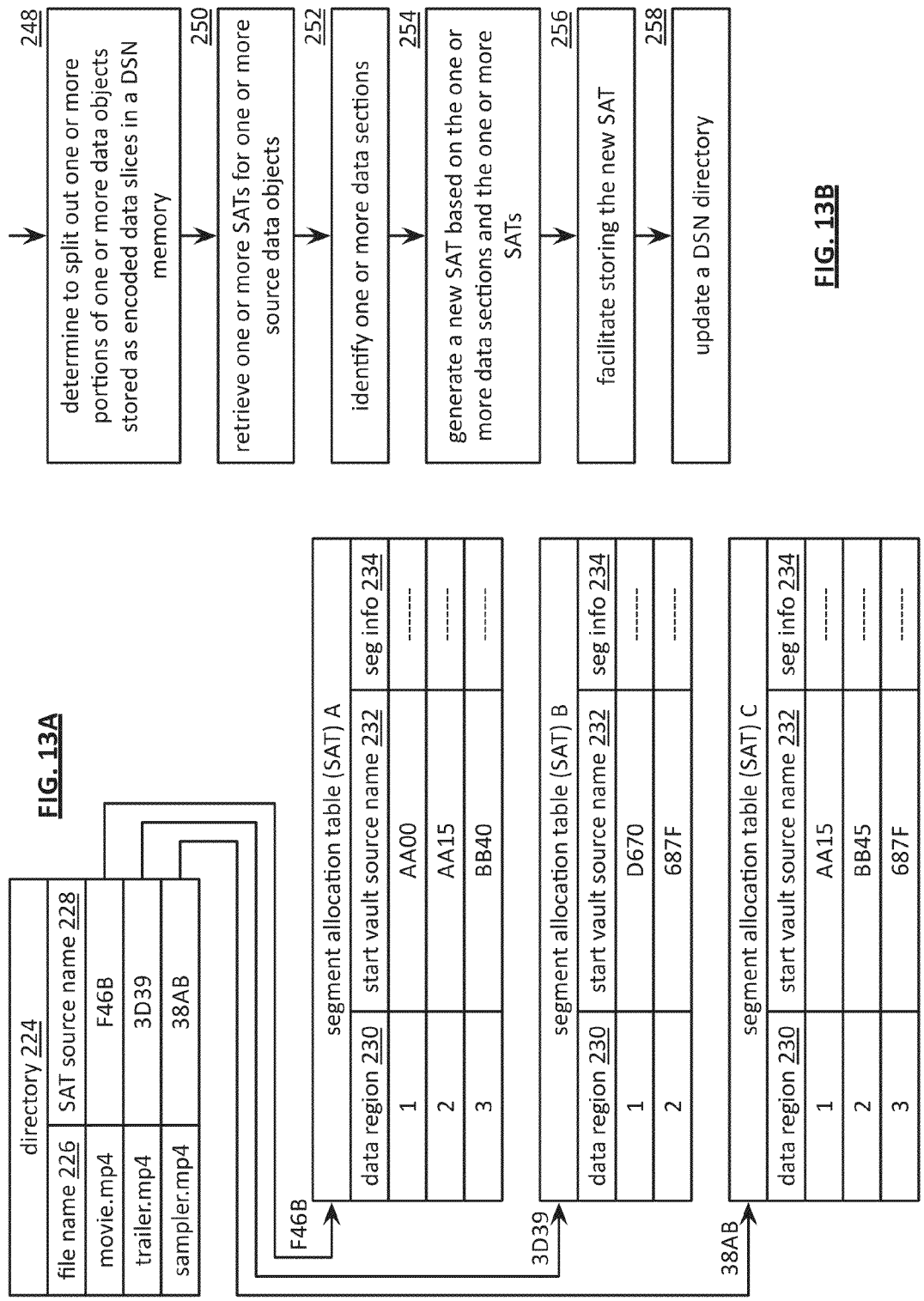

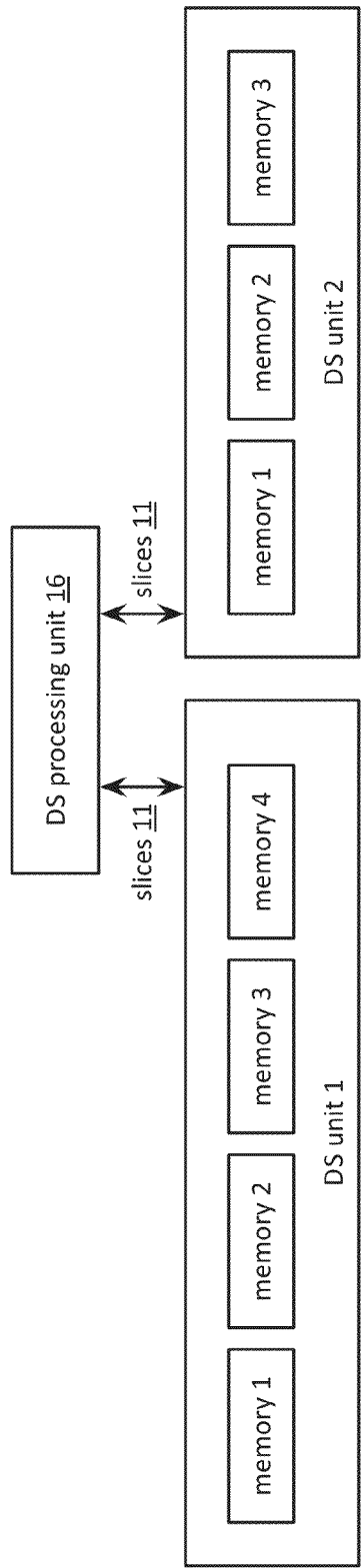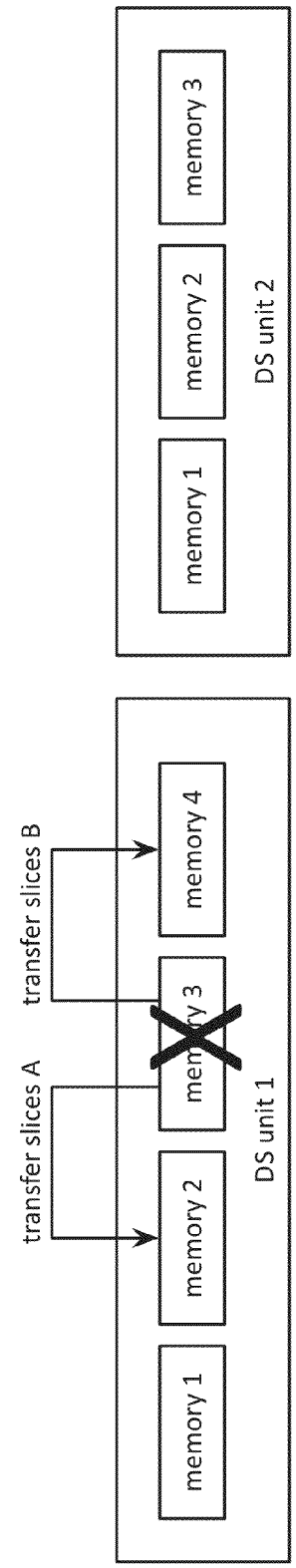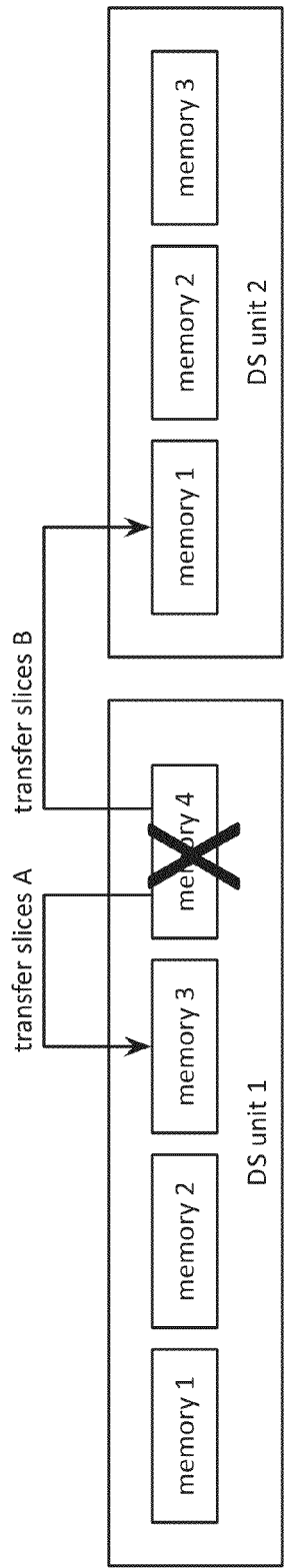

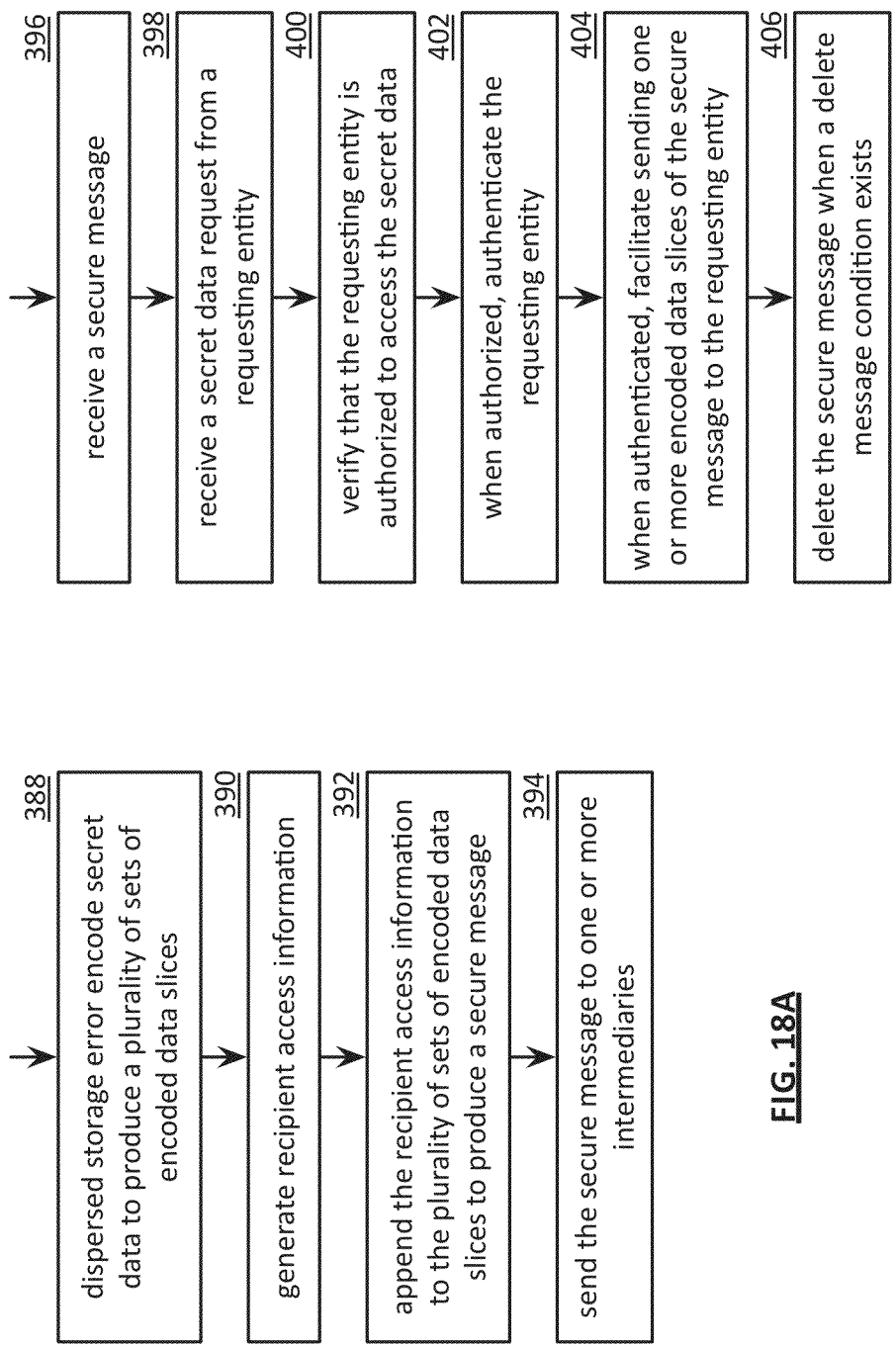

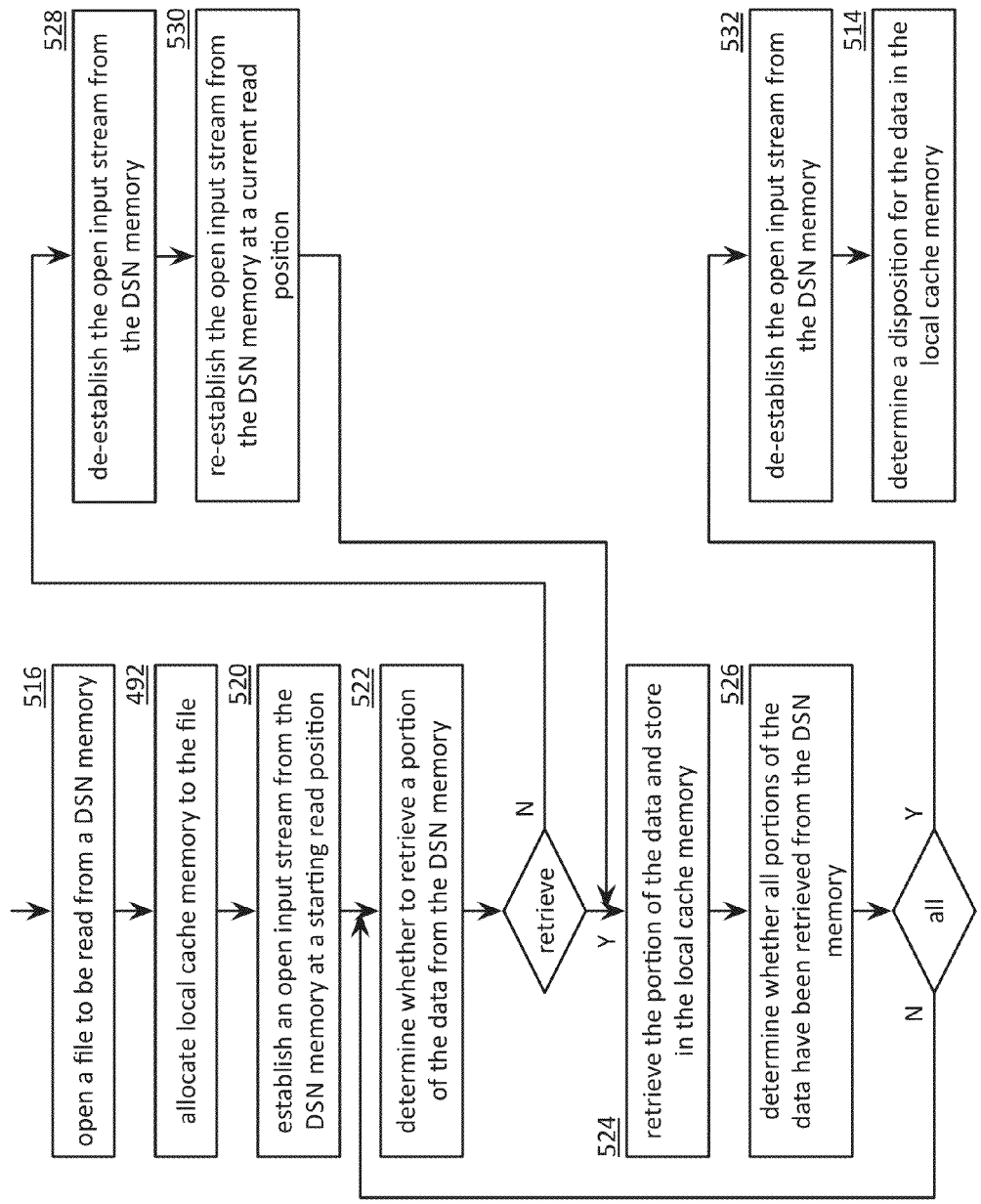

TRANSFERRING ENCODED DATA SLICES IN A DISTRIBUTED STORAGE NETWORK

CROSS REFERENCE TO RELATED PATENTS

The present U.S. Utility patent application claims priority pursuant to 35 U.S.C. §119(e) to U.S. Provisional Application No. 61/564,185, entitled "Optimizing Performance of Dispersed Storage Network," filed Nov. 28, 2011, which is incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 12A is a diagram illustrating another directory and segment allocation table structure in accordance with the present invention;

FIG. 12B is a flowchart illustrating an example of stitching data stored in a dispersed storage network in accordance with the present invention;

FIG. 13A is a diagram illustrating another directory and segment allocation table structure in accordance with the present invention;

FIG. 13B is a flowchart illustrating an example of splitting data stored in a dispersed storage network in accordance with the present invention;

FIG. 14A is a schematic block diagram of another embodiment of a computing system in accordance with the present invention;

FIG. 14B is a schematic block diagram of another embodiment of a computing system in accordance with the present invention;

FIG. 14C is a schematic block diagram of another embodiment of a computing system in accordance with the present invention;

FIG. 18A is a flowchart illustrating an example of sending a secure message in accordance with the present invention;

FIG. 18B is a flowchart illustrating an example of processing a secure message in accordance with the present invention;

FIG. 21 is a flowchart illustrating an example of inputting data in accordance with the present invention.

DETAILED DESCRIPTION OF THE INVENTION

Figure 1:
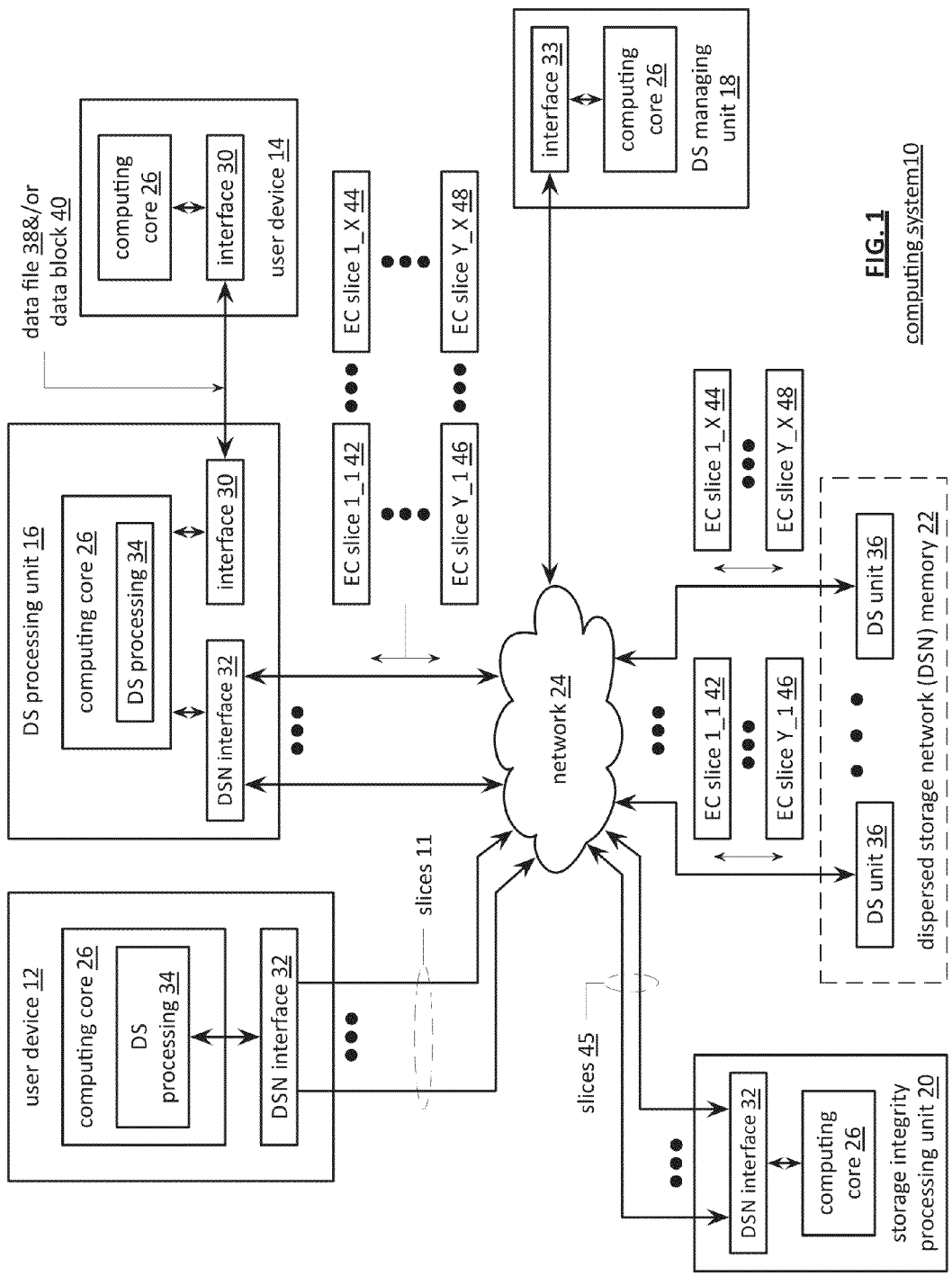
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
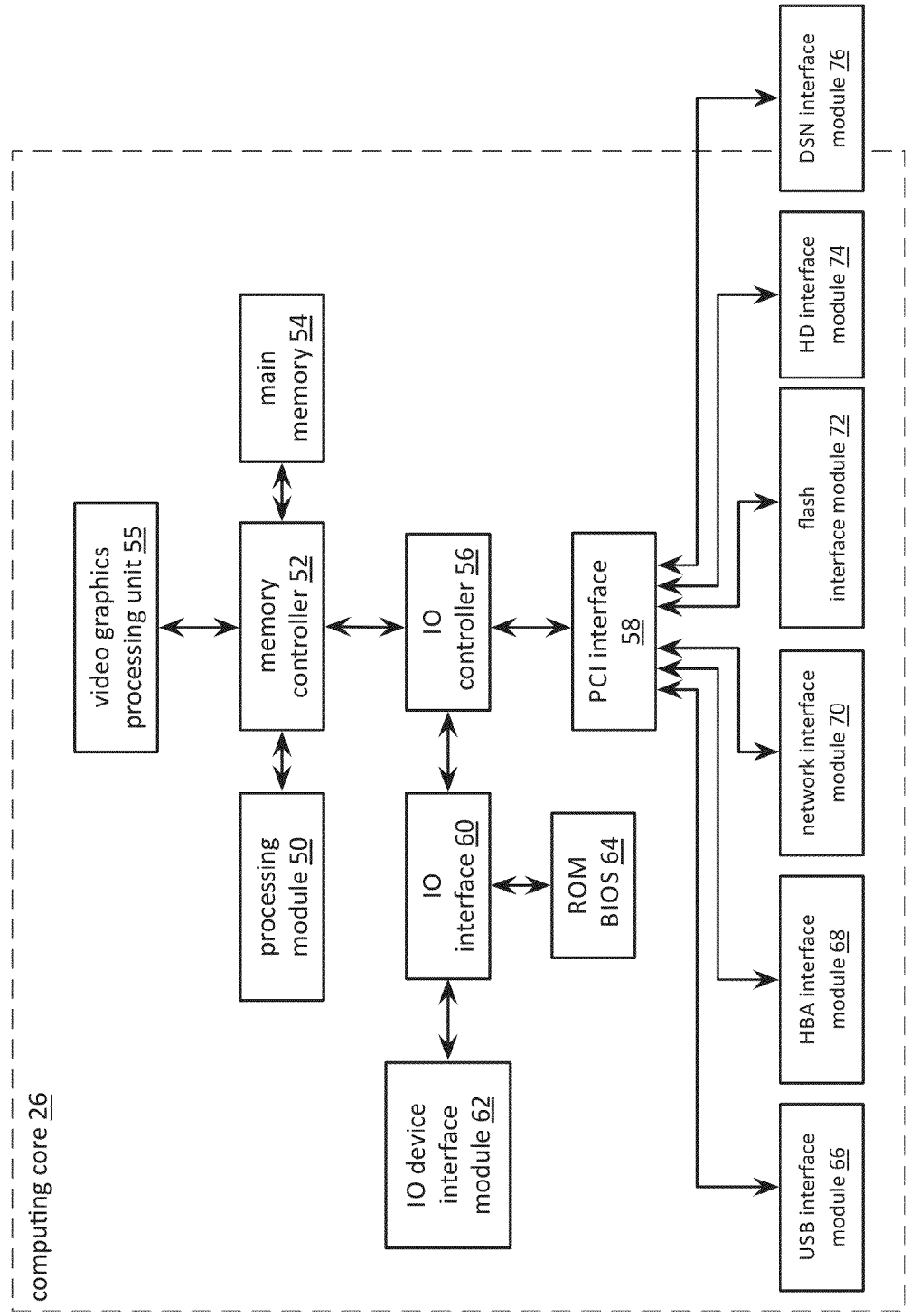
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO interface module 62 and/or the memory interface modules may be collectively or individually referred to as IO ports.

Figure 3:
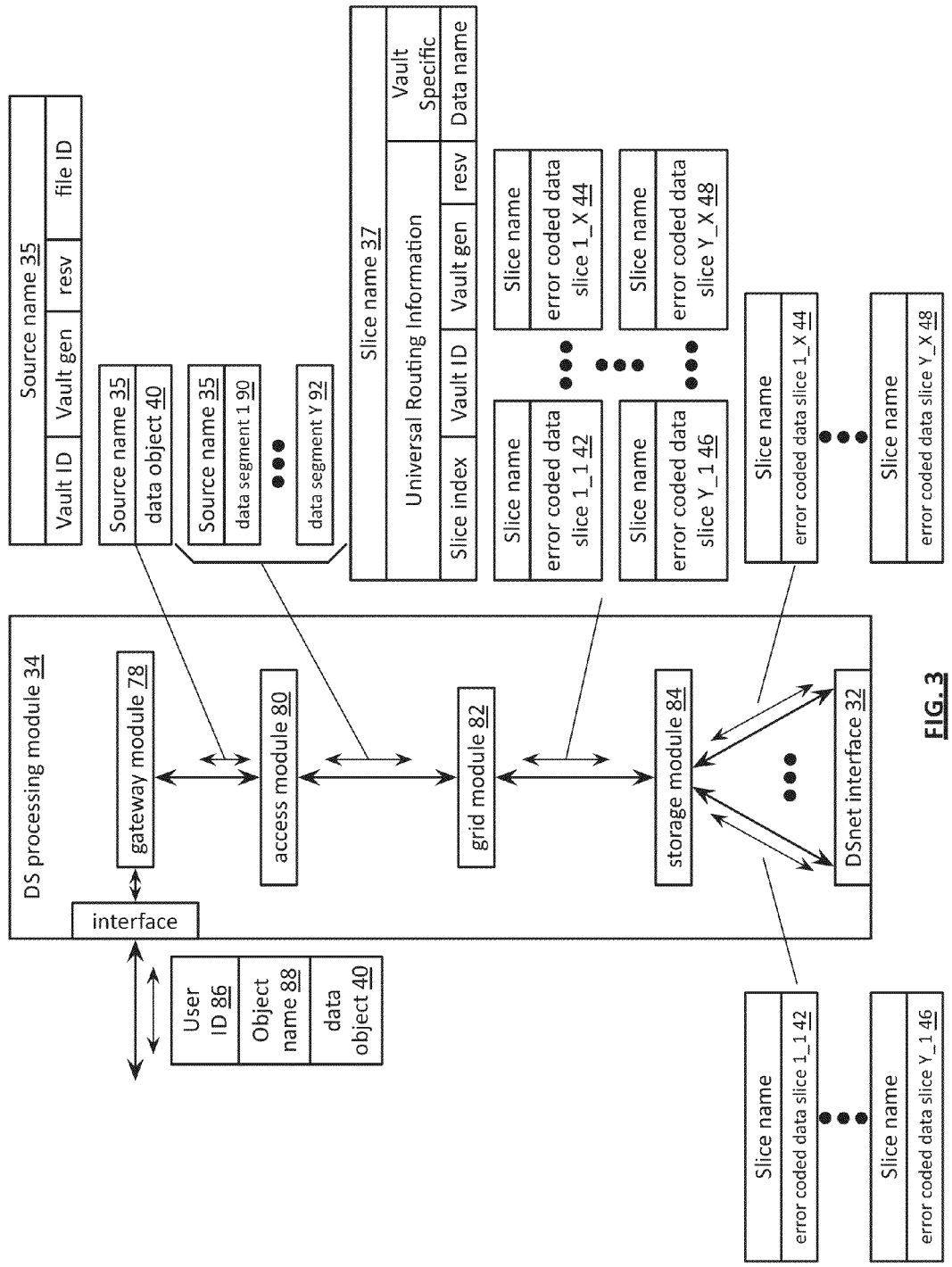
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
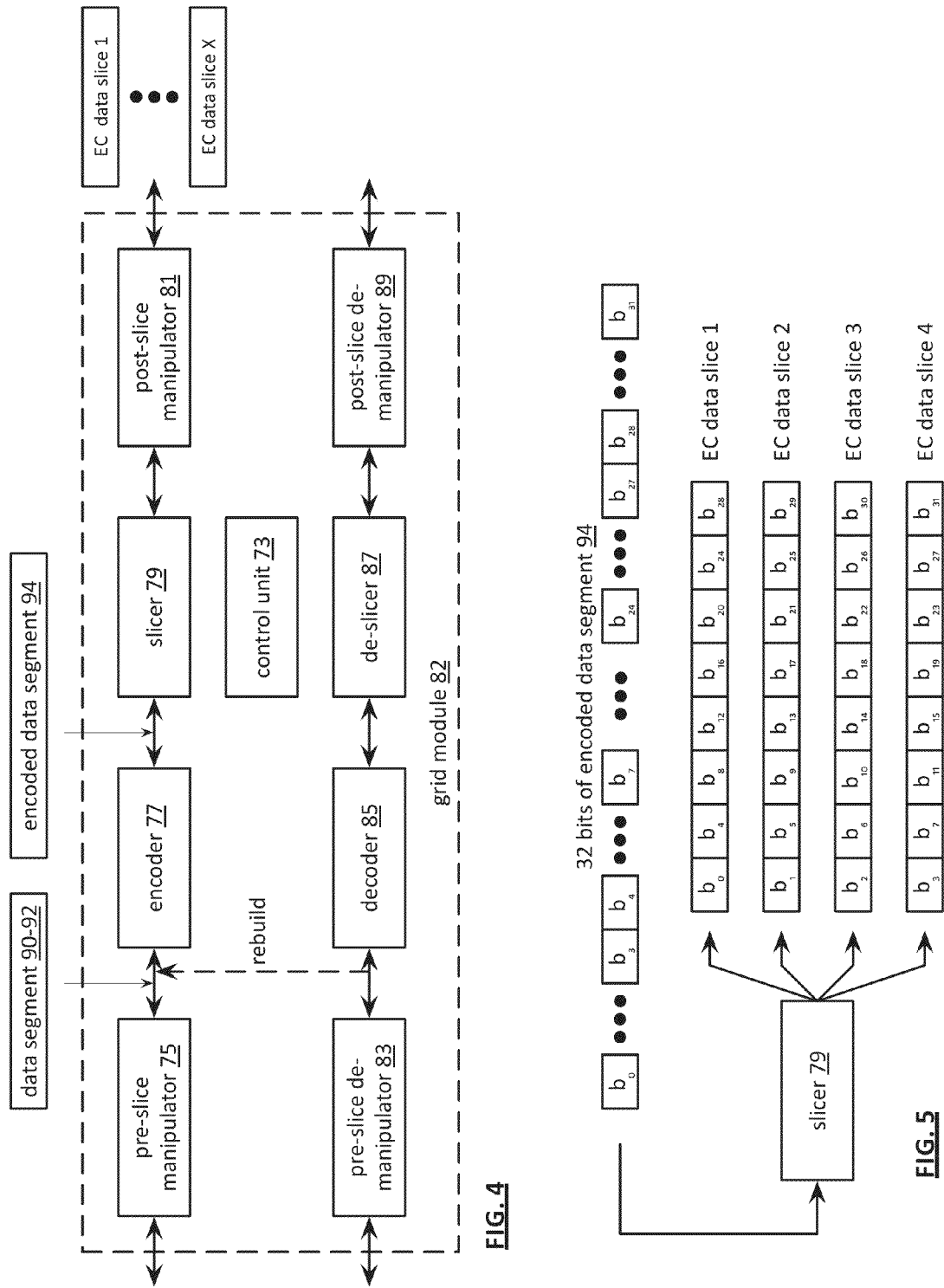
FIG. 4 is a schematic block diagram of an embodiment of a grid module in accordance with the present invention.
FIG. 5 is a diagram of an example embodiment of error coded data slice creation in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, bytes, data words, etc., but may include more or less bits, bytes, data words, etc. The slicer 79 disperses the bits of the encoded data segment 94 across the EC data slices in a pattern as shown. As such, each EC data slice does not include consecutive bits, bytes, data words, etc. of the data segment 94 reducing the impact of consecutive bit, byte, data word, etc. failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
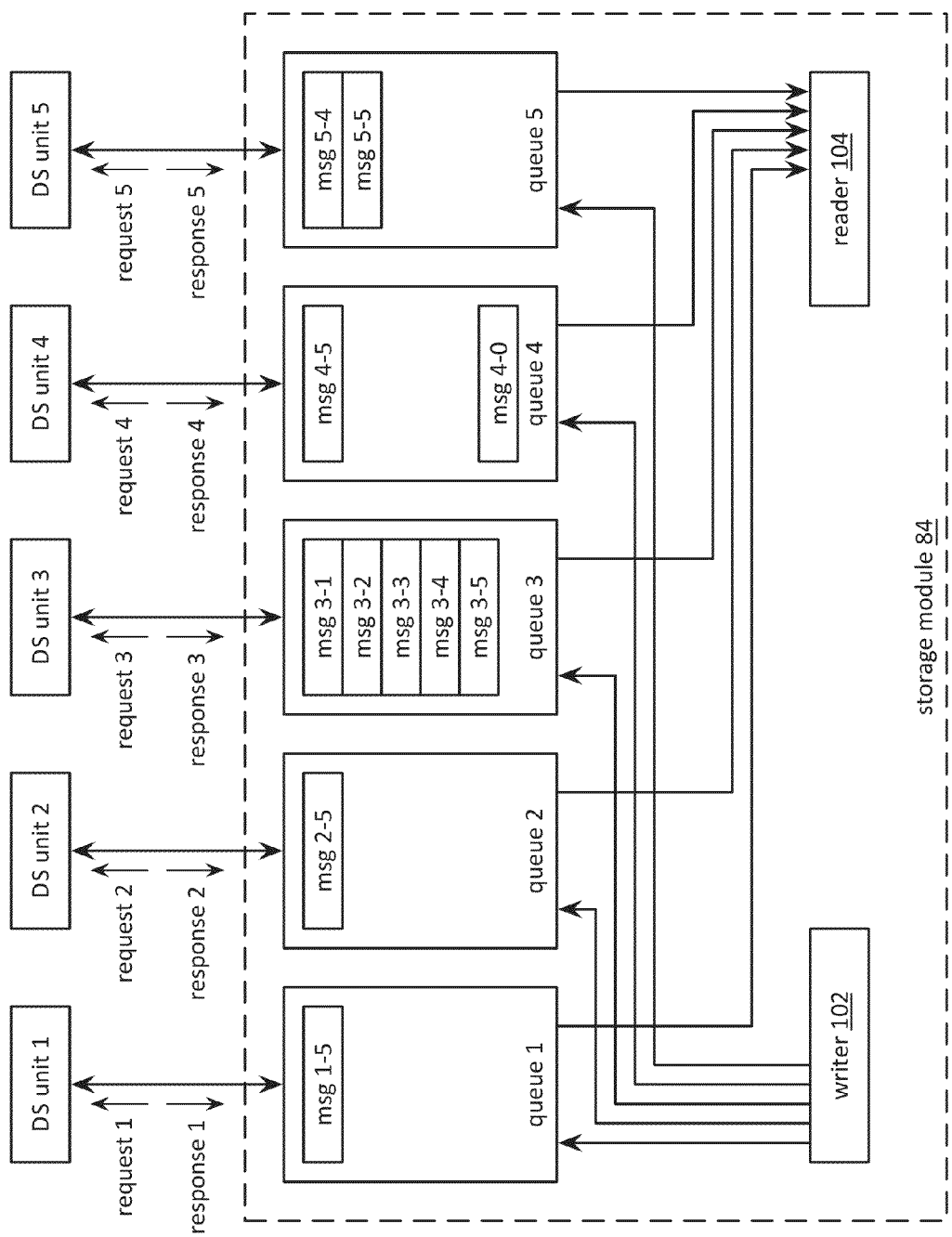
FIG. 6A is a schematic block diagram of an embodiment of a storage module in accordance with the present invention.

FIG. 6A is a schematic block diagram of an embodiment of a storage module 84 that includes a writer 102, a reader 104, and queues 1-5. The writer 102 generates messages for transmission to one or more DS units of DS units 1-5. The reader 104 interprets messages received from the one or more DS units of DS units 1-5. The messages include request messages and response messages. Messages transmitted from the storage module 84 to DS units 1-5 include requests 1-5. Messages that the storage module 84 receives from DS units 1-5 include responses 1-5.

Each queue of queues 1-5 may be implemented as one or more of a physical memory device, a plurality of memory devices, and a virtual allocation of storage capacity of one or more memory devices. Each queue may be associated with a fixed storage capacity. Each queue of queues 1-5 temporarily stores messages received from a DS unit waiting to be processed by the reader 104 or messages from the writer 102 to be transmitted to a DS unit. For example, the writer 102 stores message 3-5 in queue 3 for transmission to DS unit 3. Message 3-5 are sent to DS unit 3 via a network when message 3-5 are to be transmitted in accordance with a queue prioritization scheme.

The queue prioritization scheme may be based on one or more of a number of messages associated with the queue (e.g., pending messages), a prioritization approach (e.g., first in first out (FIFO), last in last out (LIFO)), a prioritization level associated with each of the messages associated with the queue, a network performance level, a DS unit performance level, and an order of message receipt by the queue. For instance, queue 3 outputs message 3-5 to DS unit 3 when messages 3-1 through 3-4 have been successfully sent in accordance with a FIFO prioritization approach of the queue prioritization scheme. As another instance, queue 3 outputs message 3-5 to DS unit 3 when message 3-1 has been successfully sent and prior to sending of messages 3-2 through 3-4 when a prioritization level associated with message 3-5 is greater than a privatization level associated with messages 3-2 through 3-4 and the prioritization level associated with message 3-5 is lower than a privatization level associated with message 3-1. As another example, queue 4 receives message 4-0 from DS unit 4 to be read by the reader 104. Queue 4 outputs message 4-0 to the reader 104 in accordance with the queue prioritization scheme.

The storage module 84 may delete a message stored in a queue when the message is outputted and is no longer required. The storage module 84 may change a message priority level of the message after message has been stored in a queue to affect a modified message transmission order. The storage module 84 may delete the message stored in the queue when the message is no longer required. The method to determine whether the message is no longer required, to delete the message, and to change the message priority is discussed in greater detail with reference to FIGS. 6B-10.

Figure 6B:
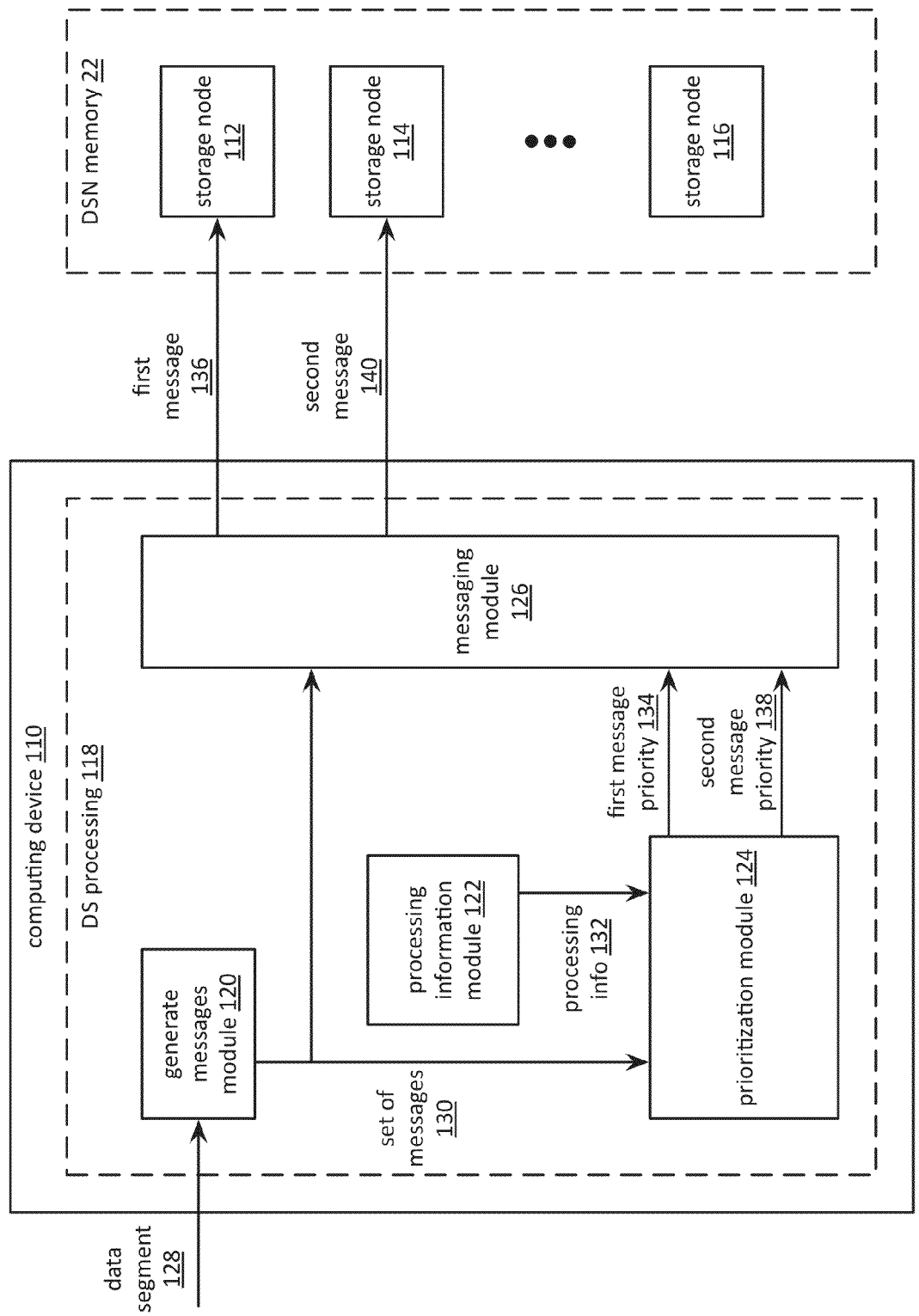
FIG. 6B is a schematic block diagram of another embodiment of a computing system in accordance with the present invention.

FIG. 6B is a schematic block diagram of another embodiment of a computing system that includes a computing device 110 and a dispersed storage network (DSN) memory 22 of a dispersed storage network. The DSN memory 22 includes a plurality of storage nodes 112-116. The computing device 110 includes a dispersed storage (DS) processing 118. The computing device 110 may be implemented as at least one of a user device, a DS processing unit, and a DS unit. The DS processing 118 includes a generate messages module 120, a processing information module 122, a prioritization module 124, and a messaging module 126. The system functions to access the DSN memory 22 with regards to a set of encoded data slices. The accessing includes at least one of reading the set of encoded data slices from the DSN memory 22 and writing the set of encoded data slices to the DSN memory 22. A data segment 128 of data is encoded using a dispersed storage error coding function to produce the set of encoded data slices. The generate messages module 120 receives the data segment 128 when the accessing includes writing the set of encoded data slices to the DSN memory 22. For example, the generate messages module 120 receives the data segment 128 and encodes the data segment 128 to produce the set of encoded data slices when the accessing includes writing the set of encoded data slices to the DSN memory 22. As another example, the DS processing 118 generates the data segment 128 and encodes the data segment 128 to produce the set of encoded data slices when the accessing includes writing the set of encoded data slices to the DSN memory 22. Alternatively, the generate messages module 120 receives the set of encoded data slices.

The generate messages module 120 generates a set of messages 130 regarding the set of encoded data slices. The set of messages 130 includes a set of read messages to read the set of encoded data slices from the DSN memory 22 when the accessing includes reading the set of encoded data slices from the DSN memory 22. A read message of the set of read messages includes a read slice request. For example, the generate messages module 120 generates a set of read slice requests that includes a set of slice names corresponding to the set of encoded data slices. The set of messages 130 includes a set of write messages to write the set of encoded data slices to the DSN memory 22 when the accessing includes writing the set of encoded data slices to the DSN memory 22. A write message of the set of write messages includes a write slice request. For example, the generate messages module 120 generates a set of write slice requests that includes the set of encoded data slices and the set of slice names corresponding to the set of encoded data slices.

The processing information module 122 determines system-level message processing information 132 based on status of processing a plurality of sets of messages regarding a plurality of sets of encoded data slices. The plurality of sets of messages regarding the plurality of sets of encoded data slices may include numerous other write and read accesses of other encoded data slices within at least one storage node of the plurality of storage nodes 112-116. The processing information module 122 determines the system-level message processing information 132 by a series of steps. A first step includes, for a first set of messages of the plurality of sets of messages, determining at least one of: a current status of sending the first set of messages (e.g., the first set of messages have been sent to the DSN memory 22), and a current status of successfully processing the first set of messages. The determining includes at least one of initiating a query, performing a lookup, executing a test, accessing historical records, and accessing the messaging module 126. The processing of the first set of messages includes at least one of retrieving and writing the set of encoded data slices. For example, a current status of sending the first set of messages indicates that 5 messages of a set of 16 messages have been sent. Successfully processing the first set of messages may include at least one of retrieving at least a decode threshold number of encoded data slices of the set of encoded data slices and writing at least a write threshold number of encoded data slices of the set of encoded data slices. For example, a current status of successfully processing the first set of messages indicates successful processing when 11 encoded data slices have been retrieved when a decode threshold number is 10. As another example, a current status of successfully processing the first set of messages indicates unsuccessful processing when 12 encoded data slices have been sent when a write threshold number is 13.

A second step of determining the system-level message processing information includes, for a second set of messages of the plurality of sets of messages, determining at least one of: a current status of sending the second set of messages, and a current status of successfully processing the second set of messages. Alternatively, or in addition to, more steps may be included in the series of steps including determining status with regards to further sets of messages of the plurality of sets of messages. A third step includes, determining the status of processing the plurality of sets of messages regarding the plurality of sets of encoded data slices based on the at least one of the current status of sending the first set of messages and the current status of successfully processing of the first set of messages, and the at least one of the current status of sending the second set of messages, and the current status of successfully processing of the second set of messages. The determining includes at least one of aggregating status, selecting status, and confirming status. For example, the processing information module 122 determines the status of processing the plurality sets of messages regarding the plurality of sets of encoded data slices by aggregating current status associated with 10 sets of messages when the plurality of sets of messages includes 10 sets of messages.

For a first message 136 of the set of messages 130, the prioritization module 124 determines a first message priority 134 based on the system-level message processing information 132 and message processing status of a first storage node 112 of the plurality of storage nodes 112-116. The prioritization module 124 determines the message processing status of the first storage node 112 by a series of steps. A first step includes determining a number of sets of the plurality of sets of messages that involves the first storage node (e.g., messages to be sent to the first storage node 112). A second step includes determining status of sending messages of the number of sets of the plurality of sets of messages to the first storage node 112. A third step includes determining status of successfully processed messages of the number of sets of the plurality of sets of messages by the first storage node 112. A fourth step includes determining the message processing status of the first storage node 112 based on the status of sending messages and the status of successfully processed messages.

The prioritization module 124 determines the first message priority 134 by a series of steps. A first step includes determining the number of sets of the plurality of sets of messages that involves the first storage node 112. A second step includes interpreting the system-level message processing information 132 regarding the number of sets that involve the first storage node 112 to produce interpreted system-level message processing information. A third step includes interpreting the message processing status of the first storage node 112 regarding the number of sets that involve the first storage node 112 to produce interpreted message processing status. A fourth step includes applying a load balancing function in accordance the interpreted system-level message processing information and the interpreted message processing status to produce the first message priority 134. The load balancing function includes at least one of a first in first out function, a last in first out function, a time-based function, and a threshold-based function. For example, the prioritization module 124 produces the first message priority 134 to include a lower than average priority level when the interpreted system-level message processing information indicates that a plurality of other messages are pending to be sent to the first storage node 112 where the plurality of other messages are associated with sets of encoded data slices that have not achieved processing of a threshold number of each set of the sets of encoded data slices. The messaging module 126 sends the first message 136 of the set of messages 130 to the first storage node 112 in accordance with the first message priority 134. For example, the messaging module 126 sends the first message 136 to the first storage node 112 subsequent to sending another message to the first storage node 112 when a message priority of the other message has greater priority than priority of the first message priority 134.

For a second message 140 of the set of messages 130, the prioritization module 124 determines a second message priority 138 based on the system-level message processing information 132 and message processing status of a second storage node 114 of the plurality of storage nodes 112-116. The messaging module 126 sends the second message 140 of the set of messages 130 to the second storage node 114 in accordance with the second message priority 138. For example, the messaging module 126 sends the second message 140 to the second storage node 114 prior to sending a different message to the second storage node 114 when a message priority of the different message has less priority than priority of the second message priority 138.

The system further functions to update message priorities. The prioritization module 124 updates the first message priority 134 based on status of processing the set of messages 130. The prioritization module 124 updates the second message priority 138 based on status of processing the set of messages 130. The updating of message priority includes updating message priority associated with writing the set of encoded data slices to the DSN memory 22 and reading the set of encoded data slices from the DSN memory 22. The status of processing the sets of messages 130 includes status with regards to at least one of a number of messages of the set of messages that have been sent and/or processed and a number of messages of the set of messages that have been sent and/or processed within a given time period.

When the set of messages 130 includes the set of write messages to write the set of encoded data slices to the DSN memory 22, the messaging module 126 determines when a write threshold number of the set of write messages have been sent to the DSN memory 22. When the write threshold number of the set of write messages have been sent and the first message 136 has not yet been sent to the first storage node 112, the prioritization module 124 reduces the first message priority 134. Alternatively, the messaging module 126 determines when a write threshold number of the set of write messages have been successfully processed by the DSN memory 22. When the write threshold number of the set of write messages have been successfully processed and the first message 136 has not yet been sent to the first storage node 112, the prioritization module 124 reduces the first message priority 134.

When the set of messages 130 includes the set of read messages to read the set of encoded data slices from the DSN memory 22, the messaging module 126 determines when a decode threshold number of the set of read messages have been sent to the DSN memory 22. When the decode threshold number of the set of read messages have been sent and the first message 136 has not yet been sent to the first storage node 112, the prioritization module 124 reduces the first message priority 134. Alternatively, the messaging module 126 determines when a decode threshold number of the set of read messages have been successfully processed by the DSN memory 22. When the decode threshold number of the set of read messages have been successfully processed and the first message 136 has not yet been sent to the first storage node 112, the prioritization module 124 reduces the first message priority 134.

When the set of messages 130 includes the set of write messages to write the set of encoded data slices to the DSN memory 22, the messaging module 126 determines that a write threshold number of the set of write messages have not been sent to DSN memory 22 within a given time frame. When the write threshold number of the set of write messages have not been sent in the given time period and the first message 136 has not yet been sent to the first storage node 112 within the given time period, the prioritization module 124 increases the first message priority 134.

Alternatively, when the set of messages 130 includes the set of write messages to write the set of encoded data slices to the DSN memory 22, the messaging module 126 determines when a write threshold number of the set of write messages have not been successfully processed by the DSN memory 22 within a given time period. When the write threshold number of the set of write messages have not been successfully processed within the given time period and the first message 136 has not yet been sent to the first storage node 112, the prioritization module 124 increases the first message priority 134.

When the set of messages includes a set of read messages to read the set of encoded data slices from the DSN memory 22, the messaging module 126 determines when a decode threshold number of the set of read messages have not been sent to the DSN memory 22 within a given time period. When the decode threshold number of the set of read messages have not been sent within the given time period and the first message 136 has not yet been sent to the first storage node 112 in the given time period, the prioritization module 124 increases the first message priority 134.

Alternatively, when the set of messages 130 includes the set of read messages to read the set of encoded data slices from the DSN memory 22, the messaging module 126 determines when a decode threshold number of the set of read messages have not been successfully processed by the DSN memory 22 within a given time period. When the decode threshold number of the set of read messages have not been successfully processed within the given time period and the first message 136 has not yet been sent to the first storage node 112, the prioritization module 124 increases the first message priority 134.

Figure 6C:
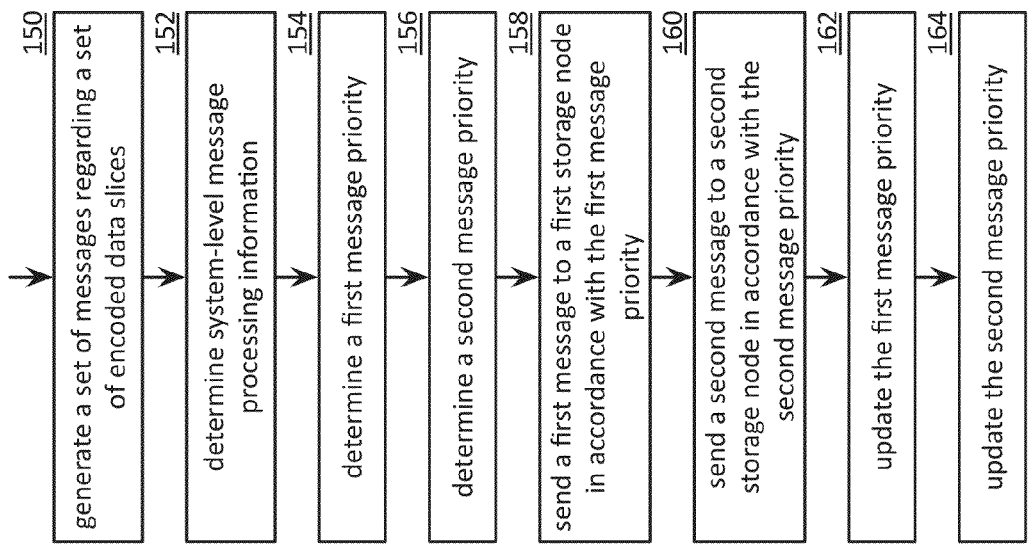
FIG. 6C is a flowchart illustrating an example of prioritizing messages in accordance with the present invention.

FIG. 6C is a flowchart illustrating an example of prioritizing messages. The method begins at step 150 where a processing module (e.g., of a dispersed storage (DS) processing) generates a set of messages regarding a set of encoded data slices. The set of messages may be utilized to access a dispersed storage network (DSN) including writing the set of encoded data slices to the DSN and reading the set of encoded data slices from the DSN. A data segment of data is encoded using a dispersed storage error coding function to produce the set of encoded data slices.

The method continues at step 152 where the processing module determines system-level message processing information based on status of processing a plurality of sets of messages regarding a plurality of sets of encoded data slices. The determining system-level message processing information includes a series of steps. A first step includes, for a first set of messages of the plurality of sets of messages, determining at least one of: a current status of sending the first set of messages, and a current status of successfully processing of the first set of messages. A second step includes, for a second set of messages of the plurality of sets of messages, determining at least one of: a current status of sending the second set of messages, and a current status of successfully processing of the second set of messages. A third step includes determining the status of processing the plurality of sets of messages regarding the plurality of sets of encoded data slices based on the at least one of the current status of sending the first set of messages and the current status of successfully processing of the first set of messages, and the at least one of the current status of sending the second set of messages, and the current status of successfully processing of the second set of messages.

For a first message of the set of messages, the method continues at step 154 where the processing module determines a first message priority based on the system-level message processing information and message processing status of a first storage node of the DSN. The processing module determines the message processing status of the first storage node by a series of steps. A first step includes determining a number of sets of the plurality of sets of messages that involves the first storage node. A second step includes determining status of sending messages of the number of sets of the plurality of sets of messages to the first storage node. A third step includes determining status of successfully processed messages of the number of sets of the plurality of sets of messages by the first storage node. A fourth step includes determining the message processing status of the first storage node based on the status of sending messages and the status of successfully processed messages.

The processing module determines the first message priority by a series of steps. A first step includes determining a number of sets of the plurality of sets of messages that involves the first storage node. A second step includes interpreting the system-level message processing information regarding the number of sets that involve the first storage node to produce interpreted system-level message processing information. A third step includes interpreting the message processing status of the first storage node regarding the number of sets that involve the first storage node to produce interpreted message processing status. A fourth step includes applying a load balancing function in accordance the interpreted system-level message processing information and the interpreted message processing status to produce the first message priority.

For a second message of the set of messages, the method continues at step 156 where the processing module determines a second message priority based on the system-level message processing information and message processing status of a second storage node. The method continues at step 158 where the processing module sends the first message of the set of messages to the first storage node in accordance with the first message priority. The method continues at step 160 where the processing module sends the second message of the set of messages to the second storage node in accordance with the second message priority.

The method continues at step 162 where the processing module updates the first message priority based on status of processing the set of messages by a variety of approaches. A first approach includes, when the set of messages includes a set of write messages to write the set of encoded data slices to the DSN, the processing module determines when a write threshold number of the set of write messages have been sent to the dispersed storage network. When the write threshold number of the set of write messages have been sent and the first message has not yet been sent to the first storage node, the processing module updates the first message priority by reducing the first message priority. A second approach includes the processing module determining when a write threshold number of the set of write messages have been successfully processed by the dispersed storage network. When the write threshold number of the set of write messages have been successfully processed and the first message has not yet been sent to the first storage node, the processing module updates the first message priority by further reducing the first message priority.

A third approach includes, when the set of messages includes a set of read messages to read the set of encoded data slices from the DSN, the processing module determines when a decode threshold number of the set of read messages have been sent to the DSN. When the decode threshold number of the set of read messages have been sent and the first message has not yet been sent to the first storage node, the processing module updates the first message priority by reducing the first message priority. A fourth approach includes the processing module determining when a decode threshold number of the set of read messages have been successfully processed by the dispersed storage network. When the decode threshold number of the set of read messages have been successfully processed and the first message has not yet been sent to the first storage node, the processing module updates the first message priority by further reducing the first message priority.

A fifth approach includes, when the set of messages includes a set of write messages to write the set of encoded data slices to the DSN, the processing module determines that a write threshold number of the set of write messages have not been sent to the dispersed storage network within a given time frame. When the write threshold number of the set of write messages have not been sent in the given time period and the first message has not yet been sent to the first storage node within the given time period, the processing module updates the first message priority by increasing the first message priority. A sixth approach includes, when the set of messages includes the set of write messages to write the set of encoded data slices to the DSN, the processing module determines when a write threshold number of the set of write messages have not been successfully processed by the dispersed storage network within a given time period. When the write threshold number of the set of write messages have not been successfully processed within the given time period and the first message has not yet been sent to the first storage node, the processing module updates the first message priority by increasing the first message priority.

A seventh approach includes, when the set of messages includes the set of read messages to read the set of encoded data slices from the DSN, the processing module determines when a decode threshold number of the set of read messages have not been sent to a dispersed storage network within a given time period. When the decode threshold number of the set of read messages have not been sent within the given time period and the first message has not yet been sent to the first storage node in the given time period, the processing module updates the first message priority by increasing the first message priority.

An eighth approach includes, when the set of messages including the set of read messages to read the set of encoded data slices from the DSN, the processing module determines when a decode threshold number of the set of read messages have not been successfully processed by the dispersed storage network within a given time period. When the decode threshold number of the set of read messages have not been successfully processed within the given time period and the first message has not yet been sent to the first storage node, the processing module updates the first message priority by increasing the first message priority. The method continues at step 164 where the processing module updates the second message priority based on the status of processing the set of messages.

Figure 7:
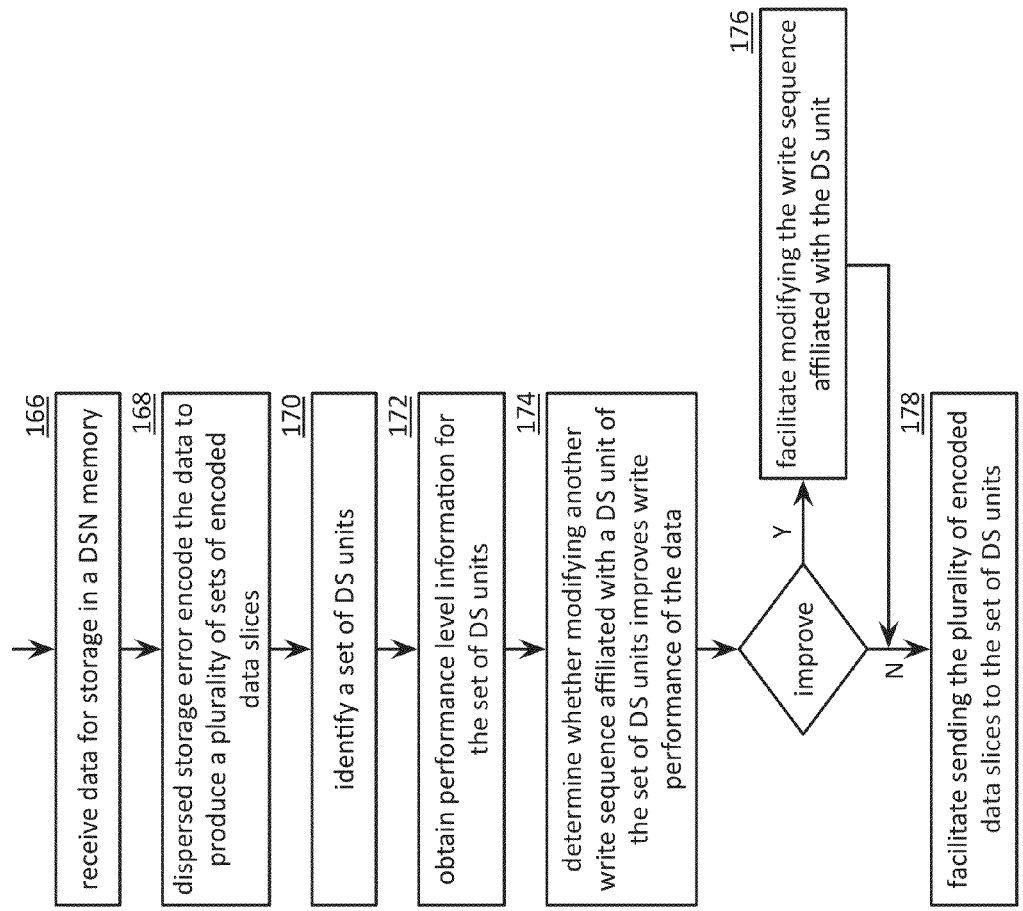
FIG. 7 is a flowchart illustrating an example of modifying a write sequence in accordance with the present invention.

FIG. 7 is a flowchart illustrating an example of modifying a write sequence. The method begins at step 166 where a processing module (e.g., of a dispersed storage (DS) processing module) receives data for storage in a dispersed storage network (DSN) memory. The receiving may include receiving one or more of a data object, a data file, a data stream (e.g., video, audio), a filename, an object identifier (ID), a data ID, a block ID, a source name, a vault source name, a segment allocation table vault source name, a user ID, a DSN resource ID, a vault ID, a DS unit ID, a DS unit storage set ID, a data size indicator, and a storage request. The method continues at step 168 where the processing module encodes the data using a dispersed storage error coding function to produce a plurality of sets of encoded data slices in accordance with dispersal parameters. The dispersal parameters may include one or more of a pillar width, a write threshold, a read threshold, a decode threshold, an error coding matrix, an information dispersal algorithm (IDA) ID, an encryption algorithm ID, and an encryption key.

The method continues at step 170 where the processing module identifies a set of DS units. The identifying may be based on one or more of a vault look up based on a user ID, a source name generated based on the data, an available to DS unit list, and a source name to DS unit ID table lookup. The method continues at step 172 where the processing module obtains performance level information for the set of DS units. The performance level information includes one or more of average latency for message transmission, average latency for receiving a message, queue resource utilization, number of messages in a queue (e.g., queue depth), write bandwidth utilization, and read bandwidth utilization. The obtaining may be based on one or more of a performance level historical record lookup, initiating a test, a query, and receiving the performance level information.

The method continues at step 174 where the processing module determines whether modifying another write sequence affiliated with a DS unit of the set of DS units improves write performance of the data. The determining may be based on one or more of the performance level information for the set of DS units and write sequence information of other active write sequences (e.g., a number of favorable write responses corresponding to each other active write sequence, a write threshold associated with each other active write sequence). For example, the processing module determines that modifying another write sequence affiliated with a DS unit of the DS units improves write performance of the data when the other write sequence has received a write threshold number of favorable write responses and there are one or more pending write requests associated with the other write sequence in one or more queues.

The method branches to step 178 when the processing module determines that modifying another write sequence affiliated with the DS unit of the set of DS units does not improve write performance of the data. The method continues to step 176 when the processing module determines that modifying another write sequence affiliated with the DS unit of the set of DS units improves write performance of the data. The method continues at step 176 where the processing module facilitates modifying the write sequence affiliated with the DS unit. The facilitating may be based on one or more of the performance level information, the write sequence information associated with the DS unit, and a modification approach. The modification approach includes selecting a write sequence to delete and/or reprioritize including at least one of selecting a write sequence associated with an oldest write sequence, selecting a write sequence associated with a lowest priority level, selecting a write sequence that has a most number of favorable write responses, selecting a write sequence that has at least a write threshold number of favorable write responses, and selecting a write sequence that has a most number of favorable write responses above an associated write threshold. The method continues to step 178.

Figure 8:
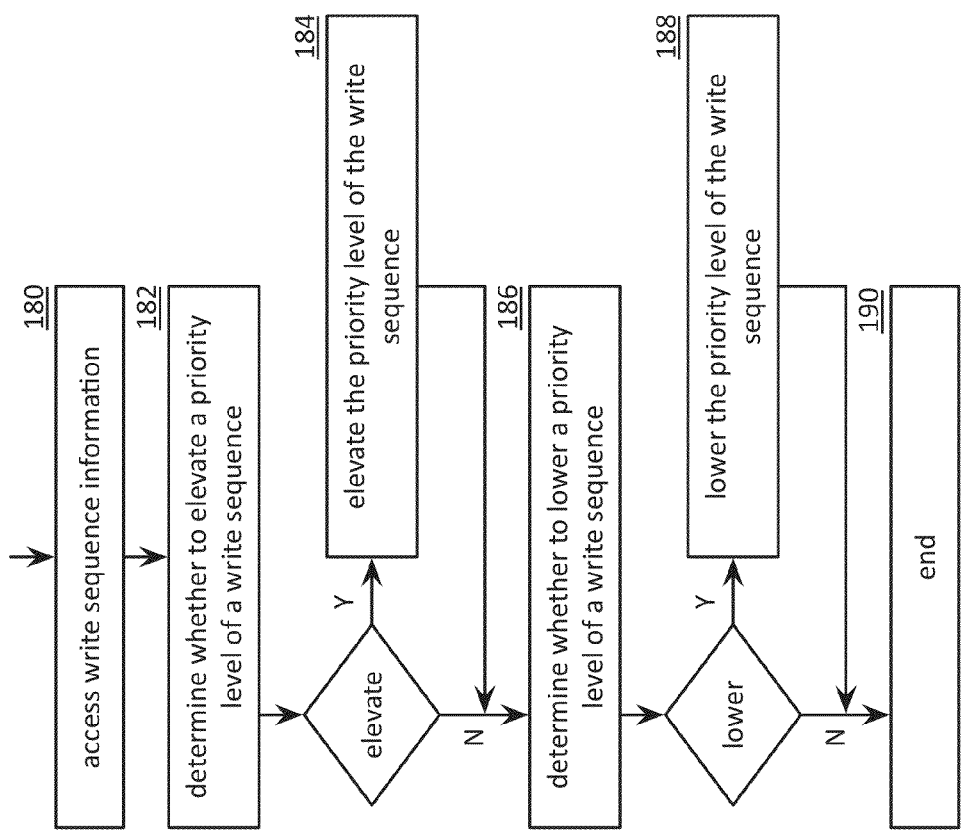
FIG. 8 is a flowchart illustrating another example of modifying a write sequence in accordance with the present invention.

The method continues at step 178 where the processing module facilitates sending the plurality of encoded data slices to the set of DS units. The facilitating includes one or more of generating a plurality of encoded data slice write requests that includes the plurality of sets of encoded data slices, establishing a priority level (e.g., in accordance with the modification of the write sequence affiliated with the DS unit) for at least one encoded data slice write request of the plurality of encoded data slice write requests, and storing the plurality encoded data slice write requests in corresponding queues for transmission to the set of DS units FIG. 8 is a flowchart illustrating another example of modifying a write sequence. The method begins at step 180 where a processing module (e.g., of a dispersed storage (DS) processing module) accesses write sequence information. The write sequence information includes one or more of a queue depth, a priority level of a pending request, age of a pending request, number of favorable write responses received so far, and a write threshold number. The accessing may be based on one or more of retrieving a message queue, lookup, receiving a request, a query, and an error message.

The method continues at step 182 where the processing module determines whether to elevate a priority level of a write sequence. The priority level of the write sequence may be utilized in determining a transmission order of two or more pending write request messages of a common queue such that a write request associated with a higher priority level is transmitted prior to a write request associated with a lower priority level. The determining may be based on of the access write sequence information. For example, the processing module determines to elevate the priority level of the write sequence when the write sequence is associated with an oldest write sequence of a plurality of write sequences that has not received a write threshold number of favorable write responses. Each write sequence of the plurality of write sequences may be associated with a different write threshold number. As another example, the processing module determines to elevate the priority level of the write sequence when the write sequence is associated with a highest priority write sequence of the plurality of write sequences that has not received the write threshold number of favorable write responses.

The method branches to step 186 when the processing module determines not to elevate the priority level of the write sequence. The method continues to step 184 when the processing module determines to elevate the priority level of the write sequence. The method continues at step 184 where the processing module elevates the priority level of the write sequence. The elevating of the priority level includes at least one of modifying a priority level indicator of an associated write request in a message queue to include a higher priority level number and reordering pending write requests in the queue such that highest priority requests will be transmitted next. The method continues to step 186.

The method continues at step 186 where the processing module determines whether to lower the priority level of the write sequence. The determining may be based on write sequence information. For example, the processing module determines to lower the priority level of the write sequence when the write sequence is associated with a write sequence of a plurality of write sequences that has received a write threshold number of favorable write responses. As another example, the processing module determines to lower the priority level of the write sequence when the write sequence is associated with a highest priority write sequence of the plurality of write sequences that has received the write threshold number of favorable write responses.

The method branches to step 190 when the processing module determines not to lower the priority level of the write sequence. The method continues to step 188 when the processing module determines to lower the priority level of the write sequence. The method continues at step 188 where the processing module lowers the priority level of the write sequence. The lowering of the priority level includes at least one of modifying a priority level indicator of an associated write request in a message queue to include a lower priority level number and reordering pending write requests in the queue such that highest priority requests will be transmitted next. The method continues to step 190. The method continues at step 190 where the method ends.

Figure 9:
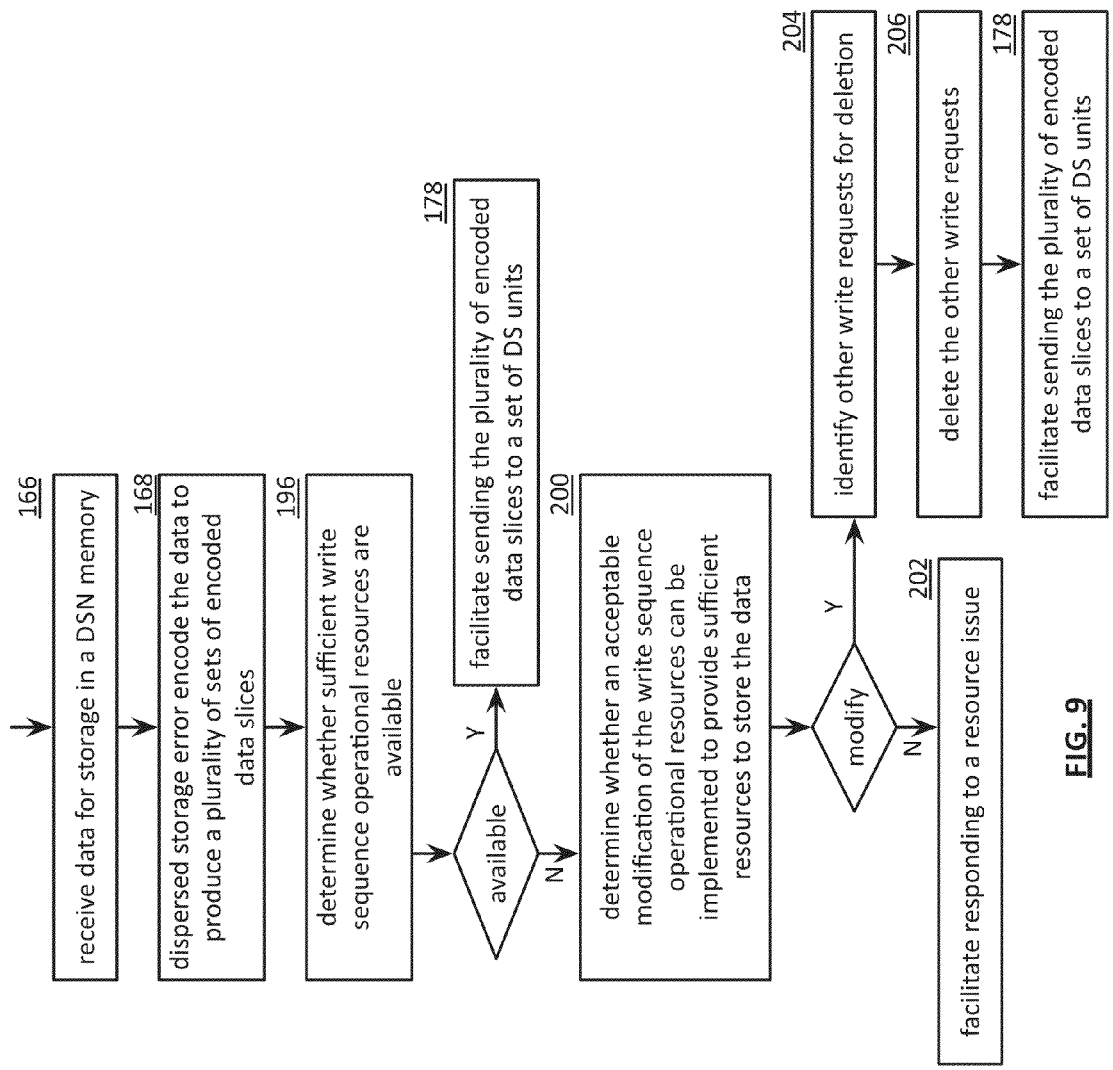
FIG. 9 is a flowchart illustrating another example of modifying a write sequence in accordance with the present invention.

FIG. 9 is a flowchart illustrating another example of modifying a write sequence, which include similar steps to FIG. 7. The method begins with steps 166-168 of FIG. 7 where a processing module (e.g., of a dispersed storage (DS) processing module) receives data for storage in a dispersed storage network (DSN) memory and encodes the data using a dispersed storage error coding function in accordance with dispersal parameters to produce a plurality of sets of encoded data slices.

The method continues at step 196 where the processing module determines whether sufficient write sequence operational resources are available. The write sequence operational resources includes one or more of a memory device utilized to store a queue, a memory space allocation utilized to store the queue, and an amount of available memory for storage of write requests. The determining may include on one or more of obtaining a data size indicator associated with the data, obtaining a current utilization level with regards to the write sequence operational resources, comparing the data size indicator with the current utilization level, and indicating that sufficient write sequence operational resources are available when the comparison is favorable. For example, the processing module determines that sufficient write sequence operational resources are available when an available resource indicator of the current utilization level is greater than the data size indicator.

The method branches to step 200 when the processing module determines that sufficient write sequence operational resources are not available. The method continues to step 178 of FIG. 7 when the processing module determines that sufficient write sequence operational resources are available. The method continues at step 178 of FIG. 7 where the processing module facilitates sending the plurality of encoded data slices to the set of DS units.

The method continues at step 200 where the processing module determines whether an acceptable modification of the write sequence operational resources can be implemented to provide sufficient resources to store the data when the processing module determines that sufficient write sequence operational resources are not available. The determining may be based on one or more of operational resource availability and write sequence information of other active write sequences (e.g., a number of favorable write responses corresponding to other active write sequences, a write threshold associated with the other active write sequences). For example, the processing module determines that an acceptable modification of the write sequence operational resources can be implemented to provide sufficient resources to store the data when the write sequence information of another active write sequence indicates that a write threshold number of favorable write responses have been received and pending write requests utilizing the write sequence operational resources may be deleted freeing up resources greater than a number of resources required to store the data (e.g., the pending write requests include one or more encoded data slices that are greater in size than one or more data slices of the data).

The method branches to step 204 when the processing module determines that an acceptable modification of the write sequence operational resources can be implemented to provide sufficient resources to store the data. The method continues to step 202 when the processing module determines that an acceptable modification of the write sequence operational resources cannot be implemented to provide sufficient resources to store the data. The method continues at step 202 where the processing module facilitates responding to a resource issue. The facilitating includes one or more of sending a store data response that includes an indication of the resource issue, sending an error message, deactivating a process that receives new data storage requests, and activating additional operational resources.

The method continues at step 204 where the processing module identifies other write requests for deletion when the processing module determines that an acceptable modification of the write sequence operational resources can be implemented to provide sufficient resources to store the data. The identifying includes identifying at least one pending write request associated with at least one other write sequence, wherein the pending write request is associated with write sequence operational resources greater than a number of write sequence operational resources required to store the data, and wherein the other write sequence has received at least a write threshold number of favorable write responses. For example, the processing module identifies a pending write request that includes the largest encoded data slice of a plurality of encoded data slices associated with a plurality of pending write requests, wherein each pending write request of the plurality of pending write requests is associated with a write sequence that has received at least a write threshold number of favorable write responses.

The method continues at step 206 where the processing module deletes the other write requests. For example, the processing module deletes the other write requests from one or more associated queues of the write sequence operational resources. The method continues with step 178 of FIG. 7 where the processing module facilitates sending the plurality of encoded data slices to a set of DS units.

Figure 10:
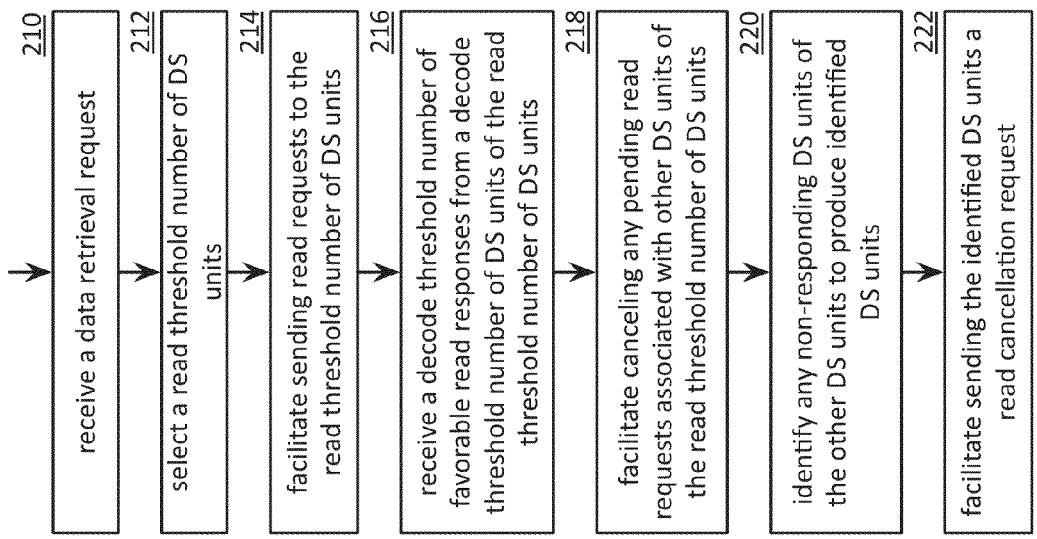
FIG. 10 is a flowchart illustrating an example of retrieving data from a dispersed storage network in accordance with the present invention.

FIG. 10 is a flowchart illustrating an example of retrieving data from a dispersed storage network. The method begins at step 210 where a processing module (e.g., of a dispersed storage (DS) processing module) receives a data retrieval request for data stored as a plurality of sets of encoded data slices in a set of DS units of a dispersed storage network (DSN) memory. The request may include receiving one or more of a filename, an object identifier (ID), a data ID, a block ID, a source name, a vault source name, a segment allocation table vault source name, a user ID, a DSN resource ID, a vault ID, a DS unit ID, a DS unit storage set ID, a data size indicator, and a retrieval request.

The method continues at step 212 where the processing module selects a read threshold number of DS units of the set of DS units. The selecting may be based on one or more of a vault look up based on a user ID, a source name of the data, an available DS unit list, a DS unit performance history, a DS unit activity level in the gator, a DS unit estimated error rate, a number of pending requests associated with a DS unit, and a source name to DS unit ID table lookup. For example, the processing module selects the read threshold number of DS units to include DS units associated with a lowest number of pending requests of an associated queue.

The method continues at step 214 where the processing module facilitates sending read requests to the read threshold number of DS units. The facilitating includes generating one or more sets of slice names corresponding to the data retrieval request, generating one or more sets of encoded data slice requests that includes the one or more sets of slice names, and storing the one or more sets of encoded data slice requests in one or more corresponding queues for transmission to the read threshold number of DS units.

The method continues at step 216 where the processing module receives a decode threshold number of favorable read responses from a decode threshold number of DS units of the read threshold number of DS units. For example, the processing module receives a first decode threshold number of received encoded data slices that includes encoded data slices of a common revision number, and wherein the received encoded data slices each produce a favorable integrity test result (e.g., a received integrity value compares favorably to a calculated integrity value and/or the first decode threshold number of received encoded data slices are dispersed storage error decoded to produce a data segment associated with a favorable integrity test result).

The method continues at step 218 where the processing module facilitates canceling any pending read requests associated with other DS units of the read threshold number of DS units. For example, the processing module deletes associated read encoded data slice requests from one or more message queues associated with other DS units of the read threshold number of DS units (e.g., DS units not included in the decode threshold number of DS units).

The method continues at step 220 where the processing module identifies any non-responding DS units of the other DS units to produce identified DS units. For example, the processing module verifies DS units that did not respond favorably to a corresponding read encoded data slice request. The method continues at step 222 where the processing module facilitates sending the identified DS units a read cancellation request. The facilitating includes generating one or more read cancellation requests, storing the one or more cancellation requests in one or more associated message queues of the identified DS units, and prioritizing the read cancellation requests (e.g., for immediate transmission to the identified DS units). As such, a DS unit receiving a cancellation message cancels sending a read encoded data slice response in response to an associated read encoded data slice request (e.g., does not start to send a response, stop sending a response in progress).

Figure 11:
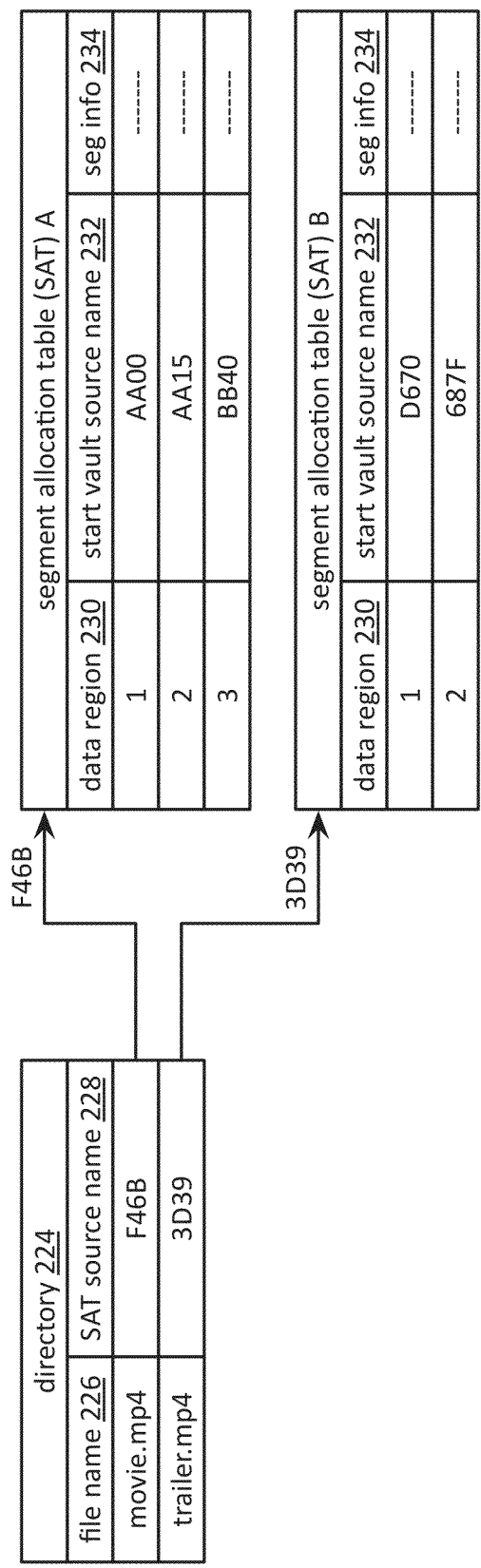
FIG. 11 is a diagram illustrating a directory and segment allocation table structure in accordance with the present invention.

FIG. 11 is a diagram illustrating a directory and segment allocation table structure. The structure includes a directory 224 and one or more segment allocation tables (SAT) SAT A-B. The directory 224 includes a file name field 226 and a SAT source name field 228. The filename field 226 includes one or more filename entries, wherein a filename includes at least one of a filename associated with data stored in a dispersed storage network (DSN) memory, a filename associated with a file, an object name, and a block number. The SAT source name field 228 includes one or more SAT source name entries corresponding to the one or more filename entries. A SAT source name entry includes a vault source name of a corresponding SAT stored as a plurality of SAT slices stored in the DSN memory at a DSN address of the SAT source name. For example, SAT associated with storing a movie file with a filename of movie.mp4 is stored at a SAT source name address of F46B and a SAT associated with storing a movie file with a filename of trailer.mp4 is stored at a SAT source name address of 3D39.

A SAT of the one or more SATs includes a data region field 230, a start vault source name field 232, and a segment information field 234. The data region field 230 includes one or more data region entries, wherein each data region entry of the one more data region entries is associated with one or more data segments of corresponding data. The start vault source name field 232 includes one or more start vault source name entries corresponding to the one or more data region entries. Each start vault source name entry includes a vault source name corresponding to DSN storage address of a first data segment of the one or more data segments associated with a corresponding data region. The segment information field 234 includes one or more segment information entries corresponding to the one or more data region entries. Each segment information entry includes one or more of a total length of the data region, a segment size within the data region, a segmentation approach (e.g., fixed, varying) utilized to segment the data into the one or more data segments of the region, and a number of data segments corresponding to the data region.

The SAT may be utilized to generate a plurality of sets of slice names corresponding to storage locations within the DSN memory of a plurality of sets of encoded data slices generated from a corresponding data region of the data. For example, a plurality of sets of slice names corresponding to a first data region of the movie file with the filename movie.mp4 may be generated from vault source names AA00-AA05 when a corresponding start vault source name is AA00 and corresponding segment information indicates that six data segments are included within the first data region. As another example, a plurality of sets of slice names corresponding to a second data region of the movie file with the filename movie.mp4 may be generated from vault source names AA15-AA18 when a corresponding start vault source name is AA15 and corresponding segment information indicates that four data segments are included within the second data region. As yet another example, a plurality of sets of slice names corresponding to a second data region of the movie file with the filename trailers.mp4 may be generated from vault source names 687F-6885 when a corresponding start vault source name is 687F and corresponding segment information indicates that seven data segments are included within the second data region.

FIG. 12A is a diagram illustrating another directory and segment allocation table structure. The structure includes a directory 224 and one or more segment allocation tables (SAT) SAT A-C. The directory 224 includes a file name field 226 and a SAT source name field 228. Each SAT of the one or more SATs includes a data region field 230, a start vault source name field 232, and a segment information field 234. The directory 224 and one or more SATs may be utilized to access one or more files stored within a dispersed storage network (DSN) memory. The directory 224 and an additional SAT may be utilized to access a stitched file, wherein the stitched file includes data of two or more files stored in the DSN memory.

For example, a file with a file name of movie.mp4 is stored in the DSN memory as three data regions associated with start vault source names AA00, AA15, and BB40 and a file with a file name of trailer.mp4 is stored in the DSN memory as two data regions associated with start vault source names D670 and 687F. A stitched file with a filename of both.mp4 is accessed from the DSN memory as the five data regions associated with start vault source names AA00, AA15, BB40, D670 and 687F. A new SAT C is generated that includes the five start vault source names and corresponding segment information. The new SAT C corresponding to the stitched file both.mp4 is stored as encoded SAT slices at a SAT source name of 5FA7. The directory 224 is updated to include the filename of both.mp4 and the associated SAT source name of 5FA7. The method to generate the new SAT corresponding to the stitched file is discussed in greater detail with reference to FIG. 12B.

FIG. 12B is a flowchart illustrating an example of stitching data stored in a dispersed storage network (DSN) memory. The method begins at step 236 where a processing module (e.g., of a dispersed storage (DS) processing module) determines to append a first data object and a second data object stored as encoded data slices in the DSN memory. The determining may be based on one or more of user input, a request, a comparison of data object metadata, detecting a multi-part upload, receiving a resume function, receiving an append operation request, receiving a request to combine audio frames, a first data object identifier (ID), a second data object ID, and receiving a request to combine video frames.

The method continues at step 238 where the processing module retrieves a first segment allocation table (SAT) for the first data object. For example, the processing module accesses a DSN directory based on a file name of the first data object, extracts a SAT source name address from the directory, retrieves a plurality of encoded SAT slices from the DSN memory utilizing the SAT source name address, and decodes the plurality of encoded SAT slices to reproduce the first SAT. The method continues at step 240 where the processing module retrieves a second SAT for the second data object.

The method continues at step 242 where the processing module generates an appended SAT based on the first SAT and the second SAT. The generating includes one or more of ordering data region information (e.g., a start vault source name and segment information associated with each data region) associated with the first data object ahead of data region information associated with the second data object to produce data region information of the appended SAT, ordering the data region information associated with the second data object ahead of the data region information associated with the first data object to produce the data region information of the appended SAT, and deleting one or both of the first SAT and the second SAT (e.g., deleting encoded SAT slices associated with the corresponding SAT).

The method continues at step 244 where the processing module facilitates storing the appended SAT. The facilitating includes one or more of dispersed storage error encoding the appended SAT to produce a plurality of encoded appended SAT slices, obtaining an appended SAT source name (e.g., generating the appended SAT source name based on an appended file name, generating a plurality of slice names corresponding to the plurality of encoded appended SAT slices based on appended SAT source name, generating a plurality of write slice requests that includes the plurality of encoded appended SAT slices and the plurality of slice names, and sending the plurality of write slice requests to the DSN memory.

The method continues at step 246 where the processing module updates the DSN directory. The update includes one or more of adding a new entry and deleting one or more entries associated with the first data object and the second data object. The adding the new entry includes adding the appended file name and associated appended SAT source name to the DSN directory to produce an updated DSN directory and storing the updated DSN directory in the DSN memory.

FIG. 13A is a diagram illustrating another directory and segment allocation table structure. The structure includes a directory 224 and one or more segment allocation tables (SAT) SAT A-C. The directory 224 includes a file name field 226 and a SAT source name field 228. Each SAT of the one or more SATs includes a data region field 230, a start vault source name field 232, and a segment information field 234. The directory 224 and one or more SATs may be utilized to access one or more files stored within a dispersed storage network (DSN) memory. In addition, the directory 224 and an additional SAT may be utilized to access a split file, wherein the split file includes one or more partial data regions of one or more files stored in the DSN memory.

For example, a file with a file name of movie.mp4 is stored in the DSN memory as three data regions associated with start vault source names AA00, AA15, and BB40 and a file with a file name of trailer.mp4 is stored in the DSN memory as two data regions associated with start vault source names D670 and 687F. A split file with a filename of sampler.mp4 is accessed from the DSN memory as three data regions associated with start vault source names AA15, BB45, and 687F. A data region of the one or more data regions may align with an entire data region of an existing data region (e.g., where a start vault source name of a data region of the one or more data regions is the same as a start vault source name of the existing data region). Alternatively, a data region of the one or more data regions may align with a portion of an existing data region (e.g., where a start vault source name of a data region of the one or more data regions is offset from the start vault source name of the existing data region). Segment information associated with a data region of the one or more data regions may align with corresponding segment information of the existing data region. Alternatively, the segment information associated with the data region may include different segment information (e.g., a fewer number of data segments as compared to the corresponding segment information of the existing data region).

A new SAT C is generated that includes the three start vault source names and corresponding segment information. The new SAT C corresponding to the split file sampler.mp4 is stored as encoded SAT slices at a SAT source name address of 38AB. The directory is updated to include the file name of sampler.mp4 and the associated SAT source name of 38AB. The method to generate the new SAT corresponding to the split file is discussed in greater detail with reference to FIGS. 13B-13D.

FIG. 13B is a flowchart illustrating an example of splitting data stored in a dispersed storage network (DSN) memory. The method begins at step 248 where a processing module (e.g., of a dispersed storage (DS) processing module) determines to split out one or more portions of one or more data objects stored as encoded data slices in the DSN memory. The determining may be based on one or more of user input, a request, a comparison of data object metadata, detecting a multi-part upload, receiving a resume function, receiving a split operation request, receiving a request to combine audio frames, a first data object identifier (ID), a second data object ID, and receiving a request to combine video frames.

The method continues at step 250 where the processing module retrieves one or more segment allocation tables (SATs) for one or more data objects. For example, the processing module accesses a DSN directory based on a file name of a first data object, extracts a SAT source name address from the directory, retrieves a plurality of encoded SAT slices from the DSN memory utilizing the SAT source name address, and decodes the plurality of encoded SAT slices to reproduce a first SAT.

The method continues at step 252 where the processing module identifies one or more data sections corresponding to desired data. The identifying may be based on one or more of a user input, a request, lookup, a list, a priority level indicator associated with the one or more data sections, a copyright indicator, and a request. For example, the processing module identifies a first data section that includes a 30 second section of a music file when a priority level associated with the 30 second section indicates a priority level greater than a priority threshold. As another example, the processing module identifies a second data section that includes a 60 second movie scene in accordance with a split list.

The method continues at step 254 where the processing module generates a new SAT based on the one or more data sections and the one or more SATs. The generating includes one or more of generating data region information for each of the one or more data sections (e.g., a start vault source name and segment information associated with each data region), ordering the data region information to produce the new SAT in accordance with one or more of an identification order, a user input, a request, and a list; and deleting at least one of the one or more SATs (e.g., deleting encoded SAT slices associated with the at least one SAT).

The method continues at step 256 where the processing module facilitates storing the new SAT. The facilitating includes one or more of dispersed storage error encoding the new SAT to produce a plurality of encoded new SAT slices, obtaining a new SAT source name (e.g., generating the new SAT source name based on a new file name), generating a plurality of slice names corresponding to the plurality of encoded new SAT slices based on the new SAT source name, generating a plurality of write slice requests that includes the plurality of encoded new SAT slices and the plurality of slice names, and sending the plurality of write slice requests to the DSN memory.

The method continues at step 258 where the processing module updates the DSN directory. The updating includes one or more of adding a new entry and deleting one or more entries associated with the one or more data objects. The adding the new entry includes adding the new file name and associated new SAT source name to the DSN directory to produce an updated DSN directory and storing the updated DSN directory in the DSN memory.

Figure 13C:
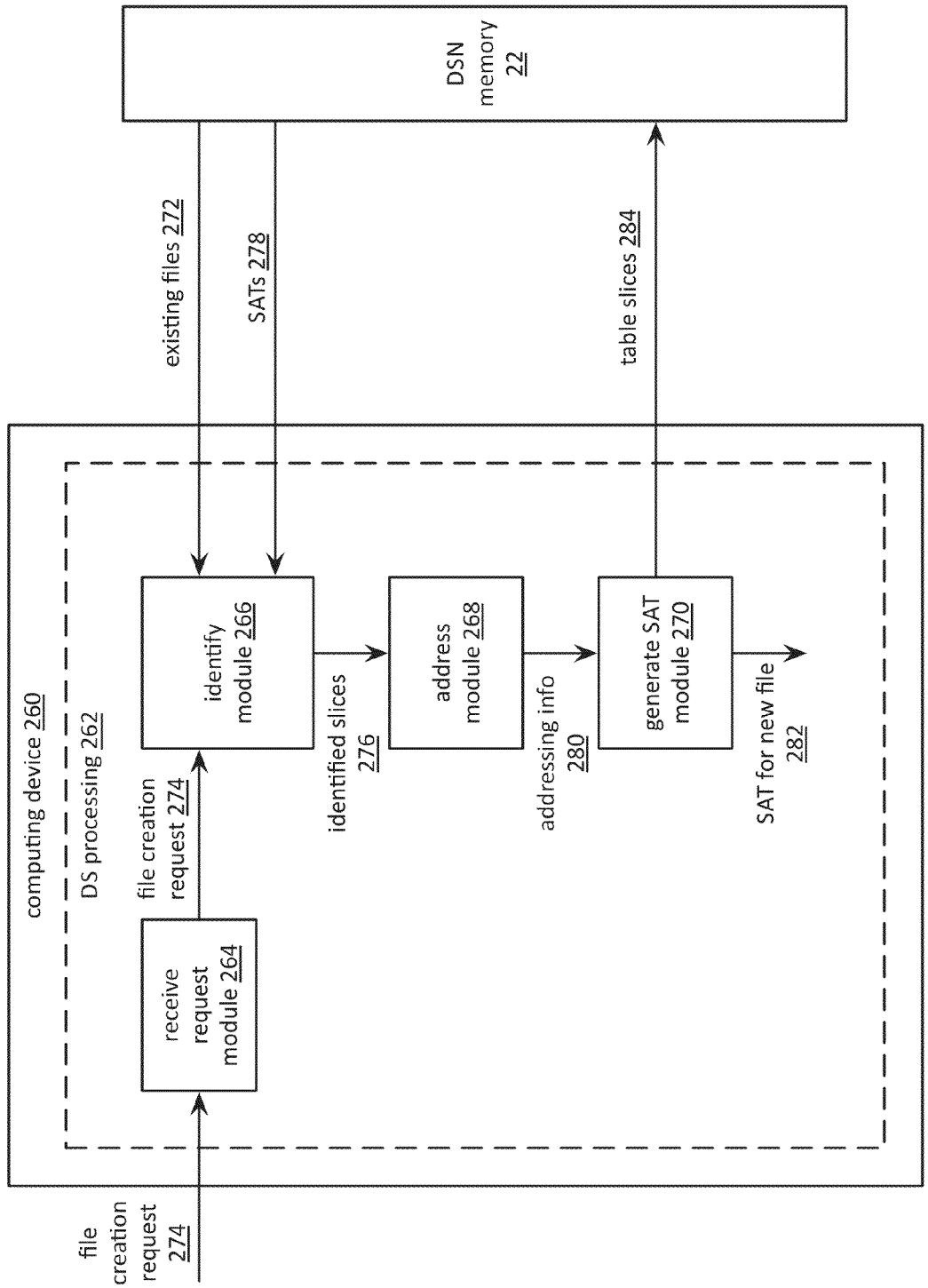
FIG. 13C is a schematic block diagram of another embodiment of a computing system in accordance with the present invention.

FIG. 13C is a schematic block diagram of another embodiment of a computing system that includes a computing device 260 and a dispersed storage network (DSN) memory 22 of a dispersed storage network. The computing device 260 includes a dispersed storage (DS) processing 262. The computing device 260 may be implemented as at least one of a user device, a DS processing unit, and a DS unit. The DS processing 262 includes a receive request module 264, an identify module 266, an address module 268, and a generate segment allocation table (SAT) module 270. The system functions to access the DSN memory 22 with regards to creating a new file from portions of a set of existing files 272 (e.g., one or more existing files). An existing file of the set of existing files 272 includes a plurality of data segments that is stored as a plurality of sets of encoded data slices in the DSN memory 22. The existing file of the set of existing files 272 may include a set of data regions. A data region of the set of data regions includes a consecutive subset of the plurality of data segments.

The receive request module 264 receives a file creation request 274 to create the new file from the portions of the set of existing files 272. The identify module 266 identifies data segments from the plurality of data segments of the set of existing files 272 corresponding to the portions of the set of existing files 272 to produce identified data segments. The identify module 266 identifies data segments by at least one of a variety of approaches. A first approach includes receiving, within the file creation request 274, identification of the identified data segments. A second approach includes searching, based on a search criteria (e.g., from the file creation request 274), the set of existing files 272, or addressing information thereof, to identify the data segments.

The identify module 266 identifies sets of encoded data slices (e.g., one set per data segment) of the plurality of sets of encoded data slices of the identified data segments to produce identified sets of encoded data slices 276. When the existing file includes the set of data regions, the identify module 266 identifies the sets of encoded data slices 276 by retrieving a set of segment allocation tables 278 for the set of existing files 272 based on the file creation request 274. A segment allocation table of the set of segment allocation tables includes a plurality of entries. An entry of the plurality of entries includes a DSN address (e.g., a source name) regarding storage of a data segment of the plurality of data segments in the DSN memory. For example, the identify module 266 retrieves the set of segment allocation tables 278 from the DSN memory 22 (e.g., stored as sets of encoded SAT slices).

When the existing file includes the set of data regions, the identify module 266 identifies data regions from the set of data regions of the set of existing files 272 corresponding to the portions of the set of existing files to produce identified data regions. Next, the identify module 266 identifies the sets of encoded data slices of the plurality of sets of encoded data slices of the identified data regions to produce the identified sets of encoded data slices 276. The identify module 266 identifies the sets of encoded data slices 276 by retrieving the set of segment allocation tables 278 for the set of existing files based on the file creation request. An entry of the plurality of entries of the segment allocation table of the set of segment allocation tables includes a DSN address regarding storage of a data region of the set of data segments of the set of existing files in the DSN memory and segmentation information regarding the dividing of the data region into the consecutive subset of the plurality of data segments.

The address module 268 determines addressing information 280 for the identified sets of encoded data slices 276 from existing addressing information of the set of existing files 272. When the existing file includes the set of data regions, the address module 268 determines the addressing information 280 for the identified sets of encoded data slices 276 from the set of segment allocation tables 278 associated with the set of existing files 272. The set of segment allocation tables 278 includes the existing addressing information of the set of existing files 272 at data region level. As such, data segments are grouped into a data region and the addressing information is for the region and addressing information for individual sets of slices may be determined from the region addressing information. Addressing information for an identified set of encoded data slices of the identified sets of encoded data slices 276 includes a start segment vault source name (e.g., including vault identifier, a generation identifier, an object number corresponding to the existing file, and a segment number) corresponding to a data region associated with the identified set of encoded data slices and segmentation information. The segmentation information includes one or more of a segment size of data segments of the data region, a total length of the data region (e.g., number of bytes), and a segmentation approach of the data region (e.g., fixed segment sizes, variable segment sizes).

The address module 268 identifies a vault source name of an identified set of encoded data slices for a first data segment of a consecutive subset of data segments of the identified data segments corresponding to the data region to produce the start segment vault source name. The address module 268 extracts a segment size from the existing addressing information of the data region to produce the segment size. The address module 268 extracts a segmentation approach from the existing addressing information of the data region to produce the segmentation approach. The address module 268 determines a number of bytes (e.g., number of data segments multiplied by the segment size) of the consecutive subset of data segments from the existing addressing information of the data region to produce the total length of the data region.

The generate segment allocation table module 270 generates a segment allocation table 282 for the new file based on the addressing information 280 of the identified sets of encoded data slices 276 such that the new file is created without duplication of the portions of the existing files. The generate SAT module 270 generates the segment allocation table 282 for the new file by a series of steps. A first step includes identifying consecutive data segments of the identified data segments. A second step includes grouping the consecutive data segments into a region. A third step includes generating addressing information for the region which is stored as an entry in the segment allocation table. Individual addressing information of the identified sets of encoded data slices 276 is determinable from the addressing information of the region.

The generate SAT module 270 stores the segment allocation table 282 in at least one of a local memory and the DSN memory 22. The generate SAT module 270 stores the segment allocation table 282 in the DSN memory 22 using a series of steps. In a first step, the generate SAT module 270 obtains a segment allocation table vault source name for the segment allocation table 282 (e.g., generate a new vault source name). In a second step, the generate SAT module 270 encodes the segment allocation table 282 using a dispersed storage error coding function to produce encoded table slices 284. In a third step, the generate SAT module 270 outputs the encoded table slices 284 to the DSN memory 22 for storage therein utilizing the segment allocation table vault source name.

Figure 13D:
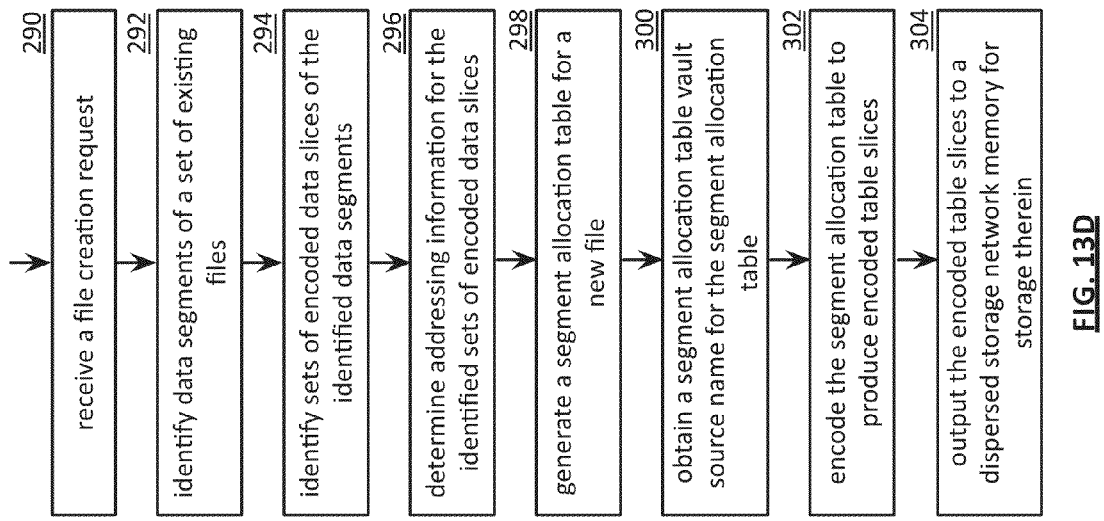
FIG. 13D is a flowchart illustrating an example of creating a new file in accordance with the present invention.

FIG. 13D is a flowchart illustrating an example of creating a new file. The method begins at step 290 where a processing module (e.g., of a dispersed storage (DS) processing unit) receives a file creation request to create a new file from portions of a set of existing files. An existing file of the set of existing files includes a plurality of data segments that is stored as a plurality of sets of encoded data slices in a dispersed storage network (DSN) memory. The existing file of the set of existing files may include a set of data regions. A data region of the set of data regions includes a consecutive subset of the plurality of data segments.

The method continues at step 292 where the processing module identifies data segments from the plurality of data segments of the set of existing files corresponding to the portions of the set of existing files to produce identified data segments. The identifying data segments includes at least one of the variety of approaches. A first approach includes receiving, within the file creation request, identification of the identified data segments. A second approach includes searching, based on a search criteria, the set of existing files, or addressing information thereof, to identify the data segments.

The method continues at step 294 where the processing module identifies sets of encoded data slices (e.g., one set per data segment) of the plurality of sets of encoded data slices of the identified data segments to produce identified sets of encoded data slices. When the existing file includes the set of data regions, the identifying the sets of encoded data slices includes retrieving a set of segment allocation tables for the set of existing files based on the file creation request. A segment allocation table of the set of segment allocation tables includes a plurality of entries and an entry of the plurality of entries includes a DSN address regarding storage of a data segment of the plurality of data segments in the DSN memory.

Alternatively, when the existing file includes the set of data regions, the processing module identifies data regions from the set of data regions of the set of existing files corresponding to the portions of the set of existing files to produce identified data regions. Next, the processing module identifies the sets of encoded data slices of the plurality of sets of encoded data slices of the identified data regions to produce the identified sets of encoded data slices. The identifying the sets of encoded data slices includes retrieving the set of segment allocation tables for the set of existing files based on the file creation request (e.g., a segment allocation table of the set of segment allocation tables includes a plurality of entries). An entry of the plurality of entries includes a DSN address regarding storage of a data region of the set of data segments of the set of existing files in the DSN memory and segmentation information regarding the dividing of the data region into the consecutive subset of the plurality of data segments.

The method continues at step 296 or the processing module determines addressing information for the identified sets of encoded data slices from existing addressing information of the set of existing files. When the existing file includes the set of data regions, processing module determines the addressing information for the identified sets of encoded data slices from a set of segment allocation tables associated with the set of existing files. The set of segment allocation tables includes the existing addressing information of the set of existing files at data region level. The addressing information for the identified set of encoded data slices of the identified sets of encoded data slices includes a start segment vault source name corresponding to a data region associated with the identified set of encoded data slices and segmentation information. The segmentation information includes one or more of a segment size of data segments of the data region, a total length of the data region, and a segmentation approach of the data region.

The method continues at step 298 where the processing module generates a segment allocation table for the new file based on the addressing information of the identified sets of encoded data slices such that the new file is created without duplication of the portions of the existing files. The generating the segment allocation table for the new file includes a series of steps. A first step includes identifying consecutive data segments of the identified data segments. A second step includes grouping the consecutive data segments into a region. A third step includes generating addressing information for the region, which is stored as an entry in the segment allocation table, wherein individual addressing information of the identified sets of encoded data slices is determinable from the addressing information of the region.

The method continues at step 300 where the processing module obtains a segment allocation table vault source name for the segment allocation table. The obtaining includes at least one of receiving, retrieving, and generating. The generating includes generating an object number based on a random number generator and associating the object number with a filename of the new file (e.g., modifying a file directory to include the file name in the segment allocation table vault source name). The method continues at step 302 where the processing module encodes the segment allocation table using a dispersed storage error coding function to produce encoded table slices. The method continues at step 304 where the processing module outputs the encoded table slices to the DSN memory therein for storage utilizing the segment allocation table vault source name.

FIG. 14A is a schematic block diagram of another embodiment of a computing system that includes a dispersed storage (DS) processing unit 16 and two or more dispersed storage (DS) units 1-2. The DS processing unit 16 sends slices 11 to the two or more DS units 1-2 for storage therein and retrieves slices 11 from the two or more DS units 1-2. Each DS unit of the two or more DS units 1-2 includes one or more memories. For example, DS unit 1 includes memories 1-4 and DS unit 2 includes memories 1-3.

Each memory of the one or more memories may be associated with a corresponding dispersed storage network (DSN) address range. For example, memory 1 of DS unit 1 is associated with DSN address range 1, memory 2 of DS unit 1 is associated with DSN address range 2, memory 3 of DS unit 1 is associated with DSN address range 3, memory 4 of DS unit 1 is associated with DSN address range 4, memory 1 of DS unit 2 is associated with DSN address range 5, memory 2 of DS unit 2 is associated with DSN address range 6, and memory 3 of DS unit 2 is associated with DSN address range 7.

In an example of operation, the DS processing unit 16 sends a slice retrieval request to DS unit 1, wherein the request includes a slice name of address range 3. DS unit 1 retrieves and encoded data slice utilizing the slice name from memory 3 and sends the encoded data slice to the DS processing unit 16.

FIG. 14B is a schematic block diagram of another embodiment of a computing system that includes two or more dispersed storage (DS) units 1-2. Each DS unit of the two or more DS units 1-2 includes one or more memories for storing slices based on dispersed storage network (DSN) address range assignments of the one or more memories. For example, DS unit 1 includes memories 1-4 utilized for storing slices associated with DSN address range assignments for memories 1-4 of DS unit 1 and DS unit 2 includes memories 1-3 utilized for storing slices associated with DSN address range assignments for memories 1-3 of DS unit 2.

A memory of the one or more memories may fail from time to time. As such, all, some, or none of slices stored in the memory may be accessible. A DS unit may transfer at least some slices stored in an associated failing memory to one or more other memories when the memory is detected as the failing memory. The transferring may include one or more of retrieving the at least some of the slices stored in the failing memory, identifying the one or more other memories, storing the at least some of the slices in the one or more other memories, and updating DSN address range assignments for the memory and the one or more other memories. For example, DS unit 1 retrieves at least some slices stored in a failing memory 3, identifies memories 2 and 4 as the one or more other memories, sends transfer slices A of the at least some of the slices to memory 2, sends transfer slices B of the at least some of the slices to memory 4, updates a DSN address range assignment for memory 3 (e.g., no assignment), updates a DSN address range assignment for memory 2 to include an address range associated with transfer slices A, and updates a DSN address range assignment for memory 4 to include an address range associated with transfer slices B. The method to detect a failing memory and transfer slices is discussed in greater detail with reference to FIGS. 15-17B.

FIG. 14C is a schematic block diagram of another embodiment of a computing system that includes two or more dispersed storage (DS) units 1-2. Each DS unit of the two or more DS units 1-2 includes one or more memories for storing slices based on dispersed storage network (DSN) address range assignments of the one or more memories. For example, DS unit 1 includes memories 1-4 utilized for storing slices associated with DSN address range assignments for memories 1-4 of DS unit 1 and DS unit 2 includes memories 1-3 utilized for storing slices associated with DSN address range assignments for memories 1-3 of DS unit 2.

A memory on the one or more memories may fail from time to time. As such, all, some, or none of slices stored in the memory may be accessible. A DS unit may transfer at least some slices stored in an associated failing memory to one or more other memories when the memory is detected as the failing memory. The transferring may include one or more of retrieving the at least some of the slices stored in the failing memory, identifying the one or more other memories, identifying another DS unit, storing the at least some of the slices in the one or more other memories, storing at least some of the slices in the other DS unit, and updating DSN address range assignments for one or more of the memory, the one or more other memories, and the other DS unit. For example, DS unit 1 retrieves at least some slices stored in a failing memory 4, identifies memory 3 of DS unit 1 as the one or more other memories, identifies DS unit 2 as another DS unit, sends transfer slices A of the at least some of the slices to memory 3, sends transfer slices B of the at least some of the slices to DS unit 2, updates a DSN address range assignment for memory 4 (e.g., no assignment), updates a DSN address range assignment for memory 3 to include an address range associated with transfer slices A, and updates a DSN address range assignment for DS unit 2 to include an address range associated with transfer slices B. DS unit 2 may update a DSN address range assignment for memory 1 of DS unit 2 to include the address range associated with transfer slices B. The method to detect a failing memory and transfer slices is discussed in greater detail with reference to FIGS. 15-17B.

Figure 15:
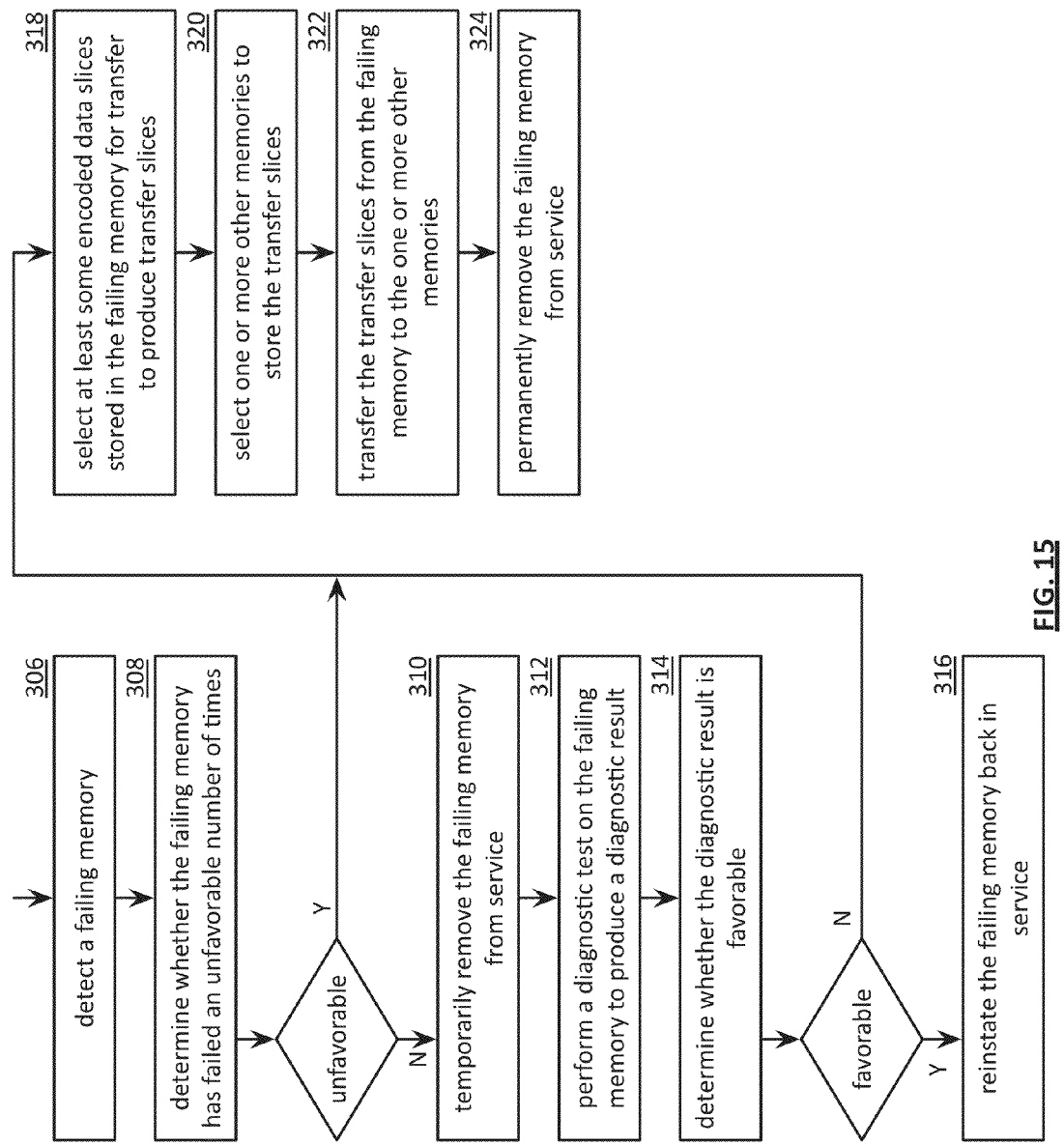
FIG. 15 is a flowchart illustrating an example of detecting a failing memory in accordance with the present invention.

FIG. 15 is a flowchart illustrating an example of detecting a failing memory. The method begins at step 306 where a processing module (e.g., of a dispersed storage (DS) module, of a DS unit) detects a failing memory. The detecting includes detecting at least one of a memory controller error, a read error (e.g., a missing slice, a corrupt slice), a write error, unfavorable access latency, an error message, a test error, an error correlation to a common memory (e.g., memories 2 and 3 slow down every time memory 1 is accessed), an unfavorable memory age, an unfavorable memory usage history, an unfavorable memory test result, and an unfavorable slice rebuilding history.

The method continues at step 308 where the processing module determines whether the failing memory has failed an unfavorable number of times. The determination includes comparing a number of cumulative failures to a number of failures threshold and indicating that the failing memory has failed an unfavorable number of times when the comparison is unfavorable. For example, the processing module determines that the failing memory has failed an unfavorable number of times when a number of cumulative failures is four and a number of failures threshold is three. The method branches to step three 318 when the processing module determines that the failing memory has failed an unfavorable number of times. The method continues to step 310 when the processing module determines that the failing memory has not failed an unfavorable number of times.

The method continues at step 310 where the processing module temporarily removes the failing memory from service. The temporarily removing the failing memory from service includes one or more of incrementing a number of cumulative failures indicator by one, disabling access to the memory, and updating a dispersed storage network (DSN) address range assignment table to indicate that the failing memory is the longer assigned to a previously assigned DSN address range.

The method continues at step 312 where the processing module performs a diagnostic test on the failing memory to produce a diagnostic result. The performing the diagnostic test includes one or more of facilitating resetting the failing memory, writing a test pattern to the failing memory, reading the test pattern from the failing memory to produce a recovered test pattern, comparing the recovered test pattern to the test pattern, measuring an access latency, and generating the diagnostic result based on the comparison and/or the access latency (e.g., indicate a failure when the comparison is unfavorable, indicate a failure when the access latency compares unfavorably to an access latency threshold).

The method continues at step 314 where the processing module determines whether the diagnostic result is favorable. The determining includes at least one of extracting a functional result, extracting a performance result, comparing the functional result to a functional threshold, comparing the performance result to a performance threshold, and indicating that the diagnostic result is favorable when functional and performance comparisons are favorable. The method branches to step 318 when the processing module determines that the diagnostic result is unfavorable. The method continues to step 316 when the processing module determines that the diagnostic result is favorable. The method continues at step 316 where the processing module reinstates the failing memory back in service. The reinstating includes at least one of enabling access to the memory and updating the DSN address range assignment table to indicate that the failing memory is assigned to the previously assigned DSN address range when the processing module previously updated the DSN address range assignment table to indicate that the failing memory is the longer assigned to the previously assigned DSN address range.

The method continues at step 318 where the processing module selects at least some encoded data slices stored in the failing memory for transfer to produce transfer slices. The selecting includes selecting slices in accordance with a slice selection scheme, wherein the scheme includes at least one of selecting all slices, priority slices, slices accessed most frequently, slices indicated by predetermination, slices indicated based on a query, and slices indicated in a received message.

The method continues at step 320 where the processing module selects one or more other memories to store the transfer slices. The selecting may be based on one or more of the DSN address range assignment table, a memory availability indicator, a memory performance level indicator, and identifying the one or more other memories that include a DSN address range assignment that is adjacent to the priestly assigned DSN address range of the failing memory.

The method continues at step 322 where the processing module transfers the transfer slices from the failing memory to the one or more other memories. For example, the processing module retrieves the transfer slices from the failing memory, stores the transfer slices in the one or more other memories, and updates the DSN address range assignment table to indicate that the previously assigned DSN address range is now assigned to the one or more other memories. The method continues at step 324 where the processing module permanently removes the failing memory from service. The permanently removing includes disabling access to the failing memory, generating an error message that includes a removal from service indicator and a diagnostic result, and sending the error message (e.g., to a DS managing unit).

Figure 16:
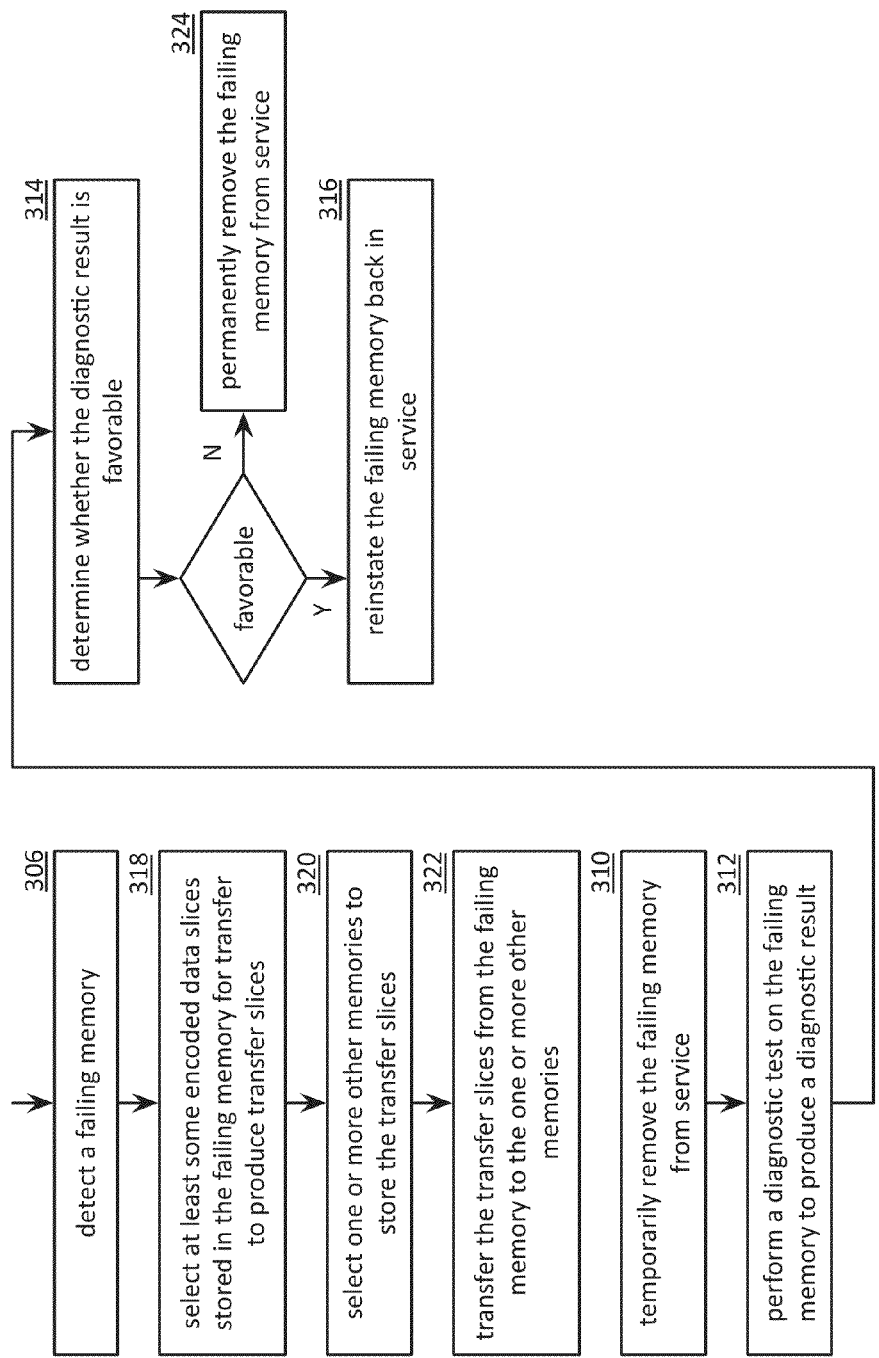
FIG. 16 is a flowchart illustrating another example of detecting a failing memory in accordance with the present invention.

FIG. 16 is a flowchart illustrating another example of detecting a failing memory, which includes similar steps to FIG. 15. The method begins with step 306 of FIG. 15 where a processing module (e.g., of a dispersed storage (DS) module, of a DS unit) detects a failing memory. The method continues with steps 318, 320, and 322 of FIG. 15 where the processing module selects at least some encoded data slices stored in the failing memory for transfer to produce transfer slices, selects one or more other memories to receive the transfer slices, and transfers the transfer slices from the failing memory to the one or more other memories.

The method continues with steps 310, 312, and 314 of FIG. 15 where the processing module temporarily removes the failing memory from service, performs a diagnostic test of the failing memory to produce a diagnostic result, and determines whether the diagnostic result is favorable. The method branches to step 316 of FIG. 15 when the processing module determines that the diagnostic result is favorable. The method continues to step 324 of FIG. 15 when the processing module determines that the diagnostic test result is not favorable. The method continues at step 3 to 24 of FIG. 15 where the processing module permanently removes the failing memory from service. The method continues at step 316 where the processing module reinstates the failing memory back in service when the processing module determines that the diagnostic result is favorable.

Figure 17A:
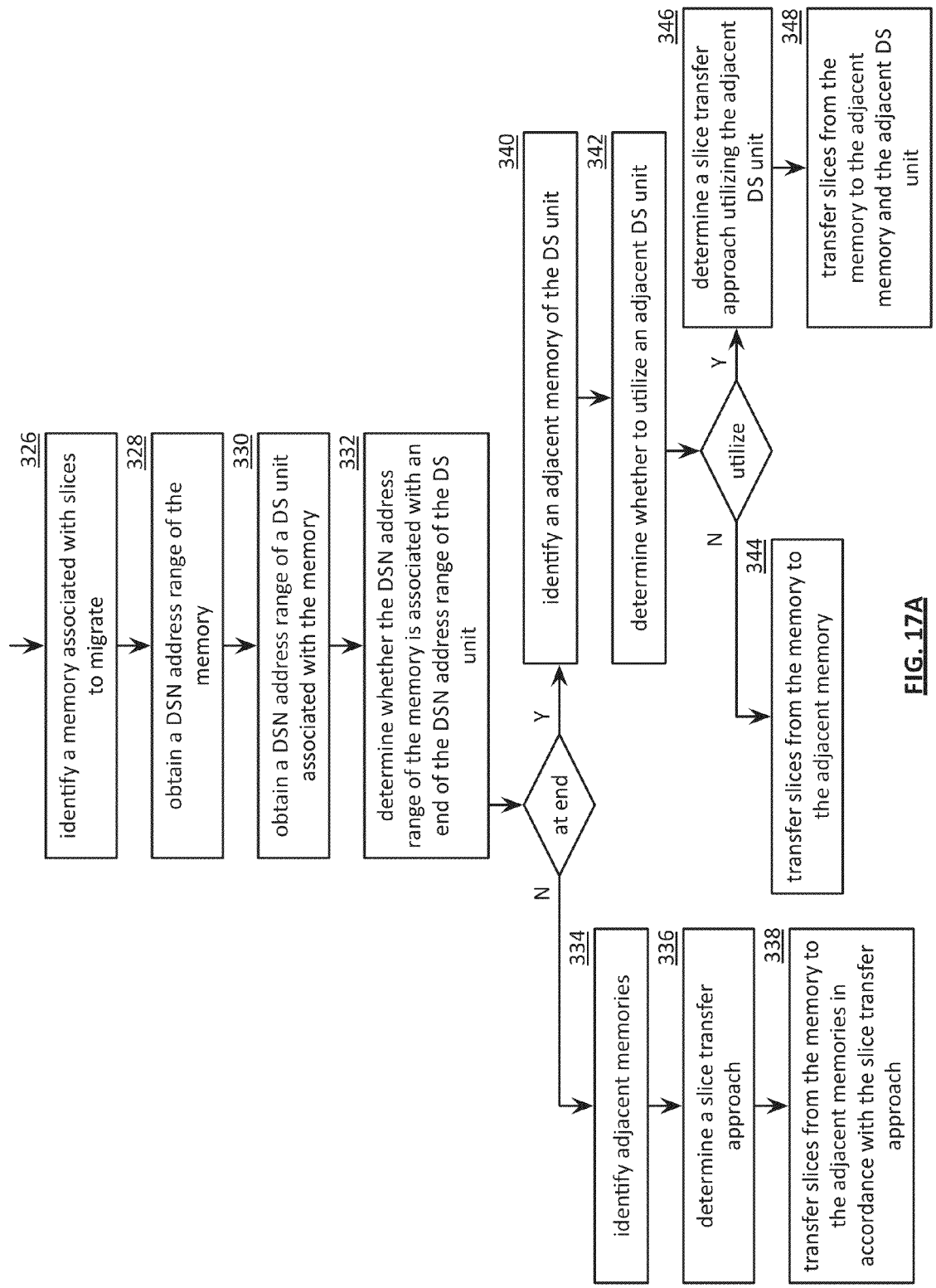
FIG. 17A is a flowchart illustrating an example of migrating slices in accordance with the present invention.

FIG. 17A is a flowchart illustrating an example of migrating slices. The method begins at step 326 where a processing module (e.g., of a dispersed storage (DS) module, of a DS unit) identifies a memory associated with slices to migrate. The identifying includes one or more of receiving a failing memory indicator, receiving a message, performing a memory test, interpreting a memory test result, and receiving a request. The method continues at step 328 where the processing module obtains a dispersed storage network (DSN) address range of the memory. For example, the processing module accesses a local DSN address range assignment table utilizing an identifier of the memory to retrieve the DSN address range of the memory.

The method continues at step 330 where the processing module obtains a DSN address range of a DS unit associated with the memory. The obtaining includes at least one of accessing the local DSN address range assignment table utilizing the DSN address range of the memory to retrieve the DSN address range of the DS unit associated with the memory and accessing a global DSN address to physical location table to retrieve the DSN address range of the DS unit associated with the memory.

The method continues at step 332 where the processing module determines whether the DSN address range of the memory is associated with an end of the DSN address range of the DS unit. The determination may be based on or more of comparing the DSN address range of the memory with the DSN address range of the DS unit, indicating that the DSN address range of the memory aligns with a lower end of the DSN address range of the DS unit when a starting DSN address of the DSN address range of the memory is substantially the same as a starting DSN address of the DSN address range of the DS unit, and indicating that the DSN address range of the memory aligns with an upper end of the DSN address range of the DS unit when an ending DSN address of the DSN address range of the memory is substantially the same as an ending DSN address of the DSN address range of the DS unit. The method branches to step 340 when the processing module determines that the DSN address range of the memory is associated with the end of the DSN address range of the DS unit. The method continues to step 334 when the processing module determines that the DSN address range of the memory is not associated with the end of the DSN address range of the DS unit.

The method continues at step 334 where the processing module identifies adjacent memories. The identifying includes one or more of accessing the local DSN address range assignment table, identifying a lower adjacent memory of the adjacent memories, wherein the lower adjacent memory is assigned a DSN address range immediately below the DSN address range of the memory, and identifying a higher adjacent memory of the adjacent memories, wherein the higher adjacent memory is assigned a DSN address range immediately above the DSN address range of the memory.

The method continues at step 336 where the processing module determines a slice transfer approach. The slice transfer approach indicates which slices of the slices to transfer to transfer to the lower adjacent memory and which slices of the slices to transfer to transfer to the higher adjacent memory. The determination may be based on one or more of a memory availability indicator of the lower adjacent memory, a memory availability indicator of the higher adjacent memory, a predetermination, a lookup, a performance level of the lower adjacent memory, a performance level of the higher adjacent memory, and a message.

The method continues at step 338 where the processing module transfers the slices to transfer from the memory to the adjacent memories in accordance with the slice transfer approach. The transferring includes at least one of transferring slices to transfer from the memory to the adjacent memories and updating the DSN address range assignment table in accordance with the slice transfer approach. For example, the processing module retrieves slices to transfer to the lower adjacent memory from the memory, stores the slices to transfer to the lower adjacent memory in the lower adjacent memory, retrieves slices to transfer to the higher adjacent memory from the memory, stores the slices to transfer to the higher adjacent memory in the higher adjacent memory, and updates the local DSN address range assignment table to indicate that the DSN address range of the memory is now affiliated with the adjacent memories in accordance with the slice transfer approach.

The method continues at step 340 where the processing module identifies an adjacent memory of the DS unit when the processing module determines that the DSN address range of the memory is associated with the end of the DSN address range of the DS unit. The identifying includes one or more of accessing the local DSN address range assignment table and identifying an adjacent memory, wherein the adjacent memory is assigned a DSN address range immediately next to the DSN address range of the memory (e.g., lower or higher).

The method continues at step 342 where the processing module determines whether to utilize an adjacent DS unit. The determination may be based on one or more of a memory availability level of the adjacent memory, a memory availability level of the adjacent DS unit, a network activity level, and a network configuration indicator. For example, the processing module determines to utilize the adjacent DS unit when the network configuration indicator indicates that the adjacent DS unit is located at a common site as the DS unit. As another example, the processing module determines not to utilize the adjacent DS unit when the network configuration indicator indicates the adjacent DS unit is located at a different site as a site of the DS unit.

The method branches to step 346 when the processing module determines to utilize the adjacent DS unit. The method continues to step 344 when the processing module determines not to utilize the adjacent DS unit. The method continues at step 344 where the processing module transfers slices from the memory to the adjacent memory. For example, the processing module retrieves all the slices to transfer from the memory, stores all the slices to transfer in the adjacent memory, and updates the local DSN address range assignment table to indicate that the DSN address range of the memory is now affiliated with the adjacent memory.

The method continues at step 346 where the processing module determines a slice transfer approach utilizing the adjacent DS unit when the processing module determines to utilize the adjacent DS unit. The slice transfer approach indicates which slices of the slices to transfer to transfer to the adjacent memory and which slices of the slices to transfer to transfer to the adjacent DS unit. The determining may be based on one or more of the network activity level, the network configuration indicator, a memory availability indicator of the adjacent memory, a memory availability indicator of the adjacent DS unit, a predetermination, a lookup, a performance level of the adjacent memory, a performance level of the adjacent DS unit, and a message.

The method continues at step 348 where the processing module transfers the slices to transfer from the memory to the adjacent memory and the adjacent DS unit in accordance with the slice transfer approach. The transferring includes at least one of transferring at least some of the slices to transfer from the memory to the adjacent memory, transferring at least some of the slices to transfer from the memory to the DS unit, updating the local DSN address range assignment table in accordance with the slice transfer approach, and updating the global DSN address range assignment table in accordance with the slice transfer approach. For example, the processing module retrieves slices to transfer to the adjacent memory from the memory, stores the slices to transfer to the adjacent memory in the adjacent memory, retrieves slices to transfer to the adjacent DS unit from the memory, stores the slices to transfer to the adjacent DS unit in the adjacent DS unit, updates the local DSN address range assignment table to indicate that at least some the DSN address range of the memory is now affiliated with the adjacent memory in accordance with the slice transfer approach, and updates the global DSN address range assignment table to indicate that a remaining portion the DSN address range of the memory is now affiliated with the adjacent DS unit in accordance with the slice transfer approach.

Figure 17B:
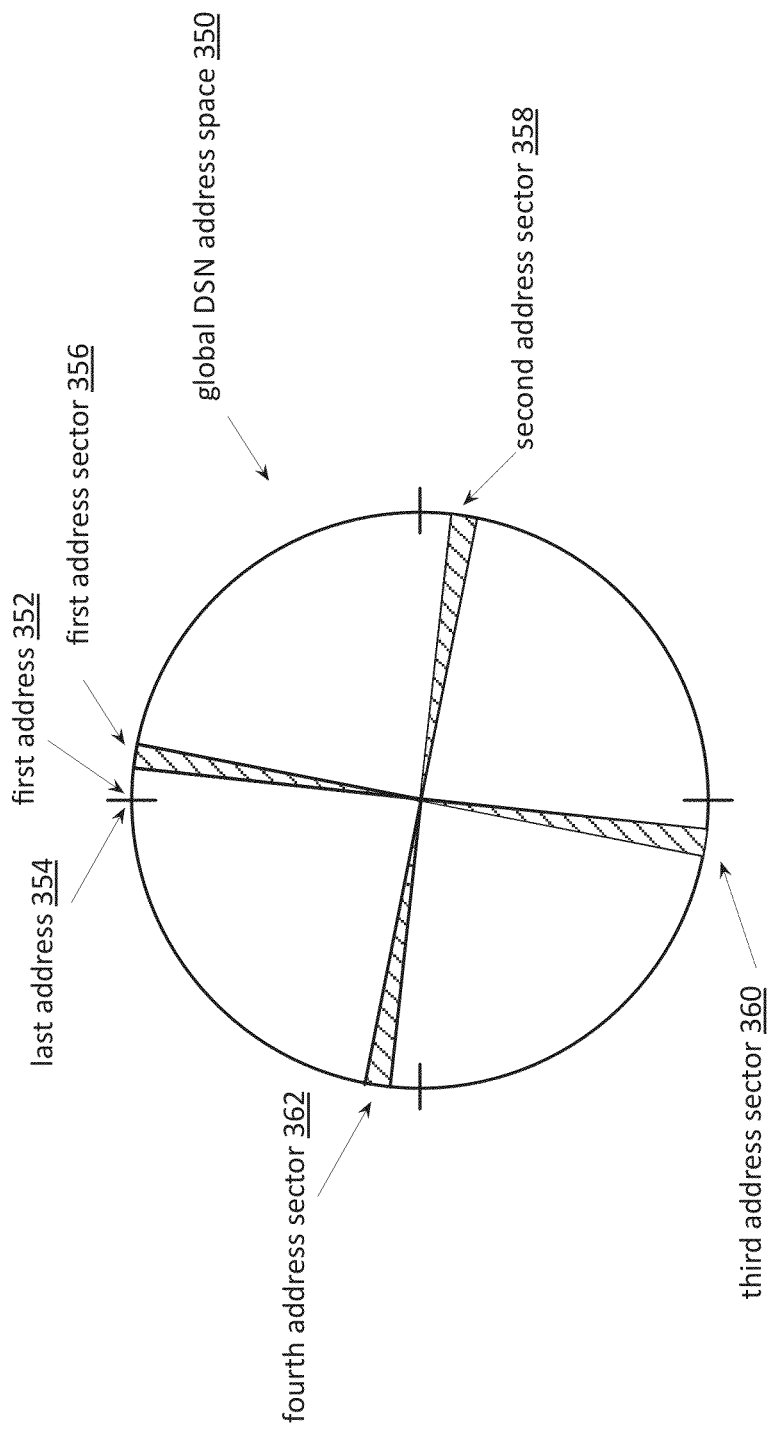
FIG. 17B is a diagram of an embodiment of a distributed storage network (DSN) address mapping in accordance with the present invention.

FIG. 17B is a diagram of an embodiment of a distributed storage network (DSN) address mapping that includes a global DSN address space 350 illustrated as a circle including a first address 352 of the global DSN address space 350 to start the circle and ending with a last address 354 of the global DSN address space 350. An address of the global DSN address space 350 may include a slice name associated with an encoded data slice stored in a DSN memory. The slice name may include multiple fields. A most significant field may include an address sector field. A number of permutations of the address sector field corresponds to a number a pillar width (e.g., number of pillars) of dispersal parameters utilized to generate the encoded data slices. For example, the pillar width is four when the number of permutations of the address sector field is four. The global DSN address space 350 is divided into a plurality of address sectors. For example, the plurality of address sectors includes a first address sector 356, a second address sector 358, a third address sector 360, and a fourth address sector three 362 when four sector addresses are utilized.

Recovery reliability of retrieving data from the DSN memory is improved by aligning storage units with the plurality of address sectors. For example, a first dispersed storage (DS) unit is utilized to store encoded data slices that correspond to slice names that include a first address sector field value, a second dispersed storage (DS) unit is utilized to store encoded data slices that correspond to slice names that include a first address sector field value, a third dispersed storage (DS) unit is utilized to store encoded data slices that correspond to slice names that include a third address sector field value, and a fourth dispersed storage (DS) unit is utilized to store encoded data slices that correspond to slice names that include a fourth address sector field value. Recovery of data is possible by retrieving just three encoded data slices from three DS units of the four DS units when a decode threshold number of the dispersal parameters is three.

Figure 17C:
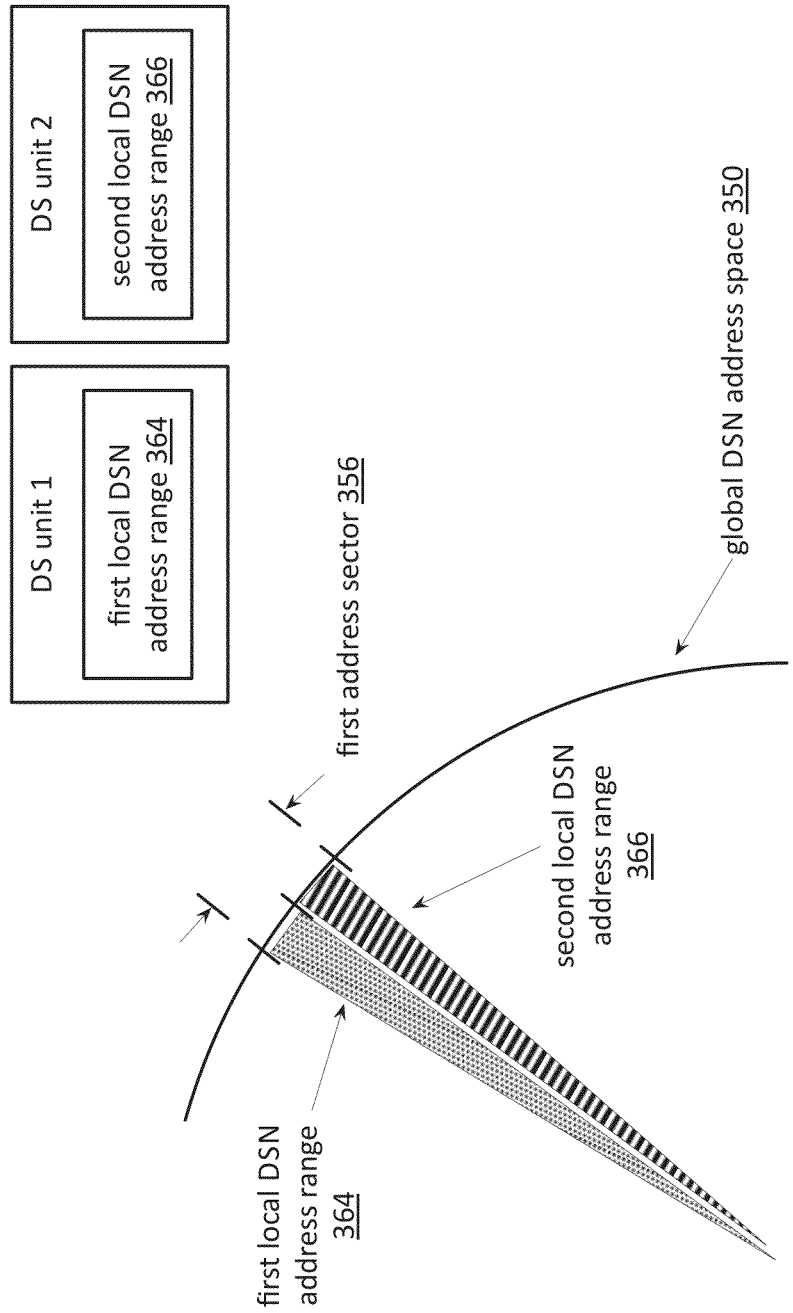
FIG. 17C is a diagram of another embodiment of a distributed storage network (DSN) address mapping in accordance with the present invention.

FIG. 17C is a diagram of an embodiment of a distributed storage network (DSN) address mapping that includes a portion of a global DSN address space 350 illustrated as a portion of a circle. The global DSN address space 350 is divided into a plurality of address sectors. For example, the plurality of address sectors includes a first address sector 356. An address sector includes one or more local DSN address ranges. A local DSN address range is a portion of an address sector of the plurality of address sectors. For example, the first address sector 356 includes a first local DSN address range 364 and a second local DSN address range 366. For each local DSN address range of the one or more local DSN address ranges, the local DSN address range is associated with a dispersed storage (DS) unit utilized to store encoded data slices that are assigned addresses within the local DSN address range. For example, a DS unit 1 is utilized to store encoded data slices that are assigned addresses within the first local DSN address range 364 and a DS unit 2 is utilized to store encoded data slices that are assigned addresses within the second local DSN address range 366.

Two or more DS units associated with a common address sector may be implemented at a common site without impacting system reliability even when the site is off-line since a decode threshold number of encoded data slices may be available by retrieving the decode threshold number of encoded data slices associated with a decode threshold number of other address sectors (e.g., from a decode threshold number of other sites). From time to time encoded data slices stored in one or more memory devices of a DS unit may require transfer to another memory device of the DS units or to a memory device of another DS unit associated with a common sector with the DS unit. For example, the one more memory devices may fail. As another example, the one more memory devices may reach and end-of-life time period. The DS unit may function to identify the other DS unit and determine whether to transfer encoded data slices to the other DS unit when requiring to transfer the encoded data slices to another memory device. The method to migrate encoded data slices is discussed in greater detail with reference to FIGS. 17D-E.

Figure 17D:
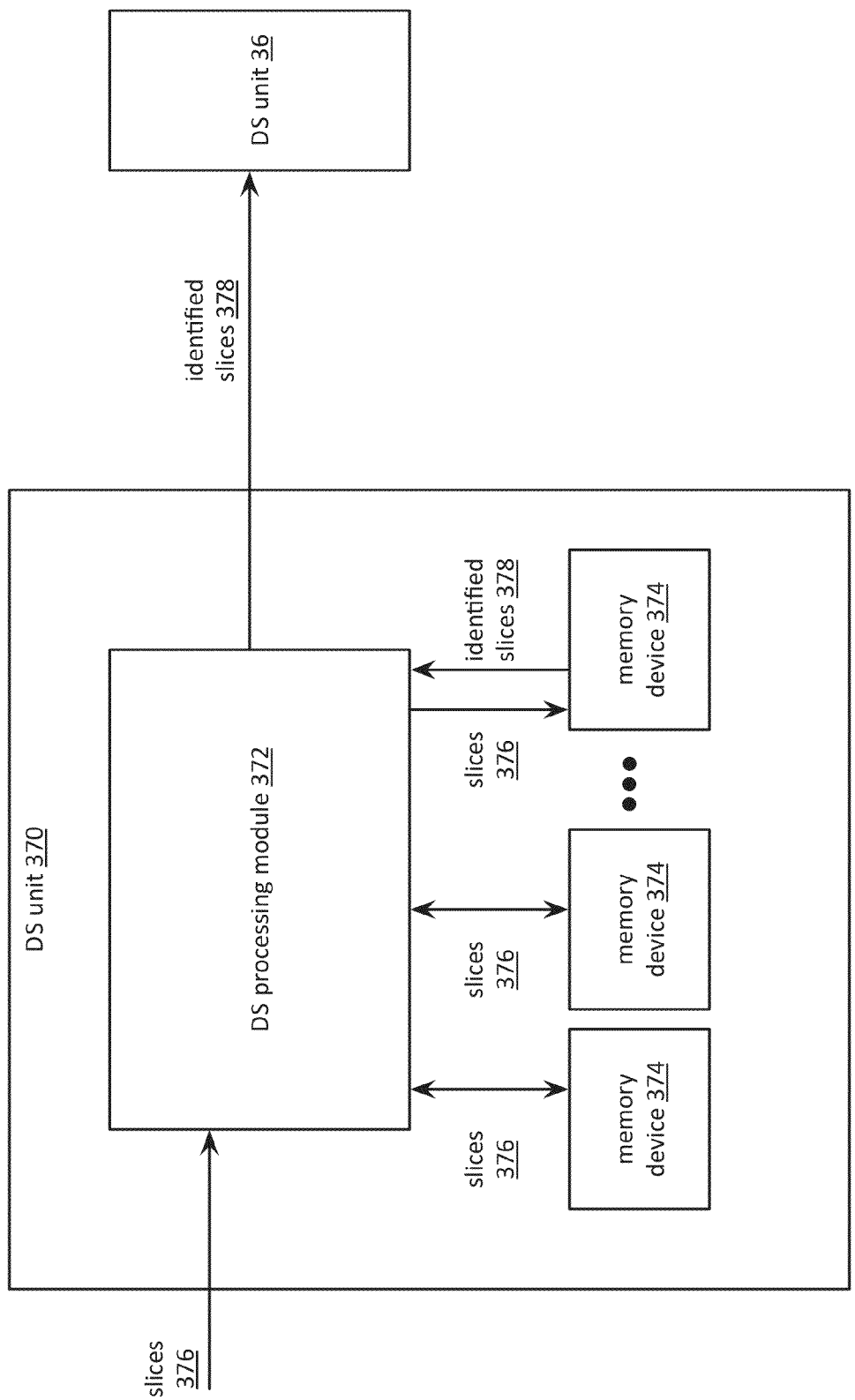
FIG. 17D is a schematic block diagram of another embodiment of a computing system in accordance with the present invention.

FIG. 17D is a schematic block diagram of another embodiment of a computing system that includes a dispersed storage (DS) unit 370 and another DS unit 36. The DS unit 370 includes a DS processing module 372 and a plurality of memory devices 374. The DS unit 370 functions to store encoded data slices 376. Data segments of data (e.g., one or more data objects, one or more files, etc.) are encoded (e.g., by a DS processing unit) using a dispersed storage error coding function to produce a plurality of sets of encoded data slices. The stored encoded data slices 376 includes one or more encoded data slices of at least some sets of the plurality of sets of encoded data slices.

The DS unit 370 is assigned a local distributed storage network (DSN) address range. A global DSN address space is divided into a plurality of address sectors. The local DSN address range is a portion of an address sector of the plurality of address sectors. The DS unit 370 and the other DS unit 36 are assigned to the address sector by a system management function. The DS unit address range is not tied to the dispersed storage error coding function when the system management function assigns DS unit 370 and the other DS unit 36 to the address sector. The plurality of sets of encoded data slices have a plurality of sets of slice names. A slice name of the plurality of sets of slices names includes an address sector field (e.g., pillar number) that identifies one of the plurality of address sectors. The address sector field corresponds to an ordering of the dispersed storage error coding function.

The DS processing module 372 receives the encoded data slices 376 and stores the encoded data slices 376 in one or more memory devices 374 of the plurality of memory devices 374. The DS processing module 372 identifies encoded data slices of the stored encoded data slices 376 to transfer to produce identified encoded data slices 378. The DS processing module 372 identifies encoded data slices to transfer by identifying a memory device 374 of the plurality of memory devices 374 based on a memory device maintenance protocol (e.g., replace due to age, performance degradation, etc.) and identifying encoded data slices stored by the memory device 374 as the identified encoded data slices 378. Alternatively, the DS processing module 372 identifies the identified encoded data slices 378 by determining that the identified encoded data slices 378 have a security level (e.g., a higher than average security level requirement) that indicates a requirement for data transfer.

The DS processing module 372 determines whether the other DS unit 36 has another local DSN address range in the address sector based on the global DSN address space. The DS processing module 372 determines whether the other DS unit 36 has the other local DSN address range by at least one of a variety of approaches. A first approach includes accessing a mapping of the global DSN address space. A second approach includes transmitting a request to a DSN management unit. A third approach includes transmitting a global request to DS units of the DSN.

When the other DS unit 36 has the other local DSN address range in the address sector, the DS processing module 372 determines whether to transfer at least some of the identified encoded data slices to the other DS unit 36 based on a DSN data protocol. The DSN data protocol includes one of a variety of approaches. A first approach includes determining DSN operational factors (e.g., a performance level, a security requirement, network traffic, availability of the other DS unit, capacity of the other DS unit, etc.) and, when the DSN operational factors are favorable, indicating that the identified encoded data slices 378 are to be transferred. A second approach includes accessing a predetermined data transfer plan. A third approach includes querying DS units of the DSN to identify the other DS unit 36. Alternatively, the DS processing 372 determines whether to transfer at least some of the identified encoded data slices to the other DS unit 36 by determining whether the other DS unit 36 has a desired security level when the DS processing module 372 identifies the identified encoded data slices 378 by determining that the identified encoded data slices 378 have the security level that indicates the requirement for data transfer.

When the at least some of the identified encoded data slices are to be transferred to the other DS unit, the DS processing module 372 initiates a data transfer protocol with the other DS unit. The DS processing module 372 initiates the data transfer protocol by a series of steps. A first step includes communicating with the other DS unit 36 to confirm transferring of the at least some of the identified encoded data slices. When the transferring of the at least some of the identified encoded data slices is confirmed, a second step includes transmitting a set of write messages regarding the at least some of the identified encoded data slices to other DS unit. The set of write messages is in accordance with a DSN write protocol (e.g., a write slice request).

Figure 17E:
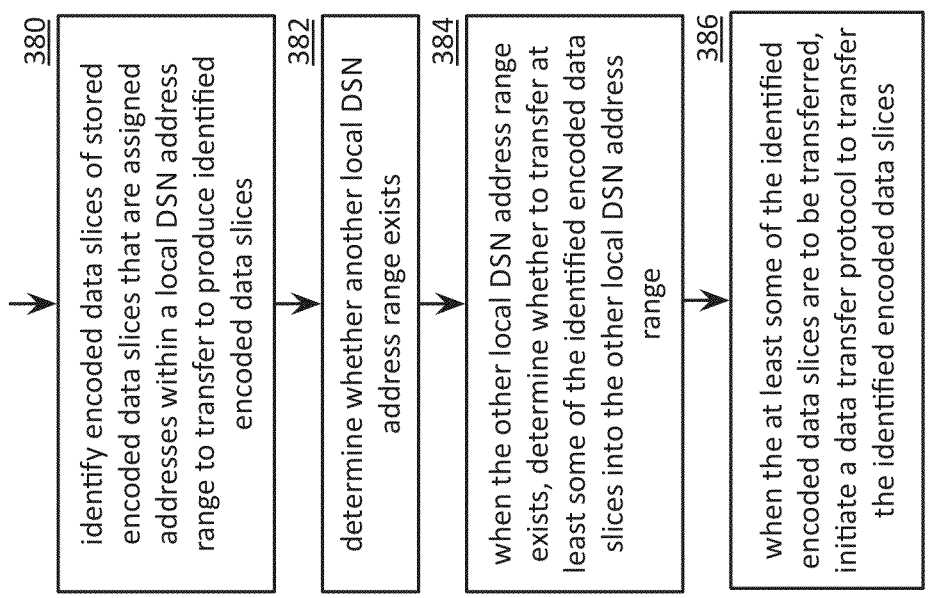
FIG. 17E is a flowchart illustrating another example of migrating slices in accordance with the present invention.

FIG. 17E is a flowchart illustrating another example of migrating slices. The method begins at step 380 or a processing module (e.g., of a dispersed storage (DS) unit) identifies encoded data slices of stored encoded data slices to transfer to produce identified encoded data slices. Data segments of data are encoded using a dispersed storage error coding function to produce a plurality of sets of encoded data slices. The encoded data slices includes one or more data slices of at least some sets of the plurality of sets of encoded data slices. The stored encoded data slices are assigned addresses within a local distributed storage network (DSN) address range. A global DSN address space is divided into a plurality of address sectors. The local DSN address range is a portion of an address sector of the plurality of address sectors. The plurality of sets of encoded data slices have a plurality of sets of slice names. A slice name of the plurality of sets of slices names includes an address sector field that identifies one of the plurality of address sectors, which corresponds to an ordering of the dispersed storage error coding function. The local DSN address range and another local DSN address range of another DS unit are assigned to the address sector by a system management function.

The processing module identifies the encoded data slices to transfer by a series of steps. A first step includes identifying a memory device of a plurality of memory devices based on a memory device maintenance protocol. A second step includes identifying encoded data slices stored by the memory device as the identified encoded data slices. Alternatively, the processing module identifies the identified encoded data slices by determining that the identified encoded data slices have a security level that indicates a requirement for data transfer.

The method continues at step 382 where the processing module determines whether the other local DSN address range in the address sector exists based on the global DSN address space. The processing module determines whether the other local DSN address range in the address sector exists by at least one of a variety of approaches. A first approach includes accessing a mapping of the global DSN address space. A second approach includes transmitting a request to a DSN management unit. A third approach includes transmitting a global request to DS units of the DSN.

When the other local DSN address range in the address sector exists, the method continues at step 384 where the processing module determines whether to transfer at least some of the identified encoded data slices into the other local DSN address range based on a DSN data protocol. The DSN data protocol includes one of a variety of approaches. A first approach includes determining DSN operational factors and, when the DSN operational factors are favorable, indicating that the identified encoded data slices are to be transferred. A second approach includes accessing a predetermined data transfer plan. A third approach includes querying DS units of the DSN to identify the other local DSN address range. Alternatively, the processing module determines whether to transfer at least some of the identified encoded data slices to the other local DSN address range by determining whether the other local DSN address range has a desired security level when the processing module identifies the identified encoded data slices by determining that the identified encoded data slices have the security level that indicates the requirement for data transfer.

When the at least some of the identified encoded data slices are to be transferred, the method continues at step 386 where the processing module initiates a data transfer protocol to transfer the identified encoded data slices. The processing module initiates the data transfer protocol by a series of steps. A first step includes communicating messages to confirm transferring of the at least some of the identified encoded data slices. When the transferring of the at least some of the identified encoded data slices is confirmed, a second step includes transmitting a set of write messages regarding the at least some of the identified encoded data slices, wherein the set of write messages is in accordance with a DSN write protocol.

FIG. 18A is a flowchart illustrating an example of sending a secure message. The method begins at step 388 where a processing module (e.g., of a dispersed storage (DS) module) encodes secret data using a dispersed storage error coding function to produce a plurality of sets of encoded data slices. The secret data include sensitive data of a nature to be shared on a need to know or permissions basis. For example, the secret data may include one or more of a confidential document, a digital certificate, an encryption key, network access information, a password, personal information, etc.

The method continues at step 390 where the processing module generates recipient access information. The recipient access information includes one or more of a recipient identifier (ID), a public key associated with the recipient, a certificate associated with the recipient, recipient validation information (e.g., a fingerprint based key), a message ID, a message deletion policy, and a message access permissions. The generation may be based on one or more of a requesting entity ID, a lookup, receiving the access information, and a security level requirement.

The method continues at step 392 where the processing module appends the recipient access information to one or more encoded data slices of the plurality of sets of encoded data slices to produce a secure message. The method continues at step 394 where the processing module sends the secure message to one or more intermediaries. The intermediary includes one or more of the user device, a DS processing unit, a DS unit, an intermediary server, and a DS managing unit. The sending includes one or more of identifying the one or more intermediaries, selecting slices for transmission to the one or more intermediaries (e.g., a portion of the secure message), and outputting the slices for transmission to the one or more intermediaries. The identifying the one or more intermediaries may be based on one or more of the requesting entity ID, a recipient ID, a recipient ID to intermediary ID table lookup, and receiving one or more identities corresponding to the one or more intermediaries.

FIG. 18B is a flowchart illustrating an example of processing a secure message. The method begins at step 396 where a processing module (e.g., of a dispersed storage (DS) module, of an intermediary) receives a secure message. The method continues at step 398 where the processing module receives a secure data request from a requesting entity (e.g., from a user device). The request may include one or more of a requesting entity identifier (ID), a certificate, a public key, a secure message ID, and a secure message source ID.

The method continues at step 400 where the processing module verifies that the requesting entity is authorized to access the secure data. The verifying includes one or more of indicating that the requesting entity is authorized to access the secure data when a recipient ID of the secure data is substantially the same as the requesting entity ID and indicating that the requesting entity is authorized to access the secure data when an access control list lookup indicates that the requesting entity ID is authorized to access the secret data.

The method continues at step 402 where the processing module authenticates the requesting entity when the requesting entity is authorized. The authentication includes at least one of sending a signature request to the requesting entity, receiving a favorable signature response, sending an encryption request to the requesting entity, and receiving a favorable encryption response.

The method continues at step 404 where the processing module facilitates sending one or more encoded data slices of the secure message to the requesting entity when the requesting entity is authenticated. The sending includes one or more of selecting a portion of a plurality of sets of encoded data slices of the secure message as the one or more encoded data slices based on a portion indicator of recipient information extracted from the secure message.

The method continues at step 406 where the processing module deletes the secure message when a delete message condition exists. The deleting includes one or more of determining whether the delete message condition exists and deleting at least some encoded data slices of the plurality of sets of encoded data slices of the secure message. The determining whether the delete message condition exists includes one or more of extracting a secure message deletion policy from the recipient access information and indicating that the delete message condition exists when a delete message trigger is detected of the secure message deletion policy. The delete message trigger includes one or more of secure message delivered to recipient, a time period has expired since the secure message was delivered to the recipient, a time period has expired since the secure message was received, all messages delivered, and the delivery threshold number of messages have been delivered.

Figure 19A:
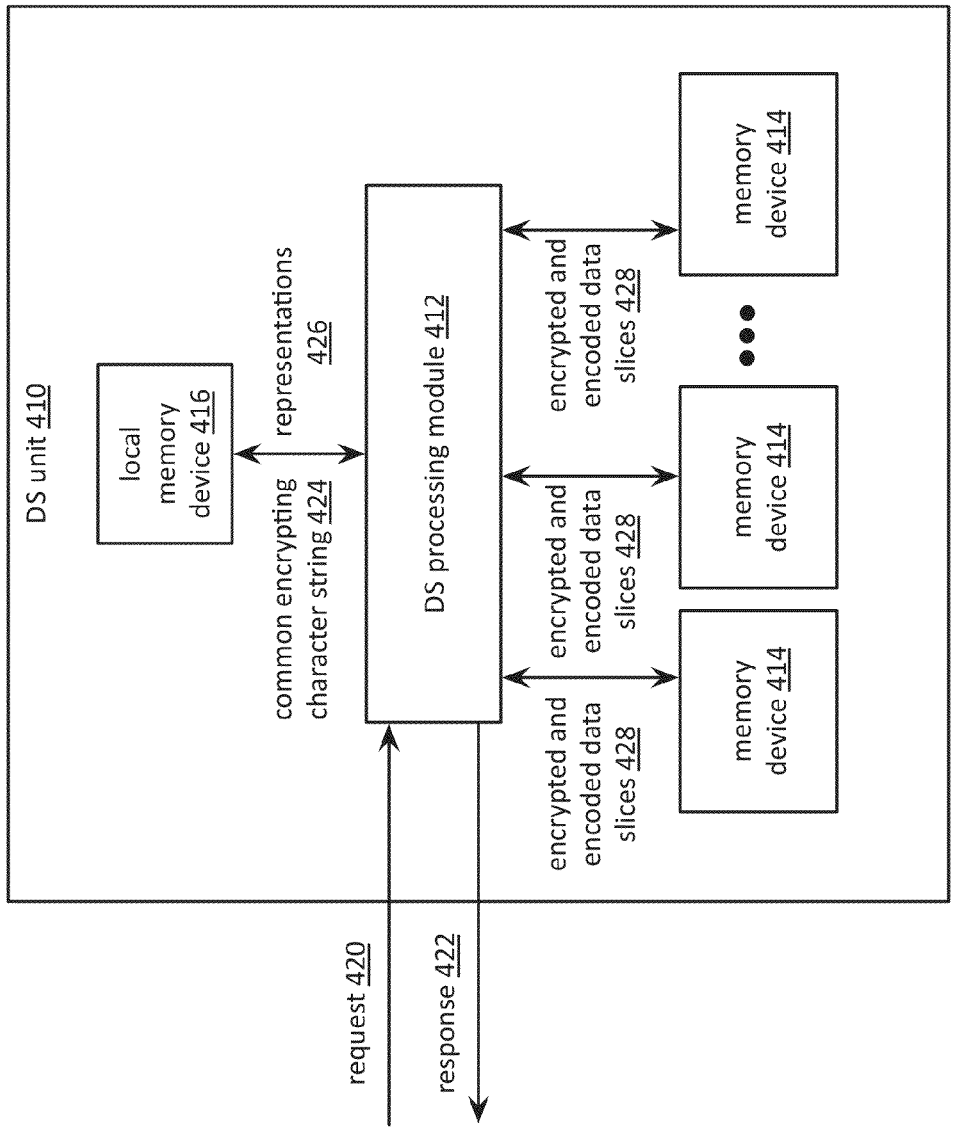
FIG. 19A is a schematic block diagram of another embodiment of a computing system in accordance with the present invention.

FIG. 19A is a schematic block diagram of another embodiment of a computing system that includes a dispersed storage (DS) unit 410. The DS unit 410 includes a DS processing module 412, a plurality of memory devices 414, and a local memory device 416. The DS unit 410 functions include one or more of storing encoded data slices, retrieving the encoded data slices, and deleting the encoded data slices. The DS unit 410 receives a request 420 which includes at least one of a request to read at least a portion of corresponding encoded data slices, a request to write the at least a portion of the corresponding encoded data slices, and a request to delete the at least a portion of the corresponding encoded data slices. The DS unit 410 processes the request 420 and may generate a response 422 with regards to the processing of the request 420. The response 422 may include the at least a portion of the corresponding encoded data slices when the request 420 includes the request to read the at least a portion of the corresponding encoded data slices.

The plurality of memory devices 414 stores a plurality of collections of encrypted and encoded data slices 428. A collection of encrypted and encoded data slices 428 of the plurality of collections of encrypted and encoded data slices 428 includes a common data aspect (e.g., belong to same data object, same data file, same folder, same vault, same user ID, etc.). Encrypted and encoded data slices 428 of the collection of encrypted and encoded data slices 428 are produced by individually encrypting corresponding encoded data slices using a common encrypting character string 424 and representations 426 of the corresponding encoded data slices. The corresponding encoded data slices are dispersed storage error encoded portions of a plurality of data segments (e.g., of same or different data objects, of same or different files, etc.). For example, a plurality of data segments of data (e.g., one or more data objects, one or more files, etc.) are each encoded (e.g., by a DS processing unit) using a dispersed storage error coding function to produce a plurality of sets of encoded data slices. One or more encoded data slices of at least some sets of the plurality of sets of encoded data slices are selected as the corresponding encoded data slices (e.g., slices associated with a common pillar number as a representation) and sent to the DS unit 410 for storage therein.

The common encrypting character string 424 includes one or more of a random number, a series of characters, a passcode, and a random string of characters. Each representation 426 of the representations 426 of the corresponding encoded data slices includes one or more of distributed storage network (DSN) address, a slice name of the corresponding encoded data slice, a hash of an encoded data slice, the encoded data slice, and a vault ID.

The local memory 416 stores the common encrypting character string 424 regarding the collection of encrypted and encoded data slices 428 and stores the representations 426 of the corresponding encoded data slices. For example, the DS processing module 412 generates a table to include a plurality of entries. Each entry of the plurality of entries includes a slice name, a corresponding storage location within the plurality of memory devices 414, and at least a portion of a corresponding common encrypting character string 424. Next, the DS processing module 412 stores the table in the local memory device 416. Alternatively, or in addition to, the DS processing module 412 stores the table in a dispersed storage network (DSN) memory.

The DS processing module 412 receives a request 420 regarding at least a portion of the corresponding encoded data slices. The DS processing module 412 identifies the common encrypting character string 424 of the corresponding encoded data slices. For example, the DS processing module 412 utilizes a slice name associated with the request 420 to access the table from the local memory device 416 to recover the common encrypting character string 424 of the corresponding encoded data slices.

When the request 420 is to delete the corresponding encoded data slices, the DS processing module 412 obfuscates the common encrypting character string 424 in the local memory such that the collection of encrypted and encoded data slices 428 are effectively incomprehensible. The processing module obfuscates the common encrypting character string 424 by at least one of a variety of approaches. A first approach includes deleting the common encrypting character string 424. For example, the DS processing module 412 deletes the common encrypting character string 424 from the local memory 416. A second approach includes altering the common encrypting character string 424. For example, the DS processing module 412 alters the common encrypting character string 424 to include a random number from a random number generator. A third approach includes masking the common encrypting character string 424. The masking includes a series of steps. A first step includes transforming the common encrypting character string 424 using a deterministic function and a secret key to produce a masked key. The deterministic function includes at least one of an exclusive OR logical function, subtraction, addition, a cyclic redundancy check (CRC), a hashing function, a hash based message authentication code (HMAC) function, and a mask generating function (MGF). For example, the DS processing module 412 performs an exclusive OR function on the common encrypting character string 424 and the secret key to produce the masked key. The second step includes overwriting the common encrypting character string 424 with the masked key.

When the request 420 is to read the at least a portion of the corresponding encoded data slices, the DS processing module 412 retrieves the common encrypting character string 424 and the representations 426 of the corresponding encoded data slices from the local memory device 416. Next, the DS processing module 412 decrypts each of at least a portion of the collection of encrypted and encoded data slices 428 using the common encrypting character string 424 and a corresponding one of the representations 426 of the corresponding encoded data slices to recapture the at least a portion of the corresponding encoded data slices. The DS processing module 412 outputs the recaptured at least a portion of the corresponding encoded data slices. For example, the DS processing module 412 generates the response 422 to include the recaptured at least a portion of the corresponding encoded data slices and outputs the response 422.

When the request 420 is to write the at least a portion of the corresponding encoded data slices, the DS processing module 412 determines whether the collection of encrypted and encoded data slices 428 exists. The determining may be based on accessing the table from the local memory device 416 and identifying whether a common encrypting character string 424 exists that corresponds to a slice name of the request to write the at least a portion of the corresponding encoded data slices. The DS processing module 412 determines that the collection of encrypted in encoded data slices 428 exists when the common encrypting character string 424 exists that corresponds to the slice name of the request 420.

When the collection of encrypted and encoded data slices 428 exists, the DS processing module 412 retrieves the common encrypting character string 424 (e.g., if not already) and encrypts the at least a portion of the corresponding encoded data slices using the common encrypting character string 424 and the representations 426 of the at least a portion of the corresponding encoded data slices to produce at least a portion of the collection of encrypted and encoded data slices 428. Next, the DS processing module 412 writes the at least a portion of the collection of encrypted and encoded data slices 428 to one or more of the plurality of memory devices 414. The DS processing module 412 individually encrypts the corresponding encoded data slices by a series of steps. A first step includes transforming the common encrypting character string 424 and a representation (e.g., a slice name) of representations 426 of the corresponding encoded data slices using a deterministic function (e.g., exclusive OR) to produce an individual encryption key. A second step includes encrypting an individual encoded data slice of the corresponding encoded data slices using the individual encryption key to produce an individual encrypted and encoded data slice of the collection of encrypted and encoded data slices 428.

When the collection of encrypted and encoded data slices 428 does not exist, the DS processing module 412 generates the common encrypting character string 424. For example, the DS processing module 412 generates a new random number as the common encrypting character string 424 corresponding to a vault identifier associated with the at least a portion of the corresponding encoded data slices. Next, the DS processing module 412 stores the common encrypting character string 424 and the local memory device 416. The DS processing module 412 encrypts the at least a portion of the corresponding encoded data slices using the common encrypting character string 424 and the representations 426 of the at least a portion of the corresponding encoded data slices to produce at least a portion of the collection of encrypted and encoded data slices 428. Next, the DS processing module 412 writes the at least a portion of the collection of encrypted and encoded data slices 428 to one or more of the plurality of memory devices 414.

Figure 19B:
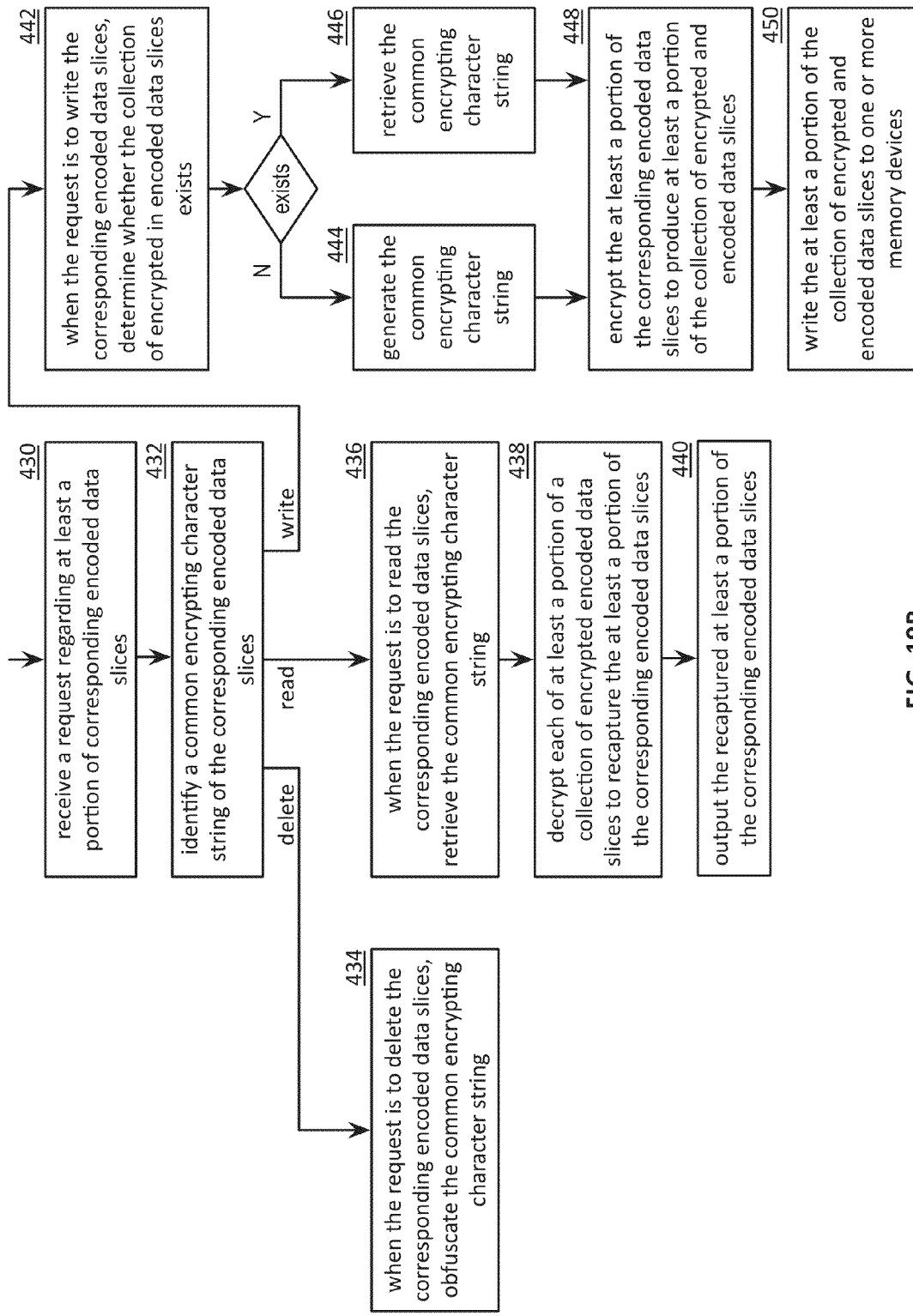
FIG. 19B is a flowchart illustrating an example of deleting slices in accordance with the present invention.

FIG. 19B is a flowchart illustrating an example of deleting slices. The method begins at step 430 where a processing module (e.g., of a dispersed storage (DS) unit) receives a request regarding at least a portion of corresponding encoded data slices. The request may include at least one of a delete request, a read request, and a write request. A collection of encrypted and encoded data slices of a plurality of collections of encrypted and encoded data slices includes a common data aspect. Encrypted and encoded data slices of the collection of encrypted and encoded data slices are produced by individually encrypting corresponding encoded data slices using a common encrypting character string and representations of the corresponding encoded data slices. The corresponding encoded data slices are dispersed storage error encoded portions of a plurality of data segments. The common encrypting character string includes one or more of a random number, a series of characters, a passcode, and a random string of characters. Each representation of the representations of the corresponding encoded data slices includes one or more of distributed storage network (DSN) address, a slice name of a corresponding encoded data slice, a hash of an encoded data slice, the encoded data slice, and a vault ID.

The method continues at step 432 where the processing module identifies the common encrypting character string of the corresponding encoded data slices. When the request is to delete the corresponding encoded data slices, the method continues at step 434 where the processing module obfuscates the common encrypting character string in a local memory such that the collection of encrypted and encoded data slices are effectively incomprehensible. The processing module obfuscates the common encrypting character string by at least one of a variety of approaches. A first approach includes deleting the common encrypting character string. A second approach includes altering the common encrypting character string. A third approach includes that masking the common encrypting character string. The masking includes a series of steps. A first step includes transforming the common encrypting character string using a deterministic function and a secret key to produce a masked key. A second step includes that overwriting the common encrypting character string with the masked key.

When the request is to read the at least a portion of the corresponding encoded data slices, the method continues at step 436 where the processing module retrieves the common encrypting character string and the representations of the corresponding encoded data slices from the local memory. The method continues at step 438 where the processing module decrypts each of at least a portion of the collection of encrypted and encoded data slices using the common encrypting character string and a corresponding one of the representations of the corresponding encoded data slices to recapture the at least a portion of the corresponding encoded data slices. The method continues at step 440 where the processing module outputs the recaptured at least a portion of the corresponding encoded data slices.

When the request is to write the at least a portion of the corresponding encoded data slices, the method continues at step 442 where the processing module determines whether the collection of encrypted and encoded data slices exists. The method branches to step 446 when the collection of encrypted and encoded data slices exists. The method continues to step 444 when the collection of encrypted encoded data slices does not exist. The method continues at step 444 where the processing module generates the common encrypting character string. When the collection of encrypted and encoded data slices exists, the method continues at step 446 where the processing module retrieves the common encrypting character string.

The method continues at step 448 where the processing module encrypts the at least a portion of the corresponding encoded data slices using the common encrypting character string and the representations of the at least a portion of the corresponding encoded data slices to produce at least a portion of the collection of encrypted and encoded data slices. The processing module individually encrypts the corresponding encoded data slices by a series of steps. A first step includes transforming the common encrypting character string and a representation of representations of the corresponding encoded data slices using a deterministic function to produce an individual encryption key. A second step includes encrypting an individual encoded data slice of the corresponding encoded data slices using the individual encryption key to produce an individual encrypted and encoded data slice of the collection of encrypted and encoded data slices. The method continues at step 450 where the processing module writes the at least a portion of the collection of encrypted and encoded data slices to one or more memory devices of a plurality of memory devices.

Figure 19C:
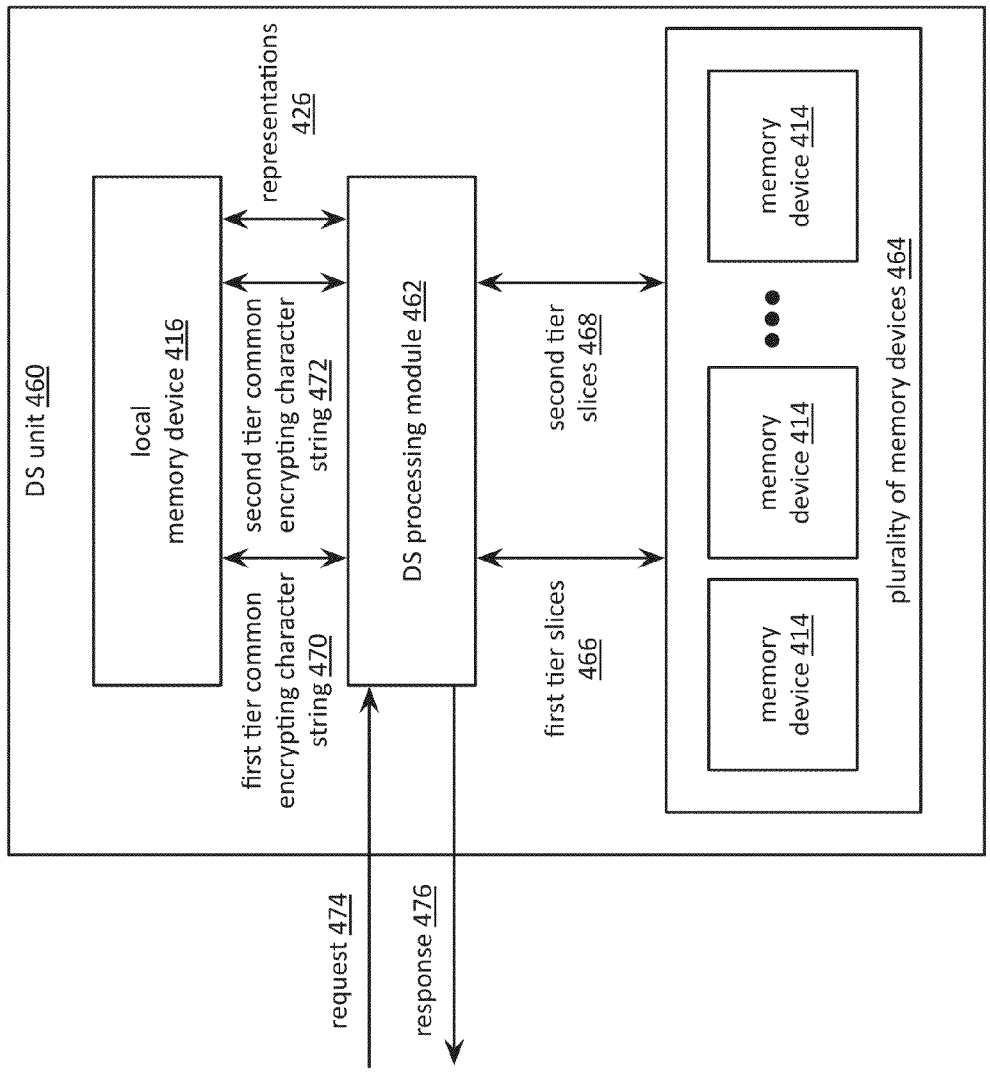
FIG. 19C is a schematic block diagram of another embodiment of a computing system in accordance with the present invention.

FIG. 19C is a schematic block diagram of another embodiment of a computing system that includes a dispersed storage (DS) unit 460. The DS unit 460 includes a DS processing module 462, a plurality of memory devices 464, and a local memory device 416. The plurality of memory devices 464 includes two or more memory devices 414. The DS unit 462 functions include one or more of storing encoded data slices, retrieving the encoded data slices, and deleting the encoded data slices. The DS unit 462 receives a request 474 which includes at least one of a request to read at least a portion of corresponding encoded data slices, a request to write the at least a portion of the corresponding encoded data slices, and a request to delete the at least a portion of the corresponding encoded data slices. The request to delete the at least a portion of the corresponding encoded data slices includes at least one of a first tier delete request and a second tier delete request. The DS unit 460 processes the request 474 and may generate a response 476 with regards to the processing of the request 474. The response 476 may include the at least a portion of the corresponding encoded data slices when the request 474 includes the request to read the at least a portion of the corresponding encoded data slices.

The plurality of memory devices 464 stores a plurality of encoded data slices as a plurality of encrypted and encoded data slices. A plurality of data segments is encoded (e.g., by a DS processing unit) using a dispersed storage error encoding function to produce a plurality of sets of encoded data slices. The plurality of encoded data slices is a subset (e.g., a common pillar, one or more pillars, one or more encoded blocks, etc.) of the plurality of sets of encoded data slices. Groups of the plurality of encoded data slices are arranged into first tier collections (e.g., by file or data object) of slices 466 based on common first tier data aspects (e.g., by file name). Groups of the first tier collections are arranged into second tier collections (e.g., by folders containing a plurality of files) of slices 468 based on common second tier data aspects (e.g., folder name). Encoded data slices of one of the second tier collections of slices are individually encrypted using first tier common encrypting character strings 470 relating to the common first tier data aspects of the group of first tier collections of slices 466 in the second tier collection of slices 468, a second tier common encrypting character string 472 relating to the common second tier data aspect of the one of the second tier collections of slices 468, and representations 426 of the encoded data slices (e.g., slice names).

The DS processing module 462 functions to individually encrypt an encoded data slice of the encoded data slices by a series of steps. A first step includes transforming the first tier common encrypting character string 470, the second tier common encrypting character string 472, and a representation 426 of the encoded data slice (e.g., a slice name) using a deterministic function to produce an individual encryption key. A second step includes encrypting the encoded data slice using the individual encryption key to produce an individual encrypted and encoded data slice of the one of the second tier collections of slices 468.

The local memory 416 stores the first tier common encrypting character strings 470 relating to the common first tier data aspects of the group of first tier collections of slices 466 in the second tier collection of slices 468, the second tier common encrypting character string 472 relating to the common second tier data aspect of the one of the second tier collections of slices 468, and the representations 426 of the encoded data slices. The DS processing module 462 receives the request 474 regarding encoded data slices having a common data aspect. When the request 474 is the second tier delete request, the DS processing module 462 identifies the second tier common encrypting character string 472 corresponding to a second tier collection of slices 468 having the common data aspect (e.g., a particular folder name). Next, the DS processing module 462 obfuscates the second tier common encrypting character string 472 in the local memory 416 such that the second tier collection of slices 468 is effectively incomprehensible. For example, the DS processing module 462 overwrites the second tier common encrypting character string 472 with a random pattern.

When the request 474 is the first tier delete request, the DS processing module 462 identifies a first tier common encrypting character string 470 corresponding to one of the first tier collections of slices 466 of one of the second tier collections of slices 468 having the common data aspect (e.g., a particular filename. Next, the DS processing module 462 obfuscates the first tier common encrypting character string 470 in the local memory 416 such that the one of the first tier collections of slices 466 is effectively incomprehensible while other first tier collections of slices 466 (e.g., other files) of the one of the second tier collections of slices 468 (e.g., within a common folder) are substantially unaffected. For example, the DS processing module 462 overwrites the first tier common encrypting character string 470 with a predetermined pattern.

Figure 19D:
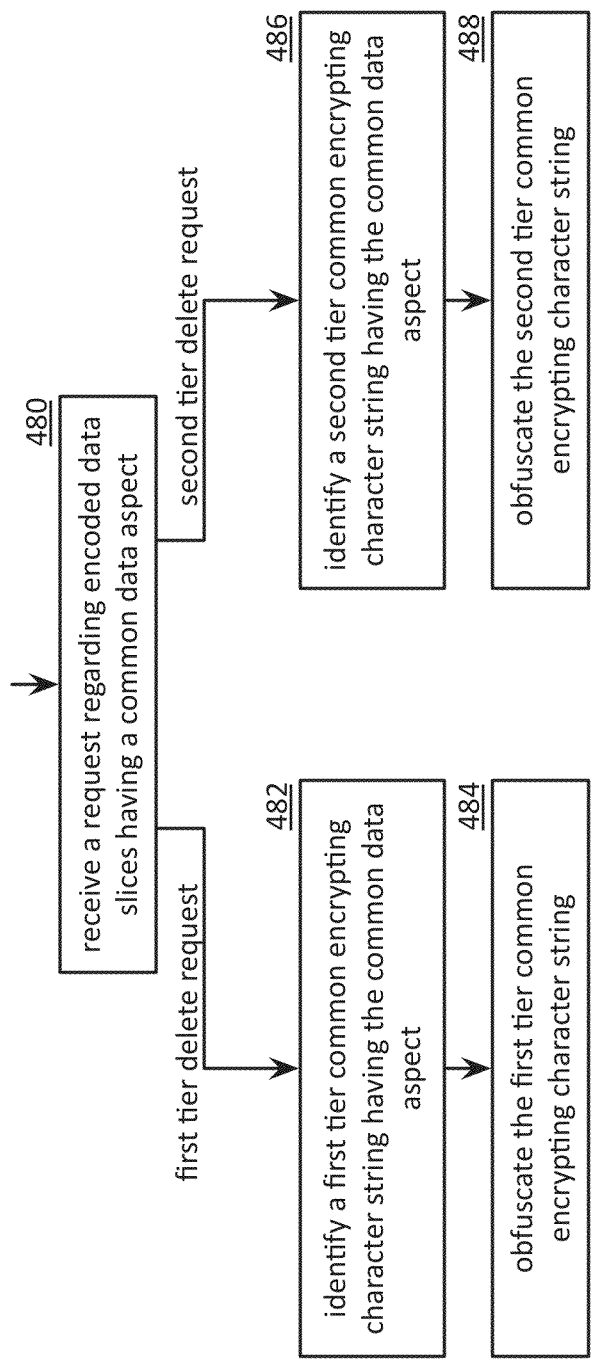
FIG. 19D is a flowchart illustrating another example of deleting slices in accordance with the present invention.

FIG. 19D is a flowchart illustrating another example of deleting slices. The method begins at step 480 where a processing module (e.g., of a dispersed storage (DS) unit) receives a request regarding encoded data slices having a common data aspect. Groups of a plurality of encoded data slices are arranged into first tier collections of slices based on common first tier data aspects. The plurality of encoded data slices is a subset of a plurality of sets of encoded data slices. A plurality of data segments is encoded (e.g., by a DS processing unit) using a dispersed storage error encoding function to produce the plurality of sets of encoded data slices. Groups of the first tier collections are arranged into second tier collections of slices based on common second tier data aspects.

Encoded data slices of one of the second tier collections of slices are individually encrypted using first tier common encrypting character strings relating to the common first tier data aspects of the group of first tier collections of slices in the second tier collection of slices, a second tier common encrypting character string relating to the common second tier data aspect of the one of the second tier collections of slices, and representations of the encoded data slices. The processing module individually encrypts an encoded data slice of the encoded data slices by a series of steps. A first step includes transforming the first tier common encrypting character string, the second tier common encrypting character string, and a representation of the encoded data slice using a deterministic function to produce an individual encryption key. For example, a processing module performs a hashing function on each of the first tier common encrypting character string, the second tier common encrypting character string, and a slice name (e.g., representation) of the encoded data slice to produce a key digest set and performs an exclusive or function on each key digest of the key digest that to produce the individual encryption key. A second step includes encrypting the encoded data slice using the individual encryption key to produce an individual encrypted and encoded data slice of the one of the second tier collections of slices.

When the request is a first tier delete request, the method continues at step 482 where the processing module identifies a first tier common encrypting character string corresponding to one of the first tier collections of slices of one of the second tier collections of slices having the common data aspect. For example, the processing module retrieves the first tier common encrypting character string from a local memory based on the common data aspect of the request. The method continues at step 484 where the processing module obfuscates the first tier common encrypting character string (e.g., in a local memory) such that the one of the first tier collections of slices is effectively incomprehensible while other first tier collections of slices of the one of the second tier collections of slices are substantially unaffected.

When the request is a second tier delete request, the method continues at step 486 where the processing module identifies the second tier common encrypting character string corresponding to a second tier collection of slices having the common data aspect. The method continues at step 488 where the processing module obfuscates the second tier common encrypting character string (e.g., in the local memory) such that the second tier collection of slices is effectively incomprehensible.

Figure 20:
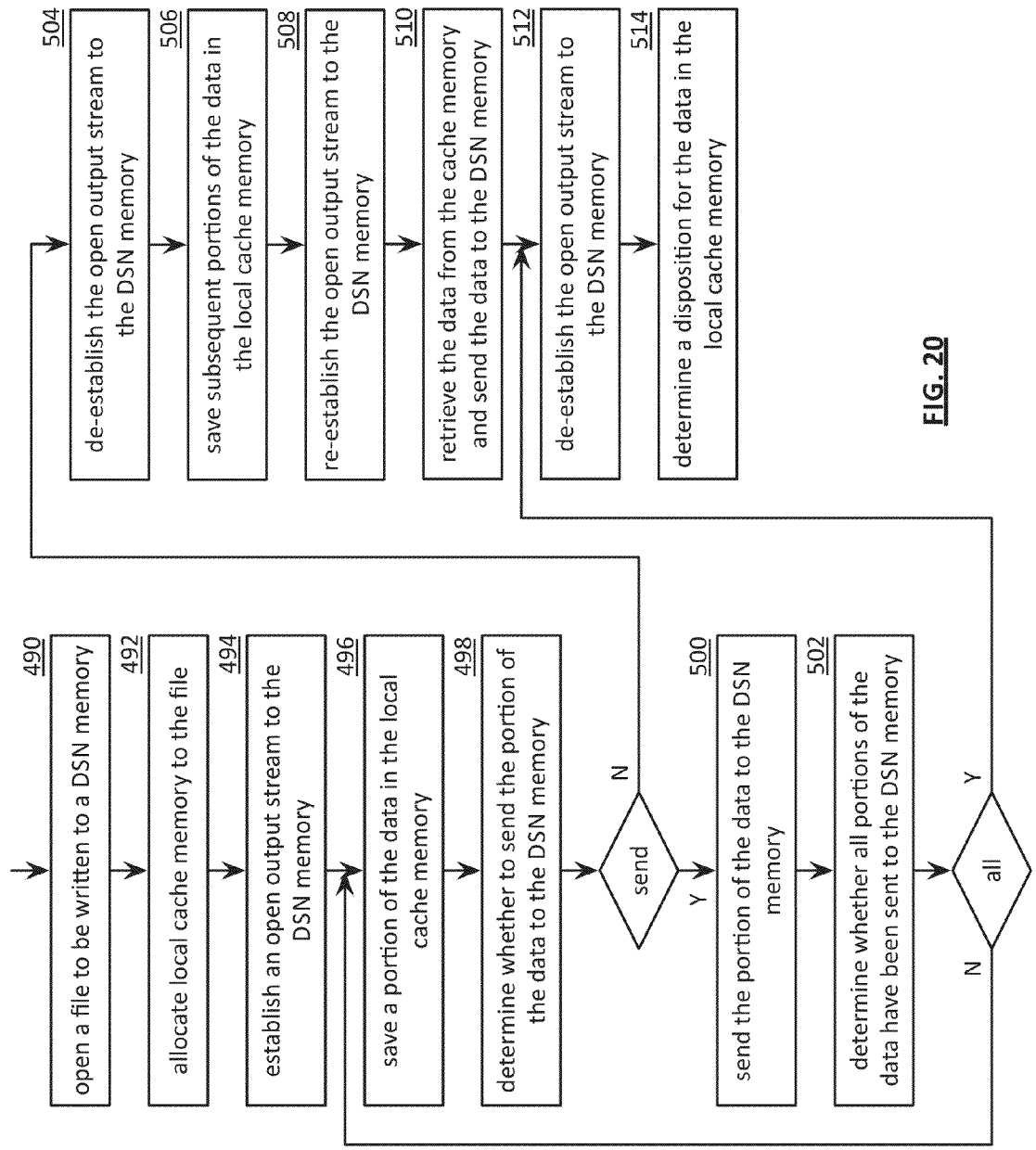
FIG. 20 is a flowchart illustrating an example of outputting data in accordance with the present invention.

FIG. 20 is a flowchart illustrating an example of outputting data. The method begins at step 490 where a processing module (e.g. of a dispersed storage (DS) module, of a DS processing unit) opens a file to be written to a dispersed storage network (DSN) memory. The file may include one or more encoded data slices produced from dispersed storage error encoding data. The method continues at step 492 where the processing module allocates a local cache memory to the file. The allocating includes identifying a size associated with the file and selecting the local cache memory to include a favorable amount of memory in comparison to the size associated with the file. The method continues at step 494 where the processing module establishes an open output stream to the DSN memory. For example, the processing module establishes a remote channel via a network between a process of a DS processing unit and a process of a DS unit.

The method continues at step 496 where the processing module saves a portion of the data in the local cache memory. The saving includes selecting the portion of the data in accordance with a selection approach and storing the portion of the data in the local cache memory. The selection approach includes selecting the portion received within a time period, selecting a first predetermined section of the data, and selecting a section based on a network performance indicator.

The method continues at step 498 where the processing module determines whether to send the portion of the data to the DSN memory. The determining may be based on one or more of receiving a write position indicator from the DSN memory, comparing the write position to an expected write position (e.g., maintained locally in a DS processing unit), and determining to send the portion of the data to the DSN memory when the comparison is favorable (e.g., substantially the same). The method branches to step 504 when the processing module determines not to send the portion of the data to the DSN memory. The method continues to step 500 when the processing module determines to send the portion of the data to the DSN memory.

The method continues at step 500 where the processing module sends the portion of the data to the DSN memory when the processing module determines to send the portion of the data to the DSN memory. For example, the processing module writes the data to the output stream. The method continues at step 502 where the processing module determines whether all portions of the data have been sent to the DSN memory. For example, the processing module determines that all portions of the data have been sent to the DSN memory when all portions have been streamed. The method branches to step 512 when the processing module determines that all portions of the data have been sent to the DSN memory. The method repeats back to step 496 where the processing module saves the portion of the data in the local cache memory to save a next portion of the data when the processing module determines that all portions of the data have not been sent to the DSN memory.

The method continues at step 504 where the processing module de-establishes the open output stream to the DSN memory when the processing module determines not to send the portion of the data to the DSN memory. Alternatively, or in addition to, the processing module may send a cancellation request to the DSN memory (e.g., to avoid partially written data from becoming visible). The method continues at step 506 where the processing module saves subsequent portions of the data in the local cache memory (e.g., other portions available now, other portions available sequentially in the future).

The method continues at step 508 where the processing module re-establishes the open output stream to the DSN memory (e.g., after saving all portions of the data in the local cache memory). The method continues at step 510 where the processing module retrieves the data from the cache memory and sends the data to the DSN memory (e.g., the processing module streams out the data). The method continues at step 512 where the processing module de-establishes the open output stream to the DSN memory (e.g., the remote channel is deactivated). The method continues at step 514 where the processing module determines a disposition for the data in the local cache memory. The disposition includes one or more deleting the data now, deleting the data when additional memory resources are required, and deleting later. The determining may be based on one or more of an expected retrieval frequency of the data, a predetermination, a message, a query, and a lookup.

FIG. 21 is a flowchart illustrating an example of inputting data in accordance with the invention, which include similar steps to FIG. 20. The method begins at step 516 where a processing module (e.g. of a dispersed storage (DS) module, of a DS processing unit) opens a file to be read from a dispersed storage network (DSN) memory (e.g., initiates a process to retrieve and decode a plurality of sets of encoded data slices to re-create the file). The method continues with step 492 of FIG. 20 where the processing module allocates local cache memory to the file. The method continues at step 520 where the processing module establishes an open input stream from the DSN memory at a starting read position. For example, the processing module establishes a remote channel via a network between a process of a DS processing unit and a process of a DS unit, wherein the starting read position corresponds to a starting location of the file.

The method continues at step 522 where the processing module determines whether to retrieve a portion of the data from the DSN memory. The determining may be based on one or more of receiving a read position indicator from the DSN memory, comparing the read position to an expected read position (e.g., maintained locally in a DS processing unit), and determining to retrieve the portion of the data from the DSN memory when the comparison is favorable (e.g., substantially the same). The method branches to step 524 when the processing module determines to retrieve the portion of the data from the DSN memory. The method continues to step 528 when the processing module determines not to retrieve the portion of the data from the DSN memory. The method continues at step 528 where processing module de-establishes the open input stream from the DSN memory. The method continues at step 530 where the processing module re-establishes the open input stream from the DSN memory at a current read position. The method continues to step 524.

The method continues at step 524 where the processing module retrieves the portion of the data and stores in the local cache memory. For example, the processing module sends a read request through the open input stream and receives a portion of the data via the input stream from the DSN memory. The method continues at step 526 where the processing module determines whether all portions of the data have been retrieved from the DSN memory. For example, the processing module determines that all portions of the data have been retrieved from the DSN memory when all portions have been received via the stream.

The method branches to step 532 when the processing module determines that all portions of the data have been retrieved from the DSN memory. The method repeats back to step 522 where the processing module determines whether to retrieve a portion of the data from the DSN memory for a next portion of the data when the processing module determines that all portions of the data have not been retrieved from the DSN memory. The method continues at step 532 where the processing module de-establishes the open input stream from the DSN memory when the processing module determines that all portions of the data have been retrieved from the DSN memory. The method continues with step 514 of FIG. 20 where the processing module determines a disposition for the data in the local cache memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A distributed storage (DS) unit comprises:
a plurality of memory devices for storing encoded data slices, wherein data segments of data are encoded using a dispersed storage error coding function to produce a plurality of sets of encoded data slices, wherein the stored encoded data slices includes one or more encoded data slices of at least some sets of the plurality of sets of encoded data slices, wherein the DS unit is assigned a local distributed storage network (DSN) address range, wherein a global DSN address space is divided into a plurality of address sectors, and wherein the local DSN address range is a portion of an address sector of the plurality of address sectors; and
a processing module operably coupled to the plurality of memory devices, wherein the processing module is operable to:
identify encoded data slices of the stored encoded data slices to transfer to produce identified encoded data slices;
determine whether another DS unit has another local DSN address range in the address sector based on the global DSN address space;
when the other DS unit has the other local DSN address range in the address sector, determine whether to transfer at least some of the identified encoded data slices to the other DS unit based on a DSN data protocol; and when the at least some of the identified encoded data slices are to be transferred to the other DS unit, initiate a data transfer protocol with the other DS unit.

2. The DS unit of claim 1 further comprises:

the plurality of sets of encoded data slices having a plurality of sets of slice names, wherein a slice name of the plurality of sets of slices names includes an address sector field that identifies one of the plurality of address sectors, which corresponds to an ordering of the dispersed storage error coding function.

3. The DS unit of claim 1 further comprises:

the DS unit and the other DS unit are assigned to the address sector by a system management function.

4. The DS unit of claim 1, wherein the processing module is further operable to identify encoded data slices to transfer by:

identifying a memory device of the plurality of memory devices based on a memory device maintenance protocol; and identifying encoded data slices stored by the memory device as the identified encoded data slices.

5. The DS unit of claim 1, wherein the processing module is further operable to:

identify the identified encoded data slices by determining that the identified encoded data slices have a security level that indicates a requirement for data transfer; and determine whether to transfer at least some of the identified encoded data slices to the other DS unit by determining whether the other DS unit has a desired security level.

6. The DS unit of claim 1, wherein the processing module is further operable to determine whether the other DS unit has the other local DSN address range by at least one of:

accessing a mapping of the global DSN address space;

transmitting a request to a DSN management unit; and transmitting a global request to DS units of the DSN.

7. The DS unit of claim 1, wherein the DSN data protocol comprises one of:

determining DSN operational factors and, when the DSN operational factors are favorable, indicating that the identified encoded data slices are to be transferred;

accessing a predetermined data transfer plan; and querying DS units of the DSN to identify the other DS unit.

8. The DS unit of claim 1, wherein the processing module is further operable to initiate the data transfer protocol by:

communicating with the other DS unit to confirm transferring of the at least some of the identified encoded data slices; and when the transferring of the at least some of the identified encoded data slices is confirmed, transmitting a set of write messages regarding the at least some of the identified encoded data slices to other DS unit, wherein the set of write messages is in accordance with a DSN write protocol.

9. A non-transitory computer readable storage medium comprises:

a first section for storing operational instructions that, when executed by a processing module, causes the processing module to identify encoded data slices of stored encoded data slices to transfer to produce identified encoded data slices, wherein data segments of data are encoded using a dispersed storage error coding function to produce a plurality of sets of encoded data slices, wherein the stored encoded data slices includes one or more data slices of at least some sets of the plurality of sets of encoded data slices, wherein the stored encoded data slices are assigned addresses within a local distributed storage network (DSN) address range, wherein a global DSN address space is divided into a plurality of address sectors, and wherein the local DSN address range is a portion of an address sector of the plurality of address sectors;

a second section for storing operational instructions that, when executed by the processing module, causes the processing module to determine whether another local DSN address range in the address sector exists based on the global DSN address space;

a third section for storing operational instructions that, when executed by the processing module, causes the processing module to, when the other local DSN address range in the address sector exists, determine whether to transfer at least some of the identified encoded data slices into the other local DSN address range based on a DSN data protocol; and a fourth section for storing operational instructions that, when executed by the processing module, causes the processing module to, when the at least some of the identified encoded data slices are to be transferred, initiate a data transfer protocol to transfer the identified encoded data slices.

10. The non-transitory computer readable storage medium of claim 9 further comprises:

the plurality of sets of encoded data slices having a plurality of sets of slice names, wherein a slice name of the plurality of sets of slices names includes an address sector field that identifies one of the plurality of address sectors, which corresponds to an ordering of the dispersed storage error coding function.

11. The non-transitory computer readable storage medium of claim 9 further comprises:

the local DSN address range and the other local DSN address range are assigned to the address sector by a system management function.

12. The non-transitory computer readable storage medium of claim 9, wherein the first section further comprises operational instructions that cause the processing module to identify the encoded data slices to transfer by:

identifying a memory device of a plurality of memory devices based on a memory device maintenance protocol; and identifying encoded data slices stored by the memory device as the identified encoded data slices.

13. The non-transitory computer readable storage medium of claim 9 further comprises:

the first section further including operational instructions that cause the processing module to identify the identified encoded data slices by determining that the identified encoded data slices have a security level that indicates a requirement for data transfer; and the third section further including operational instructions that cause the processing module to determine whether to transfer at least some of the identified encoded data slices to the other local DSN address range by determining whether the other local DSN address range has a desired security level.

14. The non-transitory computer readable storage medium of claim 9, wherein the second section further comprises operational instructions that cause the processing module to determine whether the other local DSN address range in the address sector exists by at least one of:

accessing a mapping of the global DSN address space;
transmitting a request to a DSN management unit; and
transmitting a global request to DS units of the DSN.

15. The non-transitory computer readable storage medium of claim 9, wherein the DSN data protocol comprises one of:
   determining DSN operational factors and, when the DSN operational factors are favorable, indicating that the identified encoded data slices are to be transferred;
   accessing a predetermined data transfer plan; and
   querying DS units of the DSN to identify the other local DSN address range.

16. The non-transitory computer readable storage medium of claim 9, wherein the fourth section further comprises operational instructions that cause the processing module to initiate the data transfer protocol by:
   communicating messages to confirm transferring of the at least some of the identified encoded data slices; and
   when the transferring of the at least some of the identified encoded data slices is confirmed, transmitting a set of write messages regarding the at least some of the identified encoded data slices, wherein the set of write messages is in accordance with a DSN write protocol.

* * * * *